United States Patent [19]
Roberts

[11] Patent Number: 5,326,213
[45] Date of Patent: Jul. 5, 1994

[54] SECTION VAN TRAILER HAVING DETACHABLE AND INTERCHANGEABLE COMPARTMENTS FOR TRANSPORTING BOTH HOUSEHOLD BELONGINGS AND COMMERCIAL FREIGHT

[76] Inventor: Hardy G. Roberts, 2790 Oneida La., Provo, Utah 84604

[21] Appl. No.: 62,147

[22] Filed: May 13, 1993

Related U.S. Application Data

[60] Division of Ser. No. 948,333, Sep. 18, 1992, abandoned, which is a division of Ser. No. 708,893, May 31, 1991, abandoned, which is a continuation-in-part of Ser. No. 460,655, Jan. 3, 1990, abandoned, which is a continuation-in-part of Ser. No. 296,575, Jan. 12, 1989, abandoned.

[51] Int. Cl.⁵ ............................................. B65G 67/02
[52] U.S. Cl. ................................. 414/392; 414/395; 414/400; 414/500
[58] Field of Search .......................... 414/390-392, 414/395, 396, 399, 400, 498, 344, 345, 347, 500

[56] References Cited

U.S. PATENT DOCUMENTS

| | | | |
|---|---|---|---|
| 1,276,674 | 8/1918 | Mentzer et al. | 414/396 |
| 2,004,095 | 6/1935 | Harkins et al. | 414/345 |
| 2,069,236 | 2/1937 | Fitch | 414/391 X |
| 2,325,869 | 8/1943 | Mosling | 280/441.2 |
| 3,135,407 | 6/1964 | Back | 414/498 |
| 3,415,490 | 12/1968 | Steele | 414/498 X |
| 3,574,363 | 4/1971 | Stephenson | 280/511 |
| 3,743,120 | 7/1973 | Schmidt | 414/498 X |
| 3,794,186 | 2/1974 | Baxter | 414/498 X |
| 3,811,706 | 5/1974 | Tucker et al. | 280/477 |
| 3,837,675 | 9/1974 | Barnes et al. | 280/511 |
| 3,853,230 | 12/1974 | Schultz | 414/392 X |
| 3,893,713 | 7/1975 | Ivy | 280/511 |
| 3,913,758 | 10/1975 | Faircloth et al. | 414/498 X |
| 4,728,241 | 3/1988 | Edelhoff et al. | 414/392 |
| 4,832,358 | 5/1989 | Bull | 280/441.2 |

FOREIGN PATENT DOCUMENTS

| | | | |
|---|---|---|---|
| 82230 | 4/1988 | Japan | 414/392 |
| 164372 | 8/1958 | Sweden | 414/498 |
| 318952 | 9/1929 | United Kingdom | 414/391 |
| 1527944 | 10/1978 | United Kingdom | 414/391 |
| 2220921 | 1/1990 | United Kingdom | 414/498 |

*Primary Examiner*—David A. Bucci
*Attorney, Agent, or Firm*—Thorpe, North & Western

[57] ABSTRACT

A sectional van trailer having detachable, interchangeable compartments capable of forming a continuous van body is disclosed. One or more van sections or cargo compartments are secured to a trailer frame. The van sections may be individually removed and left at a location for loading or unloading. When removed, the van sections form secure, weather-tight individual containers for the goods disposed therein. The van sections are interconnected and each van section may remain an individual compartment or may be joined with one or more adjacent van sections to form a continuous van body. A tractor mounted hoist apparatus is provided to allow a lone truck operator to move the van sections between the ground, and the trailer frame, a storage stand, or a truck frame. The described embodiments are particularly efficient for moving both household belongings and general commodities on a long-haul trip. Moreover, since the individual van sections may be removed from a trailer, stored, and resecured to a different trailer frame, it is possible to transport the loaded van sections to a hub terminal and then transfer the van sections to outgoing trailers heading for points along the way to a final destination. Use of the present invention allows much more efficient transportation of goods by truck since loads may be planned to allow a direct, rather than circuitous, route to a final destination. Also disclosed is a system for removably constructing shelf decks and partition walls within the cargo compartment or other cargo holding section.

13 Claims, 42 Drawing Sheets

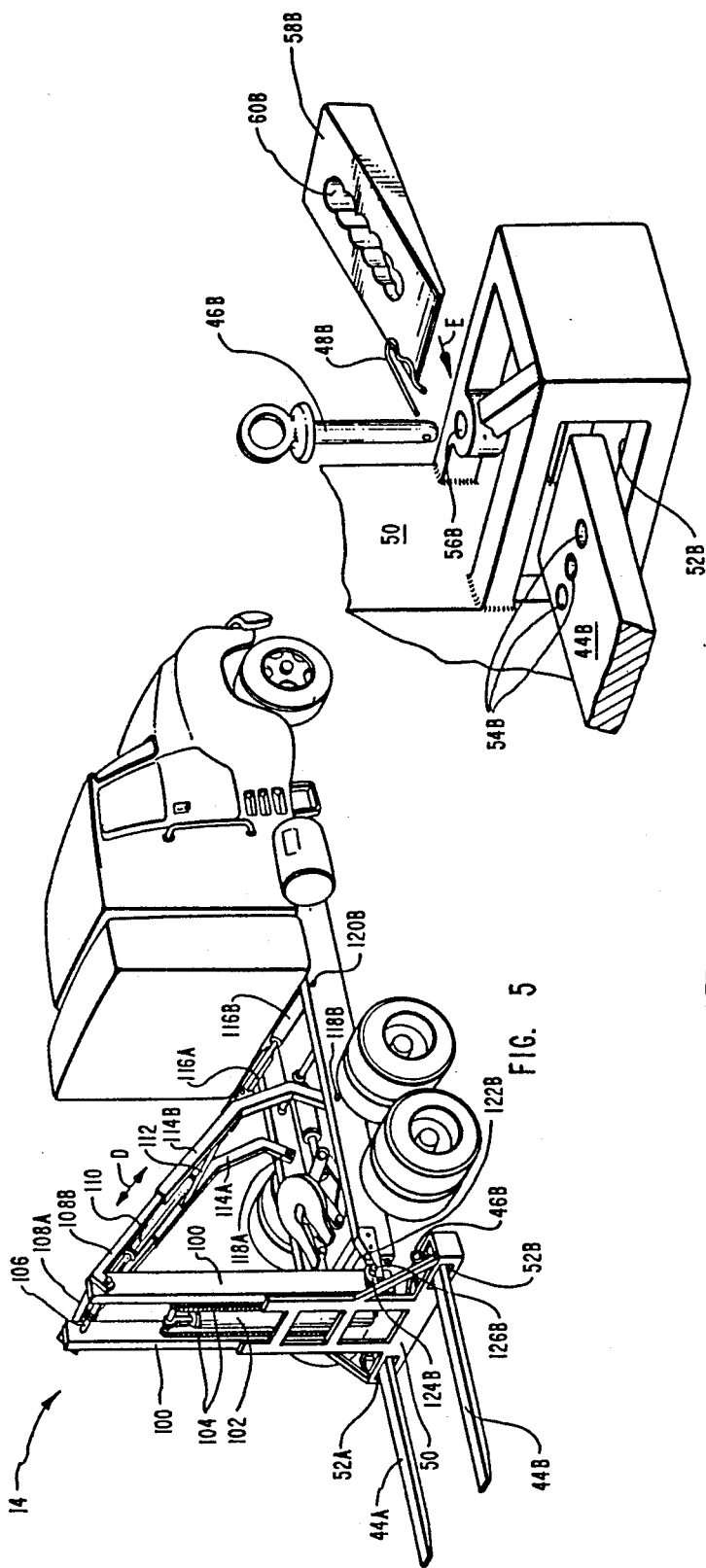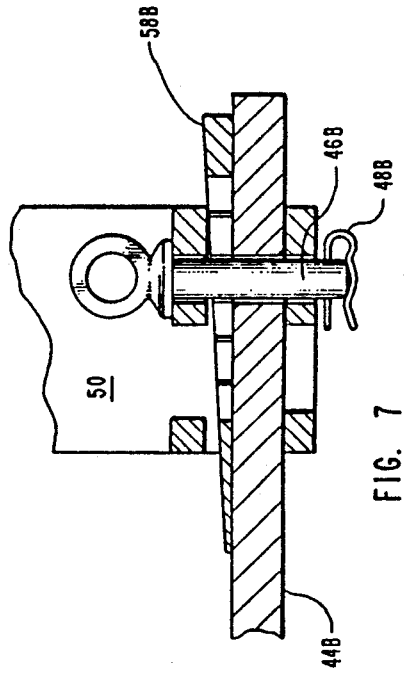

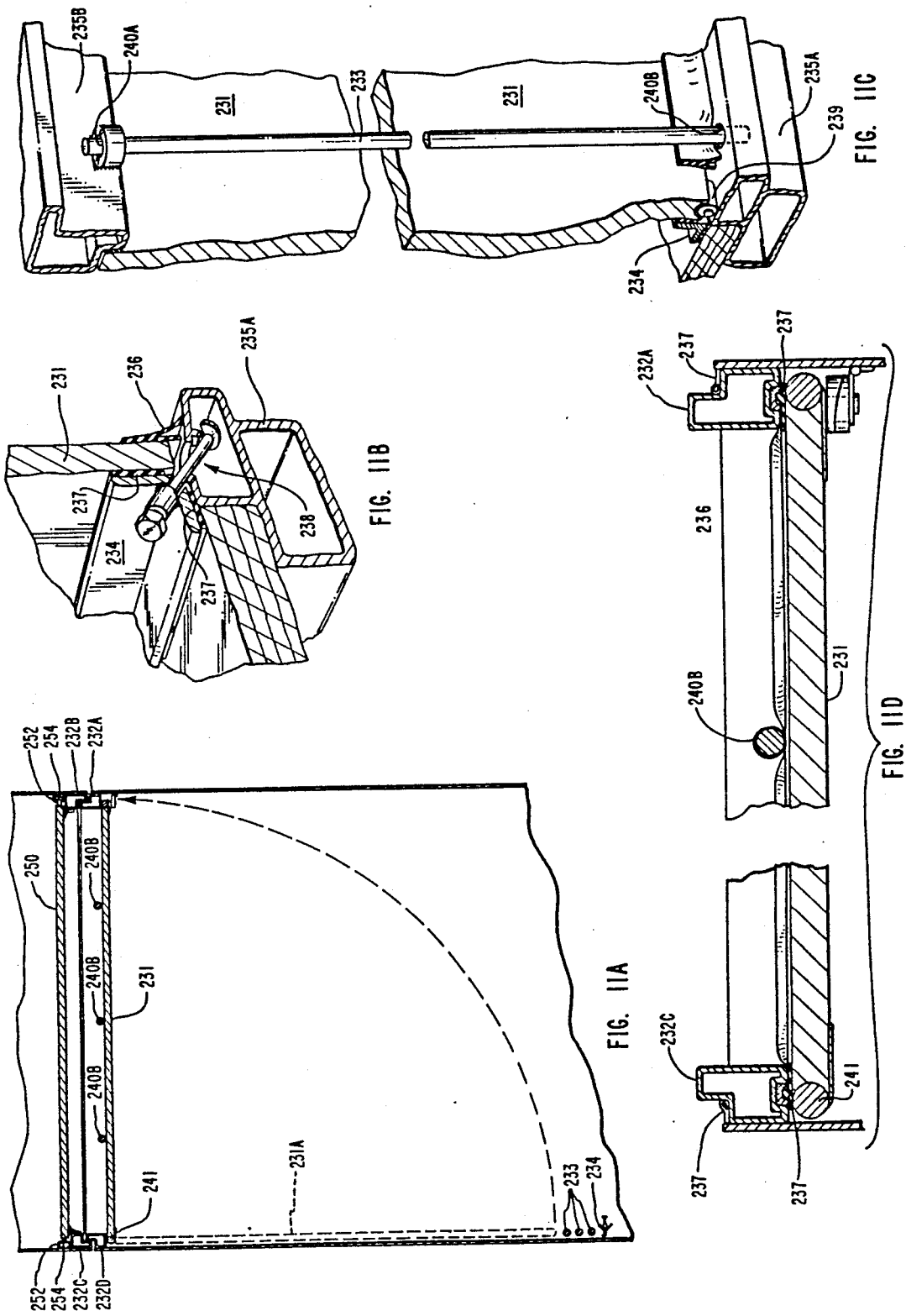

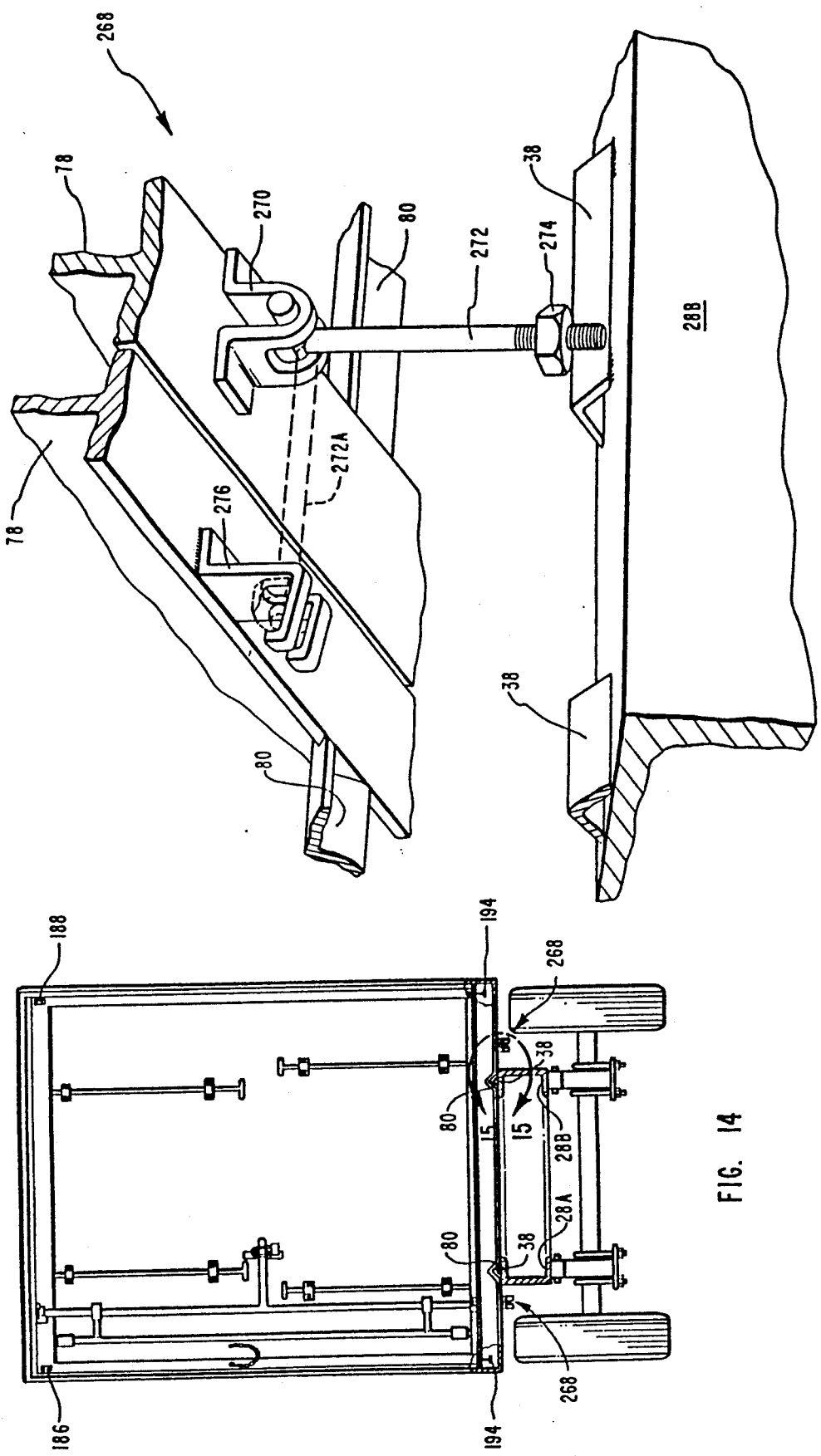

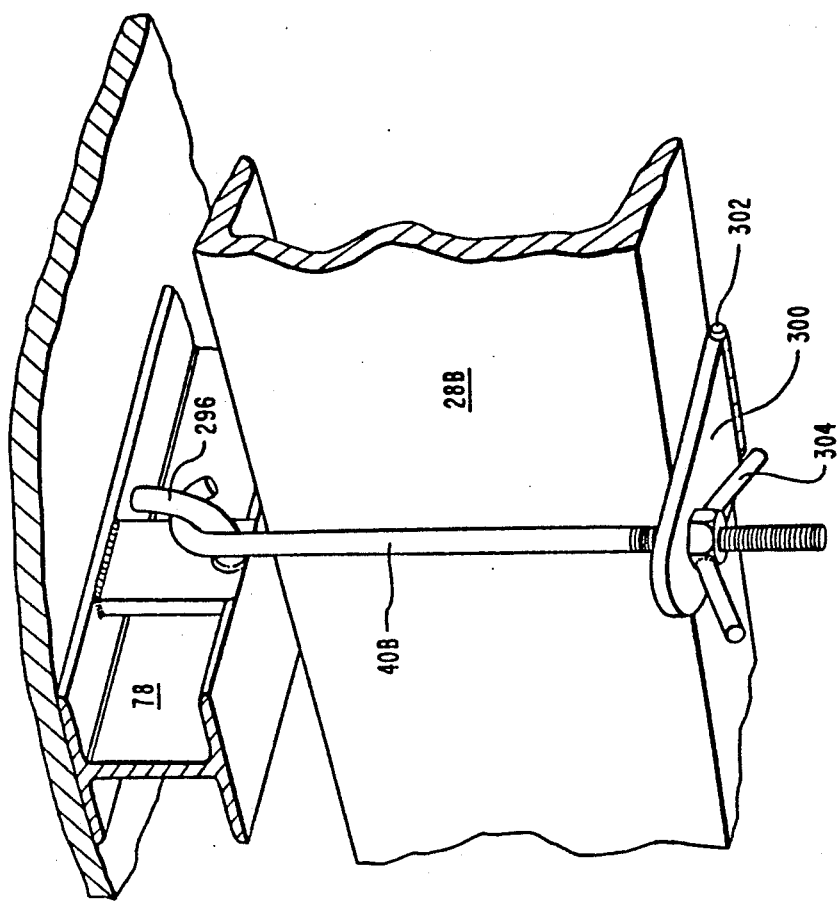
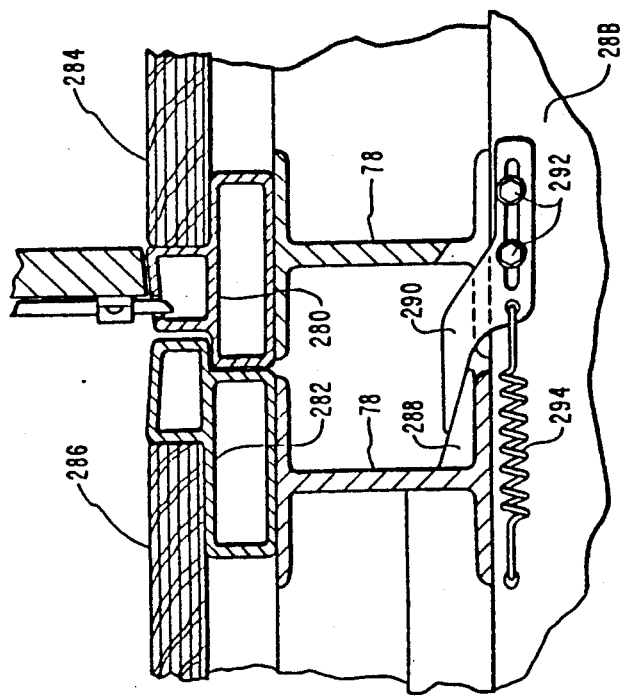
FIG. 17
FIG. 16

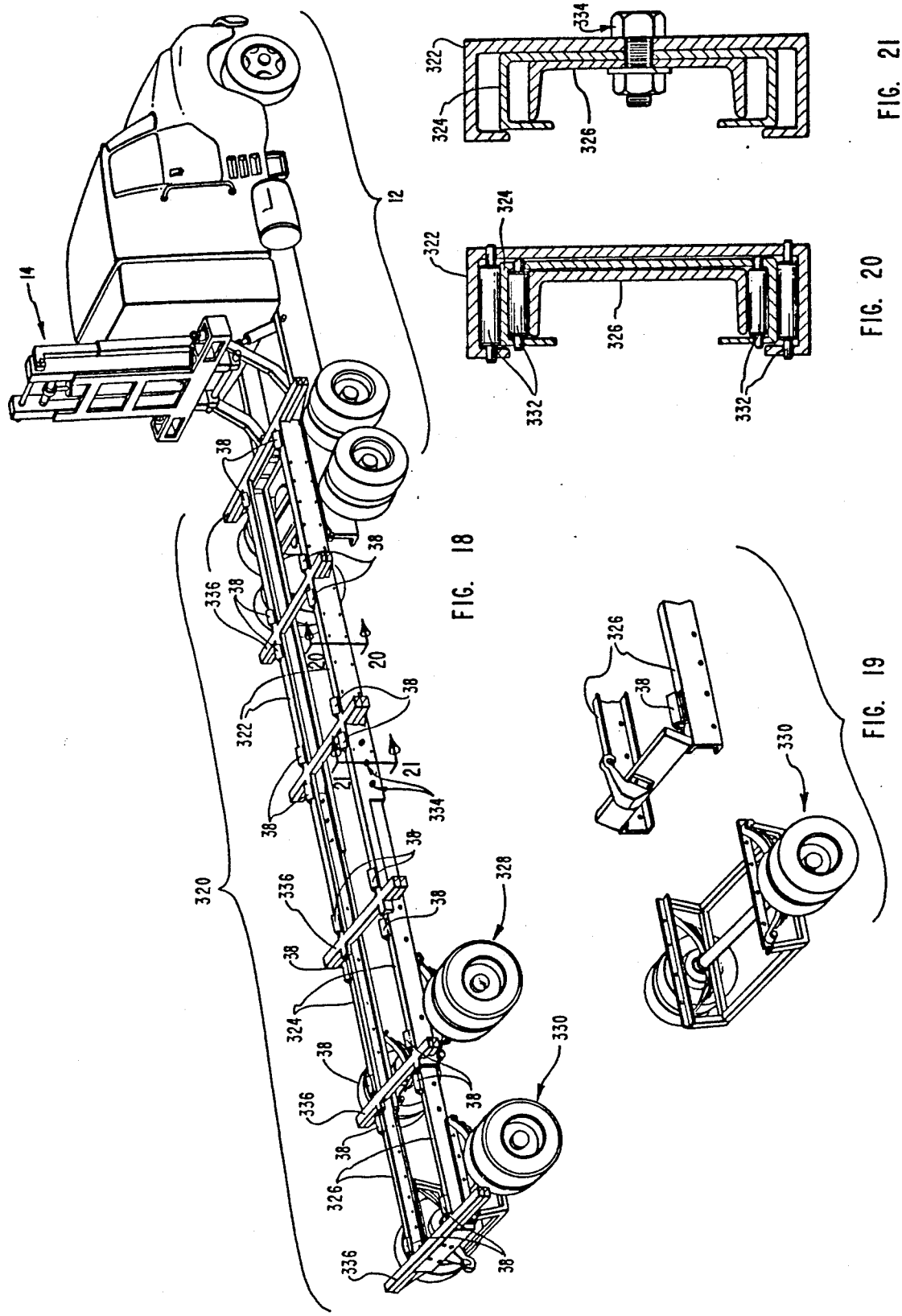

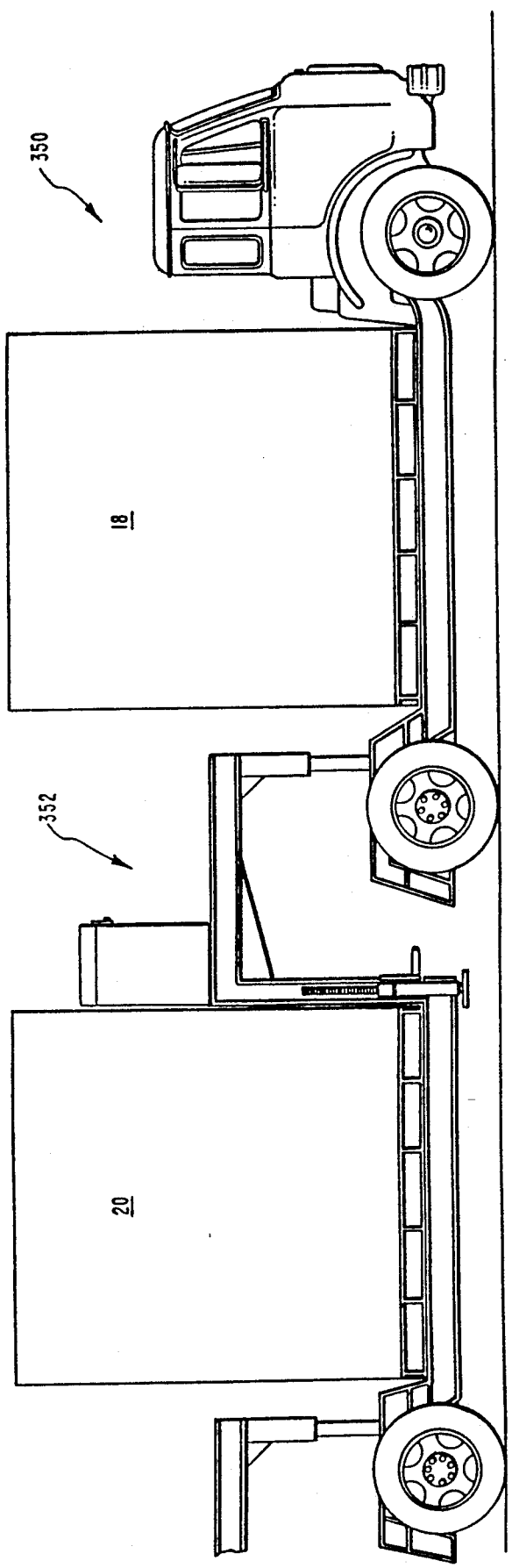
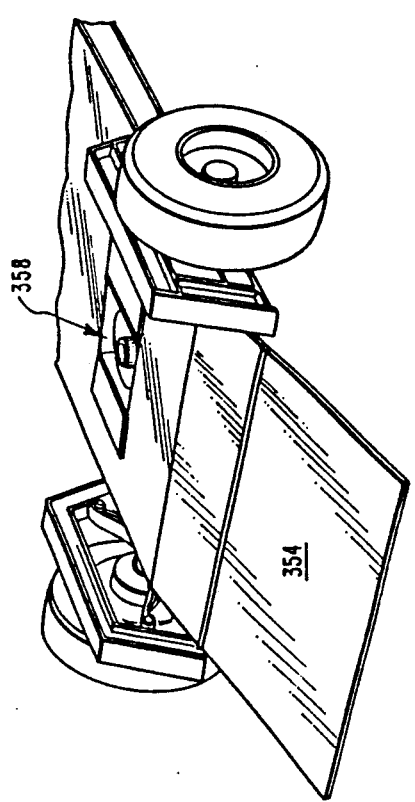
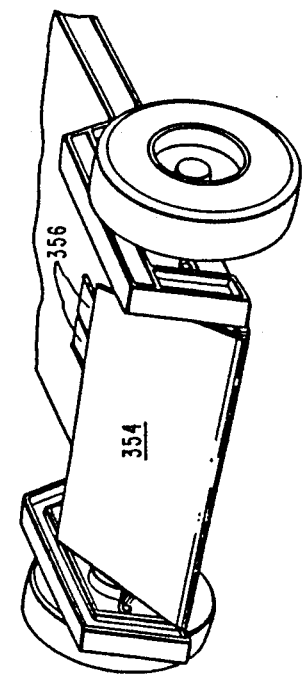
FIG. 22
FIG. 23B
FIG. 23A

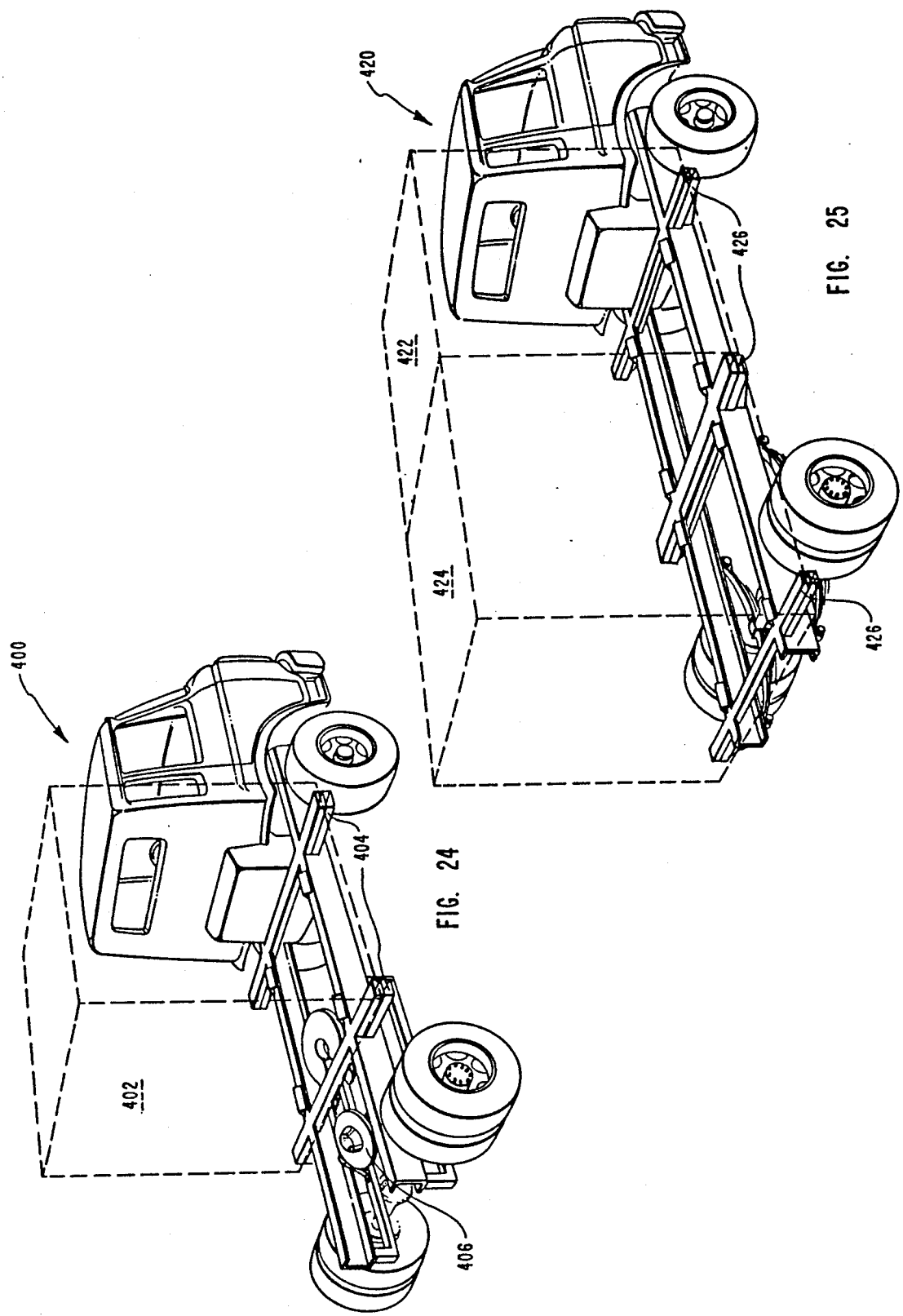

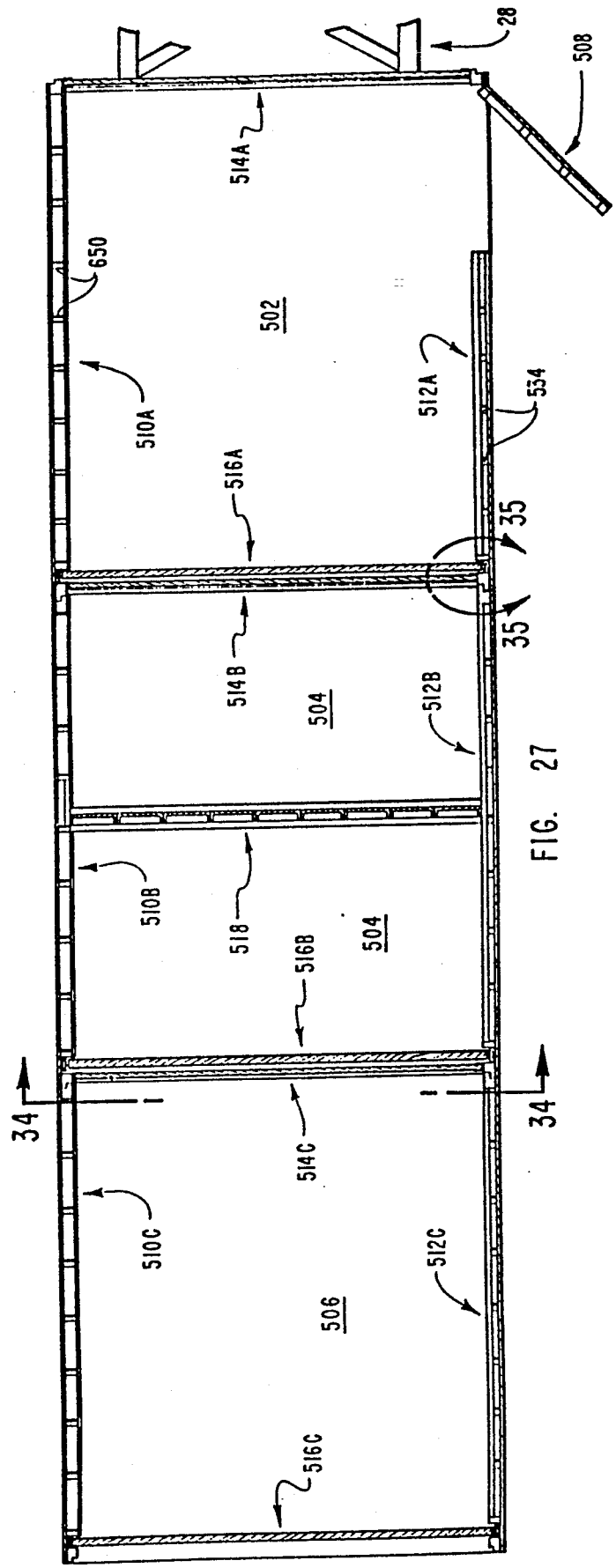

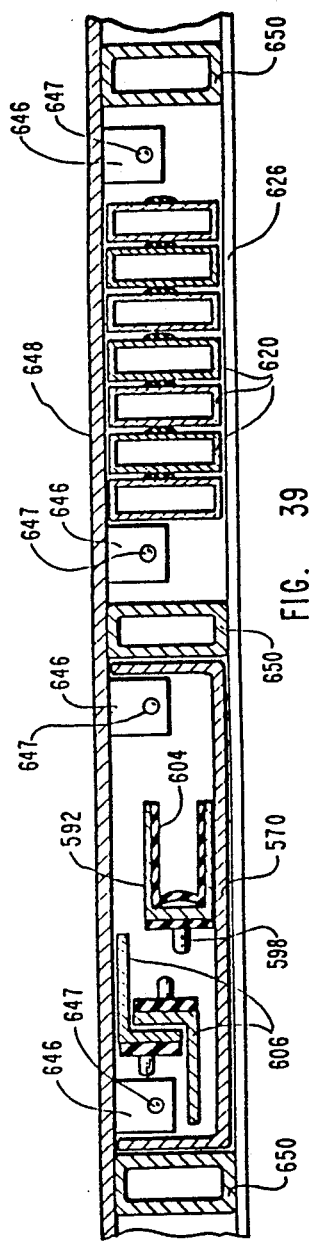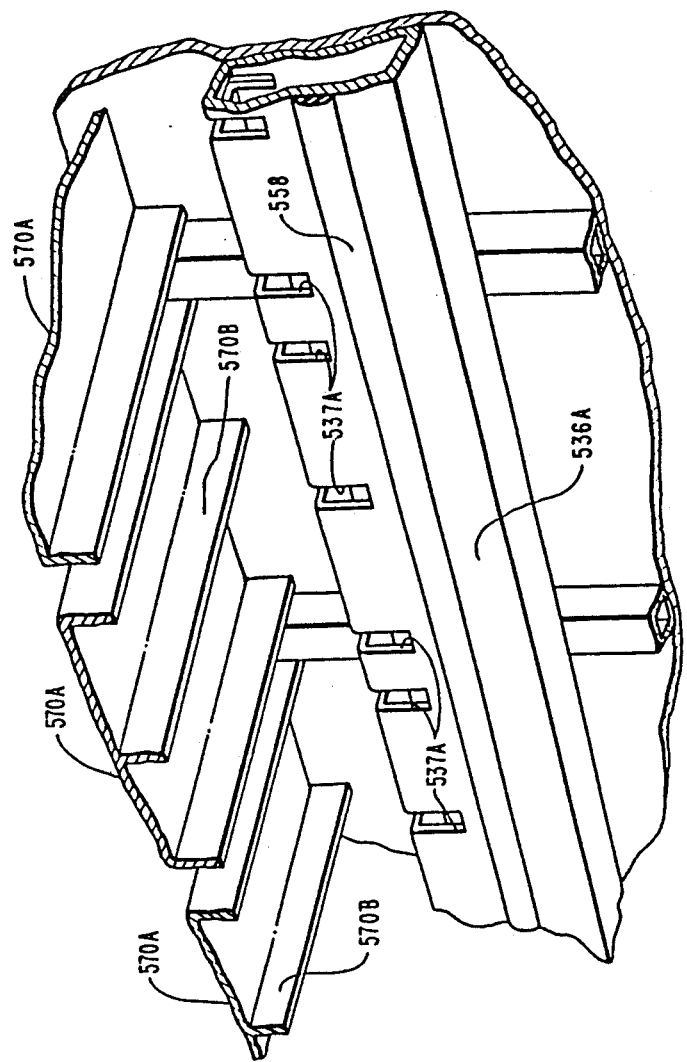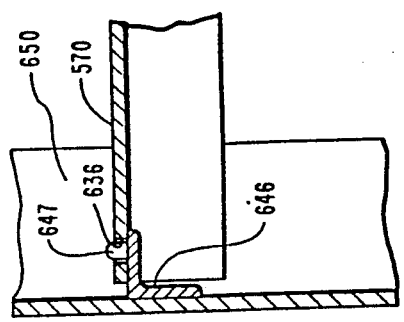
FIG. 39
FIG. 40
FIG. 38

SECTION VAN TRAILER HAVING DETACHABLE AND INTERCHANGEABLE COMPARTMENTS FOR TRANSPORTING BOTH HOUSEHOLD BELONGINGS AND COMMERCIAL FREIGHT

RELATED APPLICATIONS

This application is a divisional application of U.S. patent application Ser. No. 07/948,333 filed on Sep. 18, 1992, now abandoned, which is a divisional application of U.S. patent application Ser. No. 07/708,893 filed on May 31, 1991, now abandoned, which is a continuation-in-part of U.S. patent application Ser. No. 07/460,655 filed on Jan. 3, 1990, now abandoned, entitled SECTIONAL VAN TRAILER HAVING DETACHABLE, INTERCHANGEABLE COMPARTMENTS CAPABLE OF FORMING A CONTINUOUS VAN BODY WITH ACCOMPANYING SYSTEM FOR FORMING SHELL DECKS AND PARTITION WALLS WITHIN CARGO HOLDING SECTIONS which is a continuation-in-part of U.S. patent application Ser. No. 07/296,575 filed on Jan. 12, 1989, now abandoned, for a SECTIONAL VAN TRAILER HAVING DETACHABLE, INTERCHANGEABLE, COMPARTMENTS CAPABLE OF FORMING A CONTINUOUS VAN BODY.

BACKGROUND

1. The Field of the Invention

This invention relates to transportation equipment used to move goods such as commercial freight and household belongings.

2. The Background Art

An efficient transportation system is essential to the operation of modern industrial societies. During the past several hundred years, the most common methods of transporting goods and materials from one location to a distant location has progressed from animal-drawn wagons, to steam and diesel-driven locomotives, to today where millions of tons of goods and materials are carried upon highways by semitrailer and tractor rigs which have become familiar sights on the world's highways.

The conventional semitrailer and tractor rig (so named because the trailer relies upon the tractor to carry part of its weight) often comprises a trailer 48 feet long, 13 feet high, and 8.5 feet wide. Importantly, the total cost of operating a semitrailer and tractor rig usually varies little between the cost of operating a semitrailer which is only partially full and a semitrailer which is completely full.

Thus, by loading more items into a trailer before making a long-haul trip the cost of transporting each item to its destination will be lower than if fewer items were loaded into the trailer. In view of the foregoing, there is great incentive in the long-haul trucking industry to use the largest possible trailer and to fill the trailers to their capacity for each trip.

While much of the trucking industry is involved with the transportation of commercial freight, a significant and economically important portion of the trucking industry is concerned with the transportation of household belongings. Significantly, the above-mentioned economic considerations of completely filling a trailer before leaving on a long-haul trip also applies in the case of moving household belongings. However, the nature of moving a household belongings often makes it extremely difficult to completely fill a trailer of the type previously available in the industry, particularly on a return trip.

Like all customers of the trucking industry, household customers desire that their goods be picked up at their residence exactly at the scheduled time and delivered to their destination as soon as possible, or alternatively, at an exact date and hour. Commercial users of the trucking industry, in contrast to owners of household belongings, are often more willing and able to forgive delays in picking up and delivering fungible goods since individuals are often without furniture, cooking utensils, clothing, and personal belongings during the time that their goods are in transit. Moreover, the residential moving trade is extremely competitive and the residential customer's desire to have timely pickup and delivery works against having the lowest possible operating costs for several reasons such has those summarized below.

First, moving household goods often requires that a tractor-trailer combination be driven directly to the customer's residence. Because of government regulation or practical constraints, often times a full-sized trailer cannot be taken directly to a residence located on narrow streets or driveways, or on streets having weight limits below the weight of a loaded trailer.

Second, it is usually the case that a residential customer does not have enough household belongings to fill an entire trailer previously used in the industry. Such a trailer is 48 feet long and holds approximately 17 average rooms of furniture. Thus, unless the customer is willing to pay for the use of an entire trailer, the remaining third, half, two-thirds, or more, of the trailer must be shared with one or more other customers. Unfortunately, sharing a trailer requires that the pick-up and delivery dates may not be those desired by one or more of the customers sharing a trailer. Also, sharing a trailer often causes the time period between pick-up and delivery dates for one customer to be longer than it otherwise might be.

Third, customers are always concerned about the security of their goods. Sharing a trailer with another unknown person raises questions in customers' minds concerning the security of their goods.

Fourth, since the trailers most often used in the past to move household belongings were particularly adapted to the task, moving commercial goods in such trailers was not feasible. Thus, movers of household belongings have in the past been required to ensure that the trailer return from a distant location with another load of household belongings, but as a practical matter always partially empty. Alternatively, if the tractor and trailer were required elsewhere before a load could be arranged, the trailer made the return trip empty at great expense to the operator.

Another difficulty which is encountered when moving household goods is the cumbersome practice of building shelf decks (hereinafter sometimes referred to as "decks") and partition walls (hereinafter sometimes referred as "partitions") within cargo holding sections of trailers and truck bodies.

Decks are horizontal surfaces built within a cargo holding section to support goods placed thereon. For example, a customer may desire to move an automobile with other household goods. In such a case, the automobile can be loaded on the floor of the cargo holding section and a deck built above the automobile and goods placed thereon. In this way the high vertical space available in a cargo holding section can be used to full advantage. Moreover, decks are often built to avoid stacking goods upon each other which might cause damage to household goods.

Partition walls are built to divide a cargo holding section, such as a semitrailer, into separate compartments so that the goods of one customer are not mixed with those of other customers who must share a whole semitrailer on a long haul trips. Constructing partitions within cargo holding sections assures customers that their goods will be secure while in transit.

Prior art decks and partitions are rigged together using sheets of plywood and dimensional lumber. The plywood and dimensional lumber must always be available and carried with the trailer since the need for a deck or a partition is often unascertainable until reaching a loading site at a residence and the amount and type of household goods to be loaded is determined.

Trailers used to move household goods are regularly equipped with enclosed "pods" attached to the trailer frame under the cargo holding sections and are adapted to hold the plywood and dimensional lumber. Trailers used for hauling commercial freight are not provided with such pods and if they are used to move household belongings the material used to rig decks and partitions must be stored in the cargo carrying section thus reducing the amount of valuable room available for carrying profit generating cargo.

Thus, it will be realized that trailers adapted for hauling commercial freight are poorly equipped to haul household goods. Even further, the plywood and lumber which is used to build decks and partitions in household moving trailers is inherently weak and has a relatively short useful life compared to the strength and life of the trailers used to haul the goods.

In view of the foregoing difficulties and drawbacks found in the previous state of the art, it would be an advance in the art to provide a semitrailer which may be sectioned into a plurality of individually securable compartments and also allow the compartments to be interconnected to form a full-length continuous van body. It would also be an advance in the art to provide a semitrailer which includes a plurality of individual compartments, each compartment being capable of being off-loaded from the trailer, left at a location for loading, and later attached again to the trailer.

It would be another advance in the art to provide a plurality of cargo compartments which may be interchanged and secured to any number of properly equipped semitrailers. It would be a further advance in the art to provide a semitrailer which may be sectioned into individual compartments which are adapted to carry both household belongings and commercial freight.

It would be a still further advance in the art to provide a sectional van trailer and an accompanying tractor-mounted hoisting apparatus which allows a lone individual to both remove and secure an individual cargo compartment to the semitrailer at, for example, pick-up and drop-off locations and locations where cargo compartments are transferred from one semitrailer to another or are placed into storage. It would be yet another advance in the art to provide a semitrailer which protects its contents from contamination by dirt and moisture and securely holds the goods contained therein.

It would be a further advance in the art to provide a system and method for building decks and partitions within various cargo holding sections which is more efficient than prior art systems for building decks and partitions. It would be a still further advance in the art to provide a system and method for building decks and partitions within cargo holding sections which allows the deck and partition building materials to be stored with the cargo holding section wherever it may travel and without taking up cargo holding space. It would be yet another advance in the art to provide a system and method for building decks and partitions wherein the decks and partitions have a long usable life and are strong and durable.

OBJECTS AND BRIEF SUMMARY OF THE INVENTION

In view of the foregoing, it is a primary object of the present invention to provide a trailer wherein the trailer may be sectioned into a plurality of individually enclosed compartments which are removably secured to a trailer frame.

It is another object of the present invention to provide a trailer wherein a plurality of individual compartments may be selectively removed from or attached to any number of properly equipped trailer frames.

It is still another object of the present invention to provide a trailer which is adapted to haul both household belongings and commercial freight.

It is yet another object of the present invention to provide a trailer having individual sections which are individually securable and which protect their contents from contamination by moisture and dirt.

A still further object of the present invention is to provide a sectional van trailer and an accompanying hoist apparatus which allows a lone person to remove individual compartments from, or secure them onto, any of a number of properly equipped trailer frames or truck frames.

It is a still another object of the present invention to provide a sectional van trailer which may be interconnected to form a continuous van body useable as a conventional van trailer and which includes a virtually flat van floor and straight walls thus allowing a fork lift to be maneuvered therein.

It is a further object of the present invention to provide a system and method for building decks and partitions within various cargo holding sections and in individual cargo compartments which may be set up more efficiently than prior art system for putting together decks and partitions.

It is a still further object of the present invention to provide a system and method for building decks and partitions within cargo holding sections which allows the deck and partition building materials to be stored with the cargo holding section wherever it may travel and without taking up valuable cargo holding space.

It is a yet further object of the present invention to provide a system and method for building decks and partitions wherein the deck and partition components have a long usable life and are as strong and durable as the materials used to construct the cargo holding section in which they are used.

These and other objects of the invention can be learned from the following disclosure and from the practice of the invention.

Briefly stated, the present invention includes a plurality of van section means, or cargo compartments, which are each completely enclosed and which may be individually removed from a trailer frame and left at a location for loading or unloading. Each van section means provides a secure housing for its contents which protects its contents from contamination by moisture and dirt present in the surrounding environment as well as preventing theft of the contents.

When loading or unloading of each van section is complete, the van section may be hoisted onto a trailer frame, and secured thereto. The trailer frame includes a trailer hitching means such as one of many available in the art. Once the van sections are secured to the trailer frame, the combination is suitable for transportation on major freeways and highways. When attached to the trailer frame, a plurality of van sections, or van section means, are not merely containers which are placed on a trailer, but rather function together to form a strong, lightweight, and secure sectional van trailer. Each van section includes means for attaching the van section to an adjacent van section to provide strength not otherwise attainable with the same tare weight.

The van sections or cargo compartments of the present invention each individually include means for interconnecting adjacent van sections. For example, a first door means and a second door means of any two adjacent van sections may be opened to create a continuous van body or cargo space which may be loaded as any other van trailer.

When a van body is formed, the interior floor, wall, and ceiling surfaces are substantially straight and are without any disrupting obstructions. Also, just as the individual van sections provide a secure weather-tight housing for the items contained therein, when a continuous van body is created by interconnecting two or more sections, the joints between the two sections are weather-tight to protect the goods contained therein. Also, when attached to a trailer frame, the van sections interengage with each other to form a rigid, durable structure.

The trailer frame for use with embodiments of the present invention can be provided with a means for extending and retracting the length of the trailer frame. Thus, the overall length of the tractor/trailer combination, and the number of van sections which can be secured to the trailer frame, can be varied according to the needs of the user and to comply with government regulations.

While many other structures could be used, it is preferred that the door means used at the rear of the van sections comprise either a swinging door having a double articulating hinge or a roll-up door. The roll-up door preferably comprises a door support which acts to prevent damage to the door when the door is in the open position, and is jostled about, while the trailer is in motion.

The double articulating hinge allows the swinging door to assume a closed position, an open loading position, or an open van position. In the open van position, the swinging door is secured against the interior wall of the van section so that the continuous van body space is unobstructed.

In order to provide the present invention with the greatest versatility, a hoisting means is provided to allow a lone person to lift the individual van sections onto, or off from, any properly equipped trailer or truck frame. In one embodiment, a hoisting means is mounted on the rear of a tractor with the mast of the hoisting means being moved between an operating position and a transport position by a means for moving the mast.

A lifting means interconnects an individual van section to the movement means attached to the mast. The lifting means preferably includes a pair of detachable fork blades which are adapted to interconnect the hoist apparatus to the van section on many types of surfaces, even on uneven or sloping terrain. Using the lifting means and the hoisting means, the van section may be lifted off the trailer frame or the ground and moved about by a lone person maneuvering the tractor.

Also included in some embodiments of the present invention are structures for building shelf decks and partition walls within the cargo compartments. When decks and partitions are to be constructed, a plurality of planar units are provided all of which preferably have the same dimensions and thus are interchangeable. Means for removably supporting a plurality of the planar units to form a deck are provided within the cargo compartment or other cargo holding section of a freight hauling vehicle.

The planar units may be used to build horizontal decks within the cargo compartment at any one of several preselected vertical positions. The planar units provide a strong and rugged deck and have a long useful life.

Embodiments of the present invention also use the planar units and door units to form partitions within cargo hauling sections. The planar units used to form the decks and the planar units used to form the partitions may be the same or different in accordance with the present invention.

The planar units in the described embodiments are used to build vertical partitions separating a single cargo holding section or cargo compartment into two or more separate sections. Also provided in the described embodiments is a means for removably holding a plurality of planar units in a vertical position to form a partition wall. The planar units are rugged and provide a long useful life. As explained, the planar units may function as deck units or as partition units or the deck units and partition units may be fabricated so as to be dissimilar in some circumstances.

A means for individually storing each of the planar units is provided. The planar units are stored within the walls of the cargo compartment or other cargo holding section. When stored, planar units are stored within the cargo compartment with which they are used and do not protrude into the cargo space of the compartment thus avoiding taking up any valuable cargo space.

The present invention also includes a plurality of door panels, or door units, which are used to form a door to the cargo compartment or other cargo holding section. Means for storing each of the door units is provided so that the door units do not consume valuable cargo space. The door units, when used as a front door to the cargo compartment or other cargo holding section, form a secure and weather tight barrier to the entry of water and other contaminants into the cargo space. Means is also provided for removably holding the door units to form a partition wall within the cargo holding section.

By use of the inventive concepts of the present invention, a trailer results which is equally suitable for transporting household belongings and commercial freight and which provides the great advantage of allowing a plurality of individual van sections to be secured to, and removed from, any of a number of properly equipped trailer frames or the van sections may be interconnected to form a larger, continuous van body on any of said trailer frames.

BRIEF DESCRIPTION OF THE DRAWINGS

FIG. 5 is a perspective view showing the overall construction of the hoist apparatus mounted on the tractor.

FIG. 6 is an exploded perspective view showing the structures used to secure the fork blades to the hoist mast.

FIG. 7 is a cross-sectional view of the fork blade secured to the hoist mast.

FIG. 11A is a cross-sectional top view of another embodiment of the front swinging door which may be incorporated into each of the van sections described herein.

FIG. 11B is a cross-sectional perspective view of some of the structures used to lock the front swinging door of FIG. 11A into its closed position.

FIG. 11C is a partially cut-away perspective view of the front swinging door of FIG. 11A showing additional structures used to lock the door in its closed position.

FIG. 11D is a cross-sectional top view showing the front swinging door of FIG. 11A in greater detail.

FIG. 14 is an elevational view, partially in a cross-section, showing the structures used to attach the van sections to one another and to position the van section on the trailer frame.

FIG. 15 is a perspective view of another structure used to attach van sections together when secured to the trailer frame.

FIG. 16 is a cross-sectional view showing structures used to secure the van sections to the trailer frame.

FIG. 17 is a perspective view of another structure used to secure a van section to the trailer frame.

FIG. 18 is a perspective view of another presently preferred embodiment of the present invention including an extensible frame.

FIG. 19 is a perspective view showing the removable wheel and suspension assembly of the extensible frame illustrated in FIG. 18.

FIGS. 20 and 21 are vertical cross-sectional views taken along lines 20—20 and 21—21, respectively, of FIG. 18.

FIG. 22 is a side view of another presently preferred embodiment of the present invention wherein each van section is provided with an individual trailer.

FIG. 23A and 23B are perspective views showing the construction of the individual trailers illustrated in FIG. 22 in greater detail.

FIG. 24 is a perspective view of another presently preferred embodiment of the present invention.

FIG. 25 is a perspective view of yet another presently preferred embodiment of the present invention.

FIG. 27 is a top plan view of the van sections of the present invention with a removable deck and a removable partition built within the van sections.

FIG. 38 is a vertical cross sectional view of the deck support bracket and planar unit taken along line 38—38 of FIG. 37.

FIG. 39 is a horizontal cross sectional view of the wall of a van section taken along line 39—39 of FIG. 37 showing the storage positions of various components therein.

FIG. 40 is a perspective view of another embodiment of the planar units and deck support stringers of the present invention.

DETAILED DESCRIPTION OF THE PREFERRED EMBODIMENTS

The following disclosure provides a description of the presently preferred best known modes for carrying out the inventive concepts of the present invention. It is to be understood, however, that the inventive concepts claimed herein may be carried out and embodied in many different structures with the embodiments specifically illustrated herein representing the presently best known mode for carrying out the invention.

As previously discussed, and as is well-known in the industry, it is a goal in the trucking and moving industry to load as much as possible into a trailer before beginning a long-haul trip and also to travel the most direct route to the destination. In this way, the cost of transporting each item being hauled is lower than if fewer items are transported using the same trailer, tractor, and driver.

For example, with the present invention it is possible to much more efficiently move household belongings on long-haul trips than previously possible. This is due to the interchangeability of the cargo compartments, or van sections, which will be described shortly. Using the present invention, compartments loaded with goods destined for a variety of widely scattered locations may be transported to a regional or central hub and grouped with other compartments having destinations all on the way to the final destination. Thus, the circuitous routes often taken by moving trucks carrying the belongings of three to five people is avoided resulting in lower costs, fewer delays, and more satisfied customers. As will be appreciated by those familiar with the industry after understanding the present invention, it is a very significant advantage inherent in the present invention to be able to interchange, or transfer, compartments from one trailer to another either at a terminal or any location along a route.

Significantly, both governmental regulation and practical considerations limit the maximum dimensions and the gross weight of a vehicle operating on public roads. Because the maximum dimensions and gross weights are often limited by legal regulation, it is important that the trailers themselves be as light as possible in order to maximize the weight of cargo which can be carried. It is also important that the structure of the trailer allow the maximum possible interior volume without exceeding the height, width, and length restrictions placed on trailers traveling over public roads.

The considerations of minimizing trailer weight and maximizing useable trailer interior volume must be balanced against providing a trailer which is strong and durable. Since trailers must withstand the rigors of long use on the highway, maximizing the profit obtained by a trucking concern requires that a trailer be designed to provide the greatest possible cargo capacity while still providing safe and reliable operation. The present invention provides a trailer which better meets these considerations than previously available apparatus.

Figure 1:
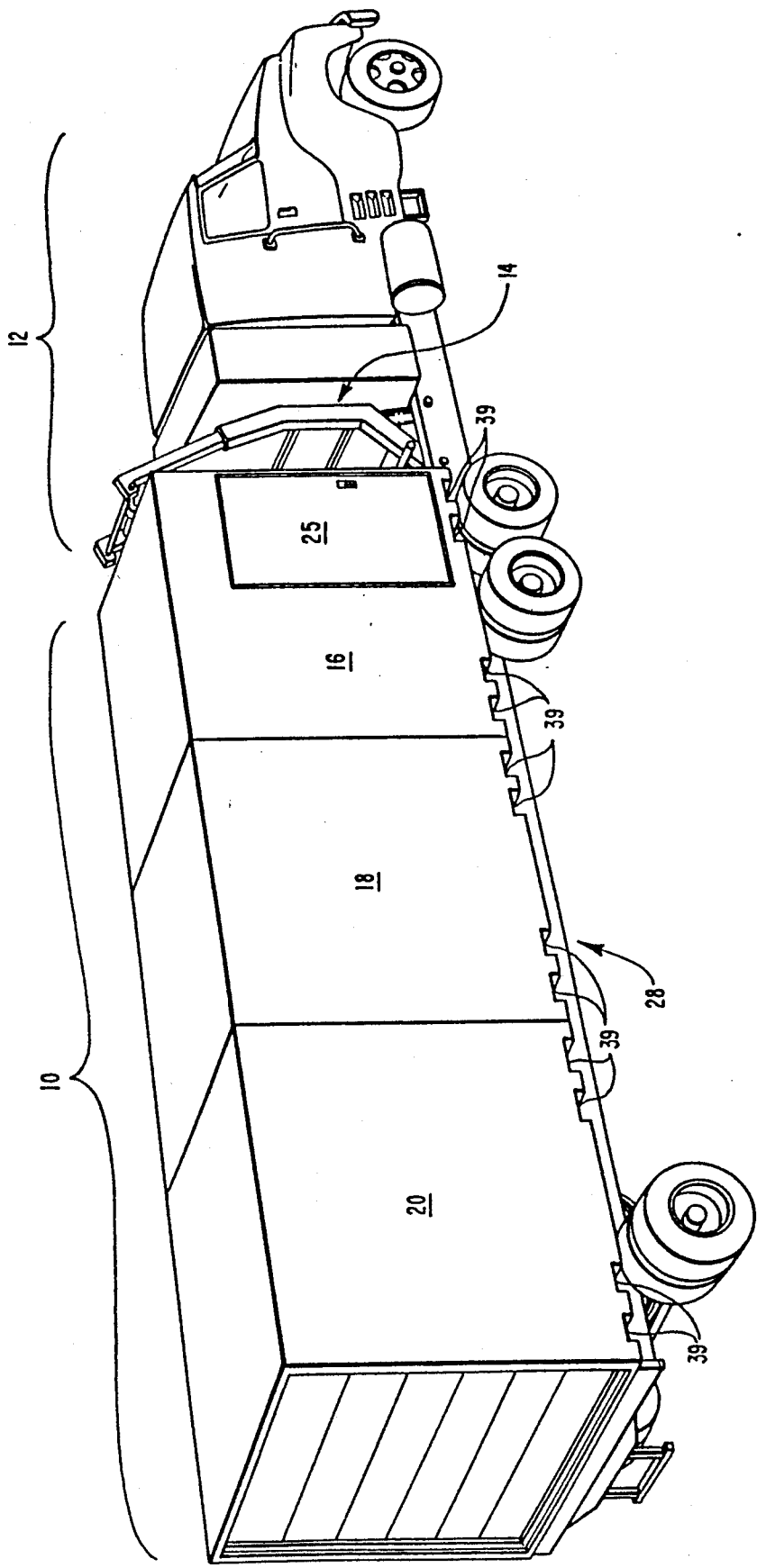
FIG. 1 is a perspective view of the presently preferred embodiment of the sectional van trailer of the present invention.

One presently preferred embodiment of the present invention is illustrated in the perspective view of FIG. 1. In FIG. 1, a tractor of the type generally used to pull semitrailers, is generally indicated at bracket 12. The tractor 12 may be one of many models well-known and commonly available in the industry.

Also represented in FIG. 1 is a trailer embodying the inventive concepts of the present invention. The trailer of the presently preferred embodiment is designated by bracket 10. The trailer 10 is a semitrailer which may be hitched to the tractor 12 by the conventional king pin hitching structure provided on the tractor 12 generally available in the industry.

As represented in FIG. 1, the trailer 10 is divided into a first van section 16, a second van section 18, and a third van section 20. Each of these van sections, or van section means, 16, 18, and 20, rest upon a lightweight trailer frame, hidden from view in FIG. 1 but generally designated 28, and may be removed from, and secured to, the trailer frame 28 or secured to any other trailer frame equipped according to the present invention.

The use of a lightweight trailer frame allows more weight to be carried as cargo before the maximum weight limit is reached, as compared to equivalent sized containers carried on a conventional flat bed trailer or heavier trailer frame. Importantly, a conventional flat trailer would be impractical to use with the van sections described herein because of weight and height restrictions imposed upon the trucking industry. More details concerning the trailer frame and the structures used to secure the van sections, which may also be referred to as cargo compartments, will be provided later.

In order to allow a lone person to remove the van sections (16, 18, and 20) from, and attach them to, the trailer frame a hoist apparatus, or hoisting means, generally designated 14 in FIG. 1, is provided. The hoist apparatus 14, mounted on the tractor 12, allows a lone truck operator to remove one or more van sections from the trailer frame leaving the van section, or sections, at a loading, unloading, transfer, or storage location and then later resecuring the van section onto a properly equipped trailer frame once the loading, unloading, or transfer is complete. As represented in FIG. 1, the trailer frame of the presently preferred embodiments must be provided with structures, such as brakes, lights, suspension, coupling devices and so forth, which are well-known to those skilled in the art.

Figure 2:
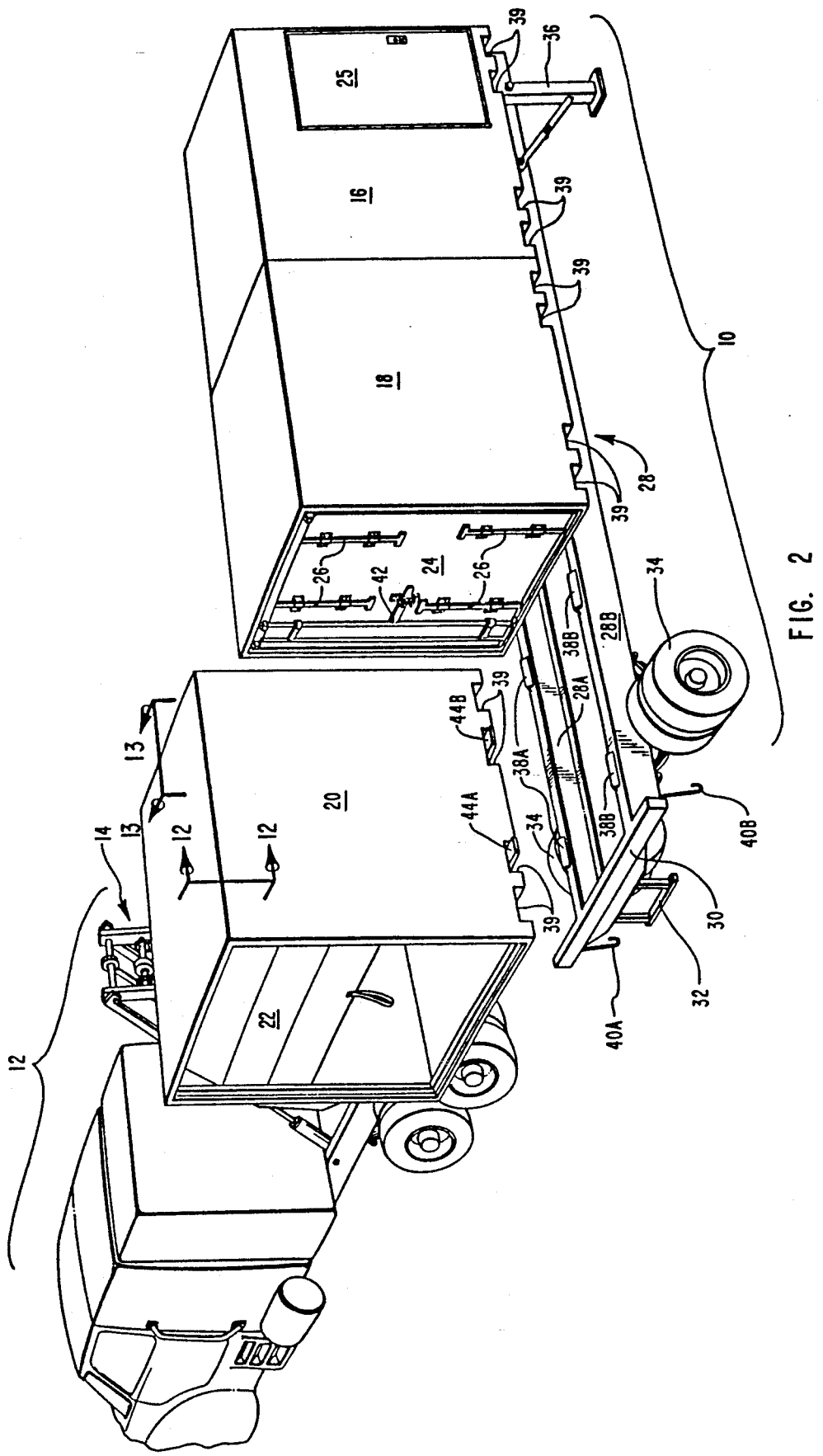
FIG. 2 is a perspective view of the embodiment illustrated in FIG. 1 showing a van section being removed from the trailer frame by a hoist apparatus mounted on the tractor.

FIG. 2 provides a perspective view showing the third van section 20 being removed from the trailer frame 28 using the tractor mounted hoist apparatus 14. The trailer frame 28 represented in FIG. 2 includes two frame elements 28A and 28B interconnected by a end frame element 30 provided with a bumper 32. The trailer frame 28 is supported on wheels 34 by way of a suspension apparatus which may be readily obtained or designed by those skilled in the art.

In the embodiment represented in FIG. 2, the trailer 10 has been unhitched from the tractor 12 and the trailer 10 left free-standing by way of two "landing leg" jacks, one of which is represented at 36, mounted near the forward end of the trailer frame 28. As will be fully appreciated shortly, one of the primary advantages of the present invention is that the individual van sections may be removed from the trailer frame and left at a location for loading or unloading. Furthermore, each van section 16, 18, and 20 provides a secure container for the goods disposed inside. Thus, the van sections protect their contents from theft and contamination by moisture and dirt.

Importantly, when the van sections are secured to the trailer frame and attached to each other, as described below, they act together to create a strong and reliable van trailer which may be left divided into individual van sections or, by moving the interior doors to their open van position, may be configured as a continuous van body with two or more van sections interconnected. Once interconnected as a continuous van body, the trailer may be loaded as any conventional van body trailer.

While the embodiment represented in FIG. 2 preferably includes three van sections, 16, 18, and 20, it is to be understood that the present invention may include more or less than three van sections. Moreover, if necessary, it is possible to secure only one or two van sections, for example van sections 16 and 18 to the trailer frame for transporting goods on a short haul trip. Since, however, part of the trailer frame's strength is derived from the van sections attached thereto, the weight carried and length of a trip are limited when the trailer frame does not have a full complement of van sections attached thereto.

In some applications, it may be preferable to permanently attach the first van section 16 to the trailer frame 28. By permanently attaching the first van section 16 to the trailer frame 28, the structure of the first van section 16 may be used to strengthen and add rigidity to the trailer frame 28. Thus, the weight of the trailer frame may be reduced even further. Furthermore, if the first van section 16 is permanently secured to the trailer frame 28, the forward end of the first van section 16 may be fabricated without a front door. Thus, any difficulties which may accompany placing a door on the front end of the trailer where it is often exposed to penetrating moisture while moving at highway speeds, can be avoided.

Nevertheless, embodiments of the invention may be designed to serve in applications where it is extremely advantageous to provide van sections which are completely interchangeable with one another and which may be secured to any trailer or truck frame equipped according to the present invention. For example, a number of van sections may be located in each city in a country. When necessary, a single van section may be individually delivered to a customer for loading (using single van section trailers or truck frames to be described later herein) and then picked up by a long-haul rig using the embodiment illustrated in FIGS. 1 and 2. Thus, in such applications a door is provided on both ends of each section to allow any van section to assume any position on a trailer frame. Importantly, appropriate sealing and weatherproofing structures are provided at each door as hereinafter described.

Importantly, in some localities the parking of a full-length trailer may be difficult if not impossible. By using the embodiments of the present invention, the full-length trailer may be parked a distance away from the desired loading and unloading location and a van section, such as van section 20 in FIG. 2, may be removed from the trailer frame and positioned in a driveway, street, parking lot, or any other convenient loading location. Once the van section 20 has been loaded, which may be several hours or several days after the van section is dropped off, the van section 20 may be secured to the same or to a different trailer frame for transportation to the destination.

Represented in FIG. 2 is a swinging door 24 which may on some embodiments be provided on both ends of any van section. The swinging door 24 is provided with sliding bolts 26 and a latch apparatus 42, both of which are found on such doors available in the industry. Alternatively, a roll-up door may be incorporated into the van sections as represented at 22 on the rear end of van section 20. Also, as illustrated in FIG. 2, one or all of the van sections may be provided with a side door 25. More information concerning both the swinging doors 24 and the roll-up door 22 which are adapted for carrying out the present invention will be provided later.

In order to ensure that each of the van sections are properly positioned on frame elements 28A and 28B, positioners 38A and 38B are provided on the upper surface of each frame element 28A and 28B. The positioners 38A and 38B engage complementing structures on the bottom of each van section which will be described later.

The van sections are also fabricated with cut-out portions 39 to provided clearance for the positioners when the van sections are removed from, or placed onto, the trailer frame as will be described later. Also represented in FIG. 2 are hold down hooks 40A and 40B which, in cooperation with other structures, serve to secure the third van section 20 onto the trailer frame 28. More information concerning the just mentioned structures will be provided shortly.

Represented in FIG. 2 adjacent the lower edge of van section 20 are a pair of fork blades 44A and 44B preferably positioned within tubular structures located under the floor of the van section 20. It will be appreciated that the inventive concept of allowing each van section to be removed and left at location for loading, unloading, transfer, or storage provides advantages and flexibility not before known in the industry.

Figure 3:
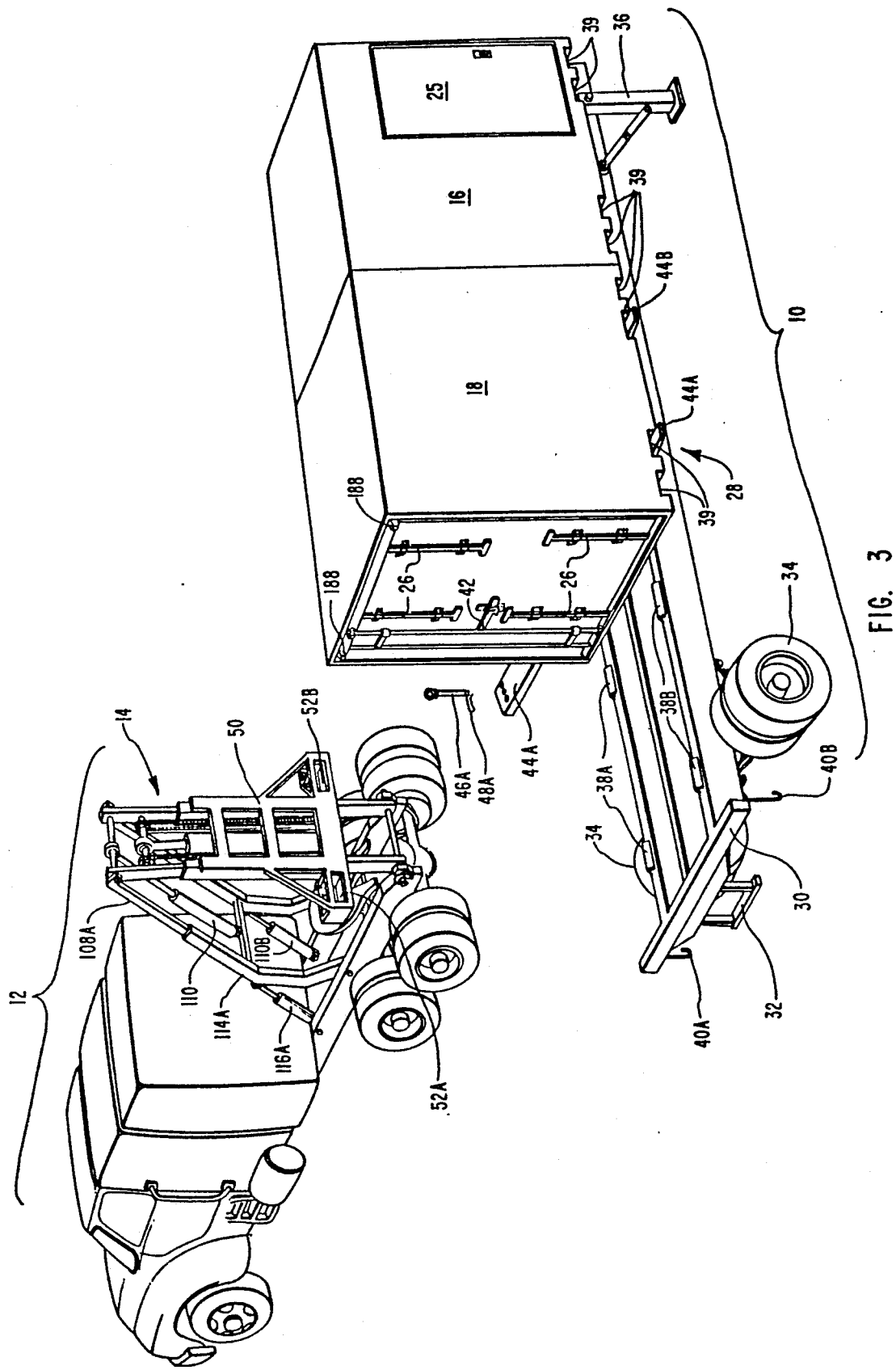
FIG. 3 is a perspective view of the embodiment illustrated in FIG. 2 with the components of the hoist apparatus being brought into position to lift a van section from the trailer frame.

In FIG. 3, the trailer frame 28 is shown with two van sections (16 and 18) secured thereto with preparations being made to remove van section 18 from the trailer frame 28. In order to remove a van section from the trailer frame 28, the trailer 10 is unhitched from the tractor 12. The hoist includes a fork blade support 50 provided with two fork blade receptacles 52A and 52B.

In FIG. 3, the hoist apparatus is shown provided with four hydraulic rams which will be familiar to those skilled in the art. Among the functions served by hydraulic rams is the function of raising and lowering the fork blade support 50 and the function of moving the mast between a storage position and an operating position. More information concerning the hoist apparatus will be provided shortly.

When moving van section 18, or any other van section, using the hoist apparatus, fork blades 44A and 44B are first removed from their storage location on the tractor 12, and inserted under the van section floor, for example van section 18. Preferably, each van section is provided with two tubular structures, under the van section floor, each of which are adapted to receive one fork blade 44A or 44B.

Figure 4:
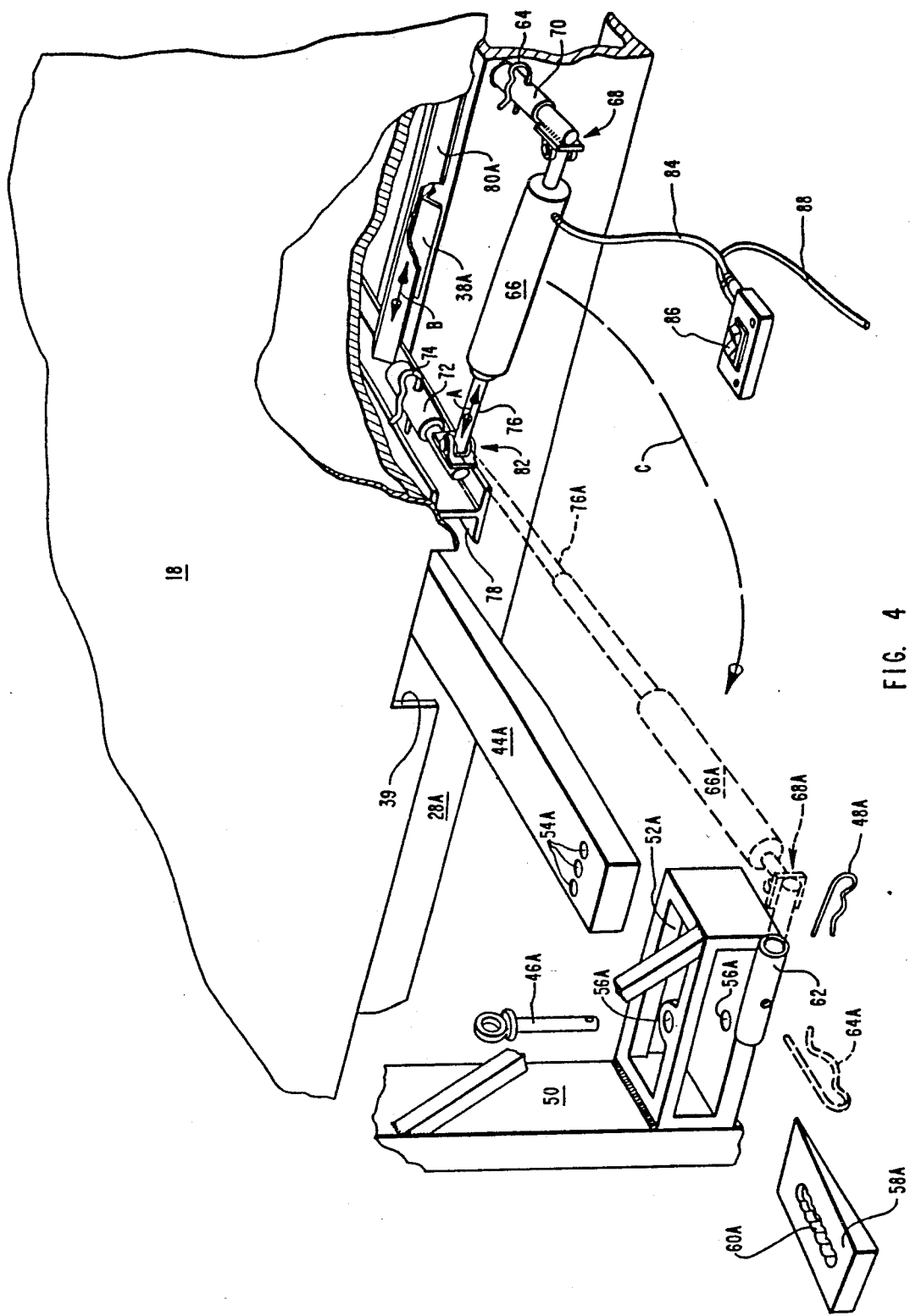
FIG. 4 is a partially cut away perspective view showing the apparatus used to secure the fork blades to the hoist mast and a hydraulic ram used to position the van section on the fork blades and the trailer frame.

Since the van sections form an interengaging van body when secured to the trailer frame and to each other, it is necessary to separate the van sections from each other using the procedure which can be best described in connection with FIG. 4. In FIG. 4, one of two identical hydraulic rams 66 is shown, each of which is preferably one of many bidirectional hydraulic rams available in the industry and well-known to those skilled in the art. The two hydraulic rams 66 are provided with fluid under pressure from a pump (not illustrated) mounted on the tractor 12 and conveyed to the hydraulic ram by fluid lines 84 and 88. The direction of the fluid flow, and the direction of the ram movement, is controlled by switch 86.

The tractor 12 is then backed up to a position perpendicular to the side of the van section, such as van section 18 in FIG. 3, so that the fork blade receptacles 52A and 52B will be closely aligned with the fork blades protruding out from the van section 18. As an aid to accomplishing this procedure, guide marks may be painted on the side of the van section to help the operator of the tractor find the proper position during backing.

As will be explained in greater detail shortly, each of the van sections interengage with each other to form a weather-tight and structurally stable van body. Thus, it is necessary to slide each van section apart from its neighbor before it can be removed from the trailer frame. As shown by the arrow labeled "B" in FIG. 4, each van section is able to slide longitudinally on the trailer frame due to the action of positioners (38A and 38B) and provided on the frame elements 28A and 28B and a corresponding receptacle (80A).

It will be appreciated that it may be advantageous to place friction-reducing materials on the contacting surfaces of the positioner 38A and receptacle 80A. With a receptacle being provided for each positioner (as shown in FIG. 3) the van sections may be slid together or pushed apart by one or both of the two hydraulic rams as necessary for securing the van sections to, or removing them from, the trailer frame.

As shown in FIG. 4, the fixed cylinder of each ram 66 is provided with a hinge assembly 68 which may be inserted into receptacle 70 and held in place by clip 64. Likewise, the moving rod 76 of ram 66 is provided with a hinge assembly 82 which is received by receptacle 72 attached to the van section and held in place by clip 74. Thus, as the moving rod 76 moves in the directions indicated by arrow A, van section 18 also slides in the corresponding directions indicated by arrow B. In this way, the van sections may be slid together or apart.

Before the van sections have been slid apart, the fork blades, such as 44A in FIG. 4, are inserted under the van section. Each fork blade is provided with a plurality of bores 54A as shown in FIG. 4. After the truck operator has positioned the tractor so that each fork blade receptacle, such as shown at 52A, is in alignment to receive the end of each fork blade 44A, the hoist mast is raised or lowered to position the fork blade receptacles 52A and 52B to receive each fork blade in turn. If the ground under the trailer and tractor is uneven or sloping, such as is common on normal streets, each blade may be inserted into its receptacle at a different vertical level from the other.

As will be appreciated by those skilled in the operation of conventional fork lift apparatus, the standard fixed, attached forks of a conventional fork lift could only be inserted under the floor of the van sections if both forks of the fork lift and the trailer frame itself are on the same horizontal plane on level ground. In practical use on city streets with hills, driveways, and gutters, and so forth, this is generally not the case. Hence the described detachable, individually aligned, and inserted fork blades are essential to the practical operation of individually aligned, and inserted fork blades are essential to the practical operation of the hoist apparatus.

As suggested in FIG. 4, after the fork blade 44A is received by the fork blade receptacle 52A, a wedge 58A is then positioned within the fork blade receptacle and post 46A is inserted through bores 56A, 54A and 60A. Thus, as will be more fully explained shortly, the fork blades are held securely in position during the hoisting of the van section.

Once the fork blades have been securely positioned, the truck operator can then raise the van section from off the trailer frame using the hoist. Preferably, however, for increased safety each of the fixed cylinder ends of the hydraulic rams 66 should be removed from receptacle 70 and swung in the direction of arrow C to the position represented at 66A so that the hinge assembly, in the position shown at 68A, is received by receptacle 62 on the fork blade support and secured in place using the clip shown at 64A. The operator may then lift the van section a few inches from off the trailer frame and then pull it securely against the hoist using both rams as necessary. When the van section is resting on the forks, one or both of the hydraulic rams 66A may then be used to pull, push, or hold, van section 18 on the fork blades. The rams 66 may also be used to place the van section onto positioner 38 when securing the van section back onto the trailer frame.

It should be realized that the structures represented in FIG. 4 may be used to move a van section between the trailer frame and the ground, a storage rack, or another trailer frame. It will be further appreciated that structures different than, or in addition to, those represented and described herein may be used to carry out the procedure, or equivalent procedures, herein described.

Further information concerning the structure of the hoist apparatus will be provided in connection with FIGS. 5-7.

As will be appreciated, the present invention advantageously provides a means for allowing a lone truck operator to handle the van sections. This need is met without requiring that a fork lift or other similar bulky device be transported with the embodiment. Importantly, the hoist apparatus of the embodiments may be easily operated and adaptable for a variety of conditions and terrain. For example, it is not uncommon to find a loading or unloading site that is on a narrow street, driveway, or on a hill or uneven ground. The hoist apparatus represented in FIGS. 5-7 allows efficient operation under all these conditions.

As shown in FIG. 5, a principal component of hoist 14 is a mast 100. The mast 100 may be one of many commonly available in the art for use with fork lifts or may be specifically constructed for use with embodiments of the present invention. The mast 100 is provided with a hydraulic ram 102 and other components, which serve as a movement means, and which provide the raising and lowering functions by way of chains 104 which are connected to fork blade support 50.

The hoist in FIG. 5 is shown in the operating position. When the hoist 14 is not being used, it assumes a position directly behind the cab of tractor as shown in FIG. 18. When not being used, the hoist takes up a minimum of space and, according to the procedure to be described, may easily be moved into the operating position.

As can be seen in FIG. 5, when the hoist 14 is in the operating position, the two mast securing posts, one of which is illustrated at 126B, are secured in place by corresponding cradle members and hooks, one of each being shown at 122B and 124B, respectively. As a safety feature, cradle members and hooks are provided with switches (not shown) which cause hydraulic rams 116A and 116B to remain operational until both cradle members and hooks have securely received both mast securing posts. Once both mast securing posts are received by the cradle members and hooks, the rams 116A and 116B are disabled so as to not interfere with the operation of ram 110. Ram 110 may then be used to tilt the mast 100 forward or backward while moving a van section.

Hoist support arms 114A and 114B are pivotally mounted on the tractor frame by way of bolts 118A and 118B. The position of hoist support arms 114A and 114B is controlled by hydraulic rams 116A and 116B. Each of the hydraulic rams 116A and 116B are pivotally connected to the tractor frame by bolts 120A and 120B, respectively.

Mast support extension arms 108A and 108B telescopically extend from, and retract into, mast support arms 114A and 114B as indicated by the arrow labeled "D" in FIG. 5. Mast support extension arms 108A and 108B are pivotally connected adjacent the top of the hoist mast 100 by way of bar 106. The extension or retraction of mast support extension arms 108A and 108B is controlled by ram 110. By extending or retracting ram 110 the extension or retraction of mast support extension arms is correspondingly carried out. The hydraulic ram 110 is anchored to the mast support arms 114A and 114B by cross member 112 as shown in FIG. 5. The mast support arms, the mast support extension arms, as well as the rams and other structures associated therewith, serve as a means for moving the mast between the operating position and the transport position and allow an operator to tilt the hoist apparatus back while moving a van section.

Thus, the structure represented in FIG. 5 allows a lone truck operator to move the hoist between a transport position and an operating position. It will be appreciated that those skilled in the art will readily be able to devise the appropriate hydraulic control systems necessary to implement the embodiment represented in the figures. Alternatively, other structures can be used to carry out the same or equivalent functions.

Due to the positioning of the hoist at the rear of the tractor, it would be very difficult for a truck operator to precisely position the fork blades 44A and 44B under the van section if the fork blades were rigidly attached to the fork blade support 50. Thus, it is preferred that the procedure previously described be adopted wherein the fork blades 44A and 44B are inserted under the floor of the van section to be moved and then bringing the tractor-mounted hoist into position. Preferably, fork blade receptacles 52A and 52B are fabricated large enough so that they present an easy target for the truck operator to maneuver the fork blades into. For example, the fork blade receptacles may have a cross sectional area equal to a range from about two to about eight times larger than the cross sectional area of the fork blades.

Incorporating oversized fork blade receptacles 52A and 52B into the fork blade support 50 is particularly important when the hoist is to be used on uneven or sloping terrain where precise positioning of the fork blade receptacles may be very difficult for a truck operator sitting in the tractor cab maneuvering the tractor backwards while looking in rear view mirrors. Thus, incorporating oversize blade receptacles 52A and 52B greatly facilitates efficient use of the hoist apparatus.

As represented in FIGS. 6 and 7, once the fork blade 44B has been properly positioned in the fork blade receptacle 52B, wedge 58B is also inserted into the fork blade receptacle 52B on top of the fork blade 44B as indicated by the arrow E in FIG. 6. The position of the fork blade 44B and a wedge 58B is adjusted until bores 60B provided in the wedge 44B, and bores 54 provided in the fork blade 44B, are in alignment with bores 56B provided in fork blade receptacle 52B. Once alignment is accomplished, a post 46B is inserted through all the bores and a retaining clip 48B is inserted as shown in FIG. 7.

In the foregoing described fashion, a structure is provided which allows the fork blades to be easily positioned and held in position while the van section is lifted and moved. Moreover, due to the flexibility provided by incorporation of oversized fork blade receptacles, the fork blades may be positioned under a van section, and the van section lifted by the hoist, even on rough, uneven, or sloping terrain. The incorporation of such a lifting means structure provides great advantages over previously available devices.

As indicated previously, one of the great advantages of the present invention is that one or more of the van sections may be interconnected to form a continuous van body comprising two or more van sections. In addition to providing a continuous van body, the present invention provides a structurally strong trailer body and frame by attaching each van section to an adjacent van section and securing each van section to the trailer frame itself.

As mentioned previously, each van section may be equipped with either a rear roll-up door or a rear swinging door. It will be appreciated that when a roll-up door is used, positioning the door to the open van position leaves an unobstructed doorway and allows for a continuous van body to be formed. When swinging doors are used in each of the van sections, the configuration represented in FIGS. 8A and 8B is preferably used.

Figure 8A:
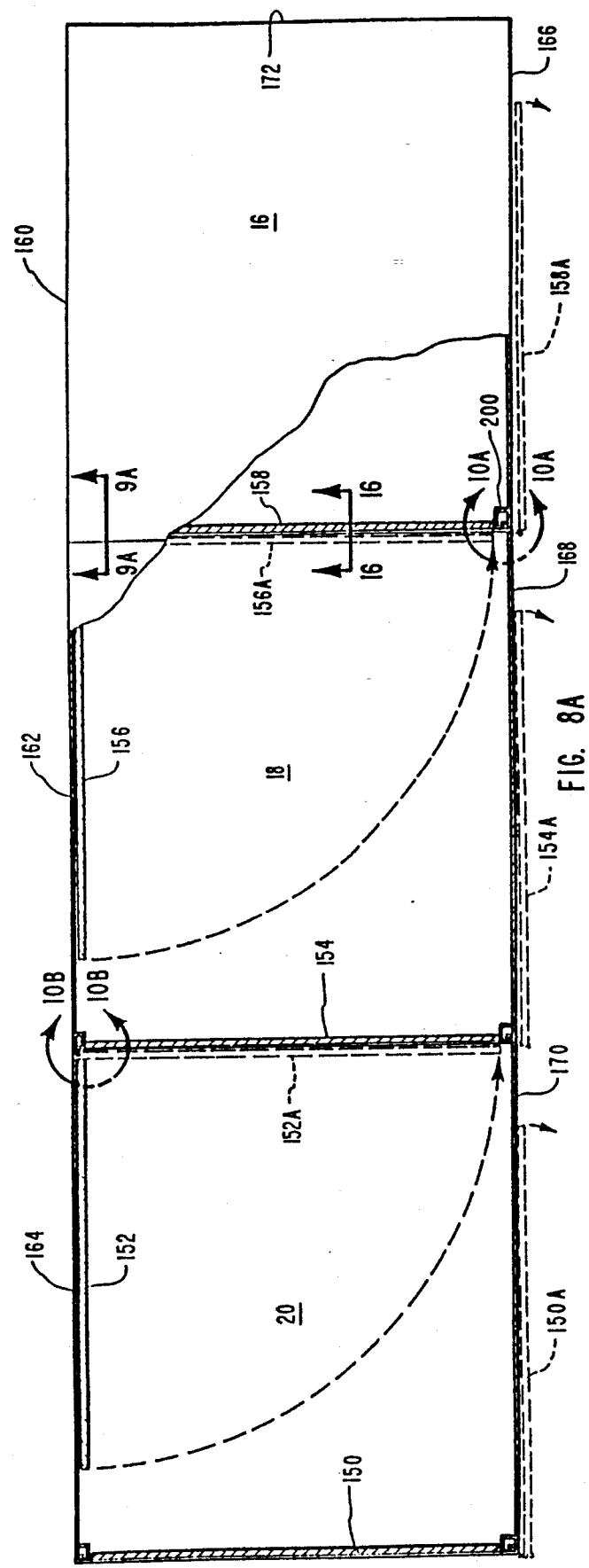
FIG. 8A is a top plan view of the embodiment illustrated in FIG. 1 showing the swinging doors in both a closed position and an open loading position.
Figure 8B:
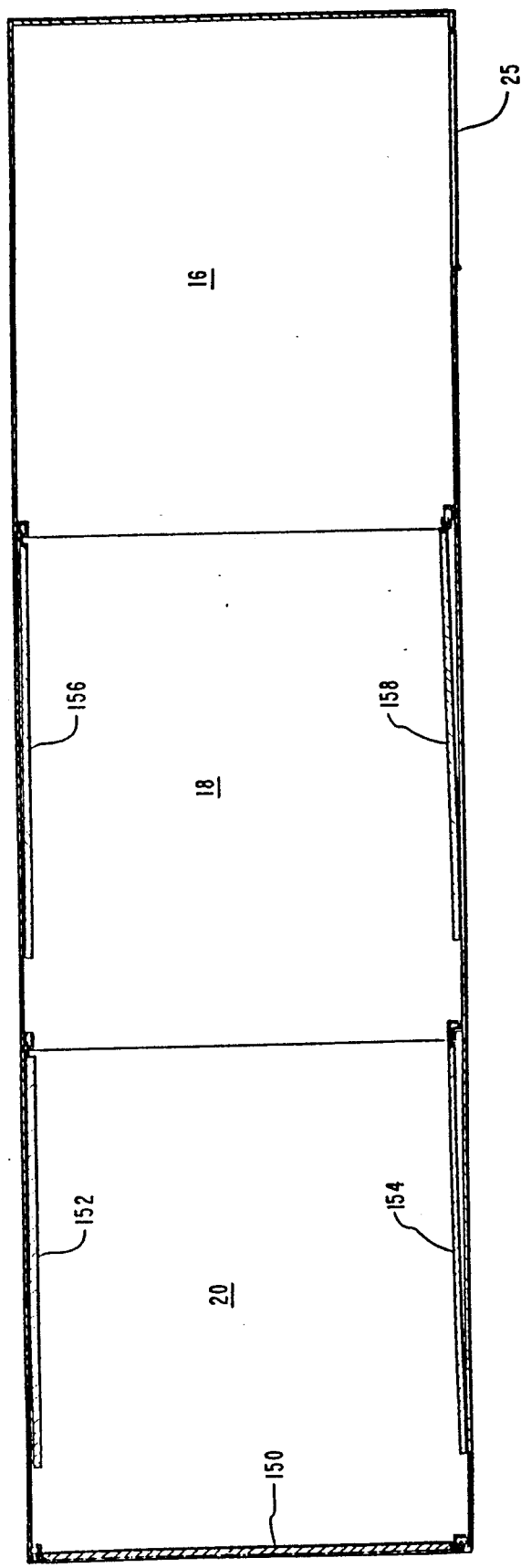
FIG. 8B is a top plan view of the embodiment illustrated in FIG. 8A showing all of the swinging doors in an open van position.

Represented in the top view of FIG. 8A are three van sections 16, 18, and 20. The first van section 16 of the illustrated embodiment is provided with a sealed front wall 172 and sidewalls 160 and 166. If desired, front wall 172 may be provided with an aerodynamic shape or shroud to decrease wind resistance. Alternatively, as previously mentioned, if the first section is to be interchangeable with all other van sections, it may be configured identically to van sections 18 and 20.

Preferably, the walls (160, 162, 164, 166, 168, and 170 as represented in FIG. 8A) of each van section are fabricated from a rigid, strong material such that a minimum of internal frame members are required. Most desirably, it is preferred that the material from which the walls are fabricated be sufficiently strong such that internal frame members are required only in the interior corners of the van sections.

Also, it is preferred that the walls and swinging doors of the van sections are equipped with conventional sockets which receive restraining bars and cargo securing straps. The restraining bars may then be used, in cooperation with sheets of material such as plywood, to form shelves and dividers within the van sections.

Each van section 16, 18, and 20 is provided with a rear door 158, 154, and 150, respectively. Each of the rear doors is shown in a closed position at 150, 154, and 158, and in an open load position at 150A, 154A, and 158A. Thus, it can be seen that the rear door of each van section can seal the rear opening of the respective van section when in the closed position. Each rear swinging door may also be swung outward and against the outer wall of the van section to an open loading position as shown at 150A, 154A, and 158A. When in the open loading position, the swinging doors are completely out of the way during loading or unloading. Alternatively, the rear door may be a roll-up door to be described shortly.

In FIG. 8A, van sections 18 and 20 are also provided with a forward door 156 and 152, respectively. Forward doors 156 and 152 are provided with a hinge which allows them to assume one of the two positions shown in FIG. 8A, the open van position being shown at 152 and 156 with the closed position being shown at 152A and 156A.

Provided in FIG. 8B is the same view provided in FIG. 8A, showing each of the swinging doors being configured in the open van position. As can be seen in FIG. 8B, with all the doors properly positioned, the continuous van body is formed which allows cargo to be placed anywhere from the forward end of the trailer to the rear end of the trailer using, for example, a fork lift. Also, large single pieces of freight may extend from one section to another. For example, an automobile, a large roll of carpet, or a boat may be placed therein.

Figure 10A:
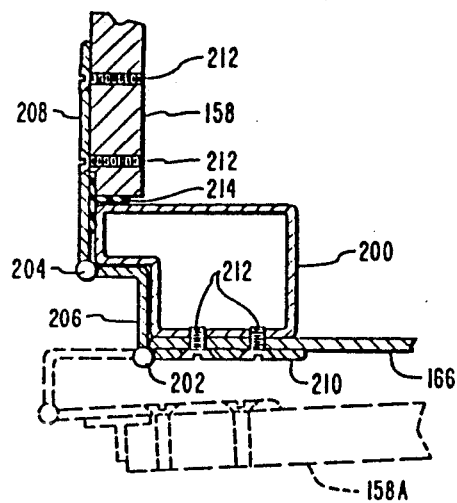
FIG. 10A is a horizontal cross-sectional view taken along line 10A—10A of FIG. 8A showing in greater detail the operation of the articulating hinge incorporated into the swinging door of the illustrated embodiment.

The double articulating hinge represented in FIGS. 8A and 8B is shown in greater detail in FIG. 10A. Represented in FIG. 10A is the corner frame member 200 to which is attached wall 166 and first hinge plate 210 by way of screw 212. The double articulating hinge includes a first hinge plate 210, a second hinge plate 206, and a third hinge plate 208. The second hinge plate 206 is pivotally connected to the first and third hinge plates by pins 202 and 204, respectively. The third hinge plate 208 is attached to door 158 by screws 212.

As can be seen in FIG. 10A at 158A, the structure of the double articulating hinge allows the door 158A to be folded back against the van section wall 166 to the open loading position.

Each door is also provided with a gasket, such as that indicated at 214 in FIG. 10A, which preferably may be a neoprene rubber gasket which ensures that a secure seal against moisture and dirt is formed to protect the contents of the van section. As will be appreciated by examining FIG. 10A and FIG. 8A, the configuration of corner frame member 200 and the double articulating hinge allows the adjacent van section to structurally engage each other. Thus, a strong van body is formed. Furthermore, it should be appreciated that a door means utilizing the double articulating hinge may also be fabricated as the front door of the illustrated embodiments if desired.

Figure 9A:
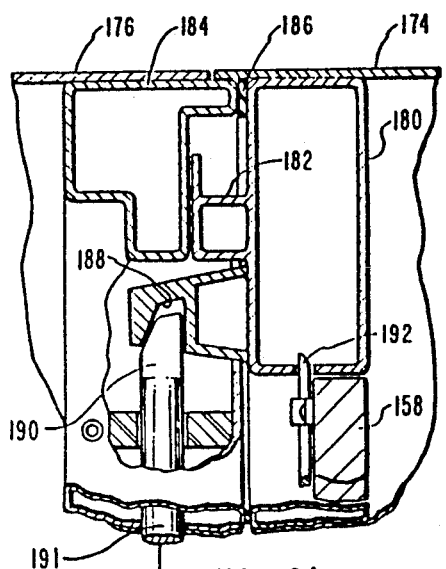
FIG. 9A is a vertical cross-sectional view taken along line 9—9 of FIG. 8A showing a portion of the apparatus used to attach the van sections of the embodiment to one another.

FIG. 9A provides a vertical cross-section taken along line 9A—9A of FIG. 8A. In the vertical cross-sectional view, the roof 174 of van section 16 and the roof 176 of van section 18 are shown being connected to frame member 180 and frame member 184, respectively. It will be noted that the roof 174 and the frame member 184 are configured so as to overlap, thus increasing the structural integrity of the interconnected van sections and providing an improved weather seal. Moreover, a gasket 186 is included to prevent entry of moisture and dirt. Still further, a water channel 182 is formed in the frame member 180 so as to divert any moisture which penetrates beyond the gasket 186 away from the contents of van section and to drain harmlessly to the outside of the van section.

Also represented in FIG. 9A is a securing notch 188 extending from frame member 180. Also shown is the top portion of securing post 190. After the van sections are slid together on the trailer frame, a securing post 190 is pressed into the securing notch 188 preferably by a screw apparatus which is illustrated in FIG. 9B.

Figure 9B:
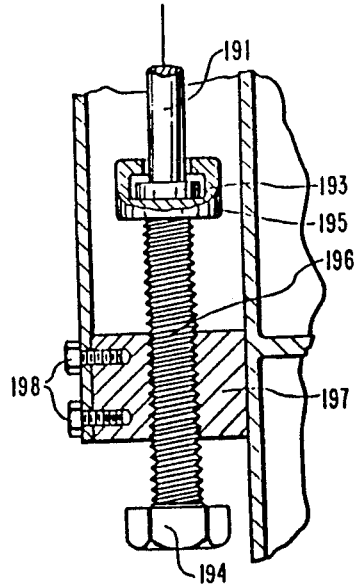
FIG. 9B is a vertical cross sectional view showing the lower portion of the structure represented in FIG. 9A.

In FIG. 9B, a securing post shaft 191 is provided with a foot 193 which is held captive in cap 195. The securing post shaft 191 is connected vertically to securing post 190 and, as the securing post shaft 191 is raised and lowered, the securing post engages and disengages the securing notch 188.

As can be seen in FIG. 9B, the cap 195 is attached to a threaded shaft 196 which is disposed through a threaded block 197. The threaded block 197 is attached to the van section frame by way of bolts 198 so that as the threaded shaft is turned using a head 194 (also shown in FIG. 14) the securing post engages or disengages the securing notch 188. As clearly shown in FIG. 14, the bolts 198 are accessible from the underside of each van section thus eliminating the need for a potentially dangerous ladder climb to operate the structure.

Figure 10B:
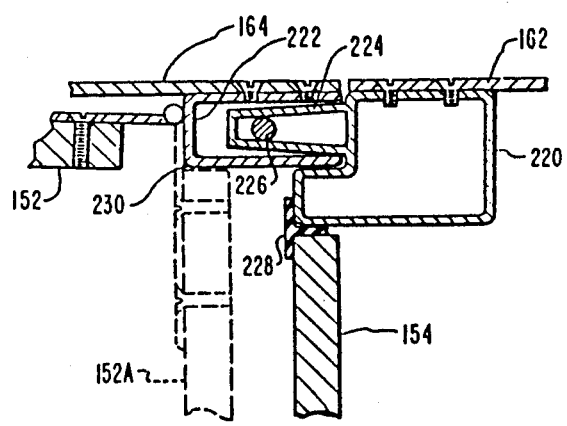
FIG. 10B is a horizontal cross-sectional view taken along line 10B—10B of FIG. 8A showing in greater detail the interengaging portions of two compartments or van sections.

Provided in FIG. 10B is a horizontal cross-sectional view taken along line 10B-10B of FIG. 8A showing the corner frame member 220 of van section 18 as well as corner frame member 230 of van section 20. As can be seen in FIG. 10B, a ridge 224 protrudes from frame member 220 and is received by channel 222 in frame member 230 to provide a rigid interconnection between the two van sections. Also represented in FIG. 10B are swinging doors 152 and 154. In order to provide additional protection against entry of dirt and moisture, a gasket 228 is provided in association with the door 154 of van section 18.

FIGS. 11A-11D provide additional detail concerning additional embodiments of the present invention and the configuration of the front door which may be used in each van section and the structures associated therewith. As mentioned previously, the penetration of water and dirt into the van section through the front door must be carefully considered if the van section is to be placed at the front position on the trailer frame and subjected to wet and dirty conditions at highway speeds. Moreover, with the van sections being loaded by either professional movers or the customers themselves, the front door of the van section must be strong enough to resist deformation when the load shifts against it, particularly as may occur during an emergency stop. The structures represented in FIGS. 11A-11D meet the challenges raised by these concerns.

Shown in FIG. 11A is a front door 231 which is provided with a hinge 241. The hinge 241 may be a cylindrical post attached to the end of the door and which may be attached to the van section frame in any one of many ways known to those skilled in the art. The front door swings between an open van position (as shown at 231A) and a closed position (as shown at 231). Three front door brace bars 233 and a front door floor brace 234 are shown in FIG. 11A in their storage position. FIG. 11A also illustrates how van section frame members 232A-232D act as male and female components to interengage one another to form a rigid and strong body when attached together.

FIG. 11B shows the structure of the front door floor brace 234 in greater detail. The front door floor brace 234 prevents the door from being opened when the van section is to be loaded individually. The right angle portion of the front door floor brace 234 is placed at the intersection of the van section floor with the front door and locked into place by way of a "quick twist" bolt mechanism 238 which engages a fixture on frame member 235A and which locks into place with less than a 360° rotation according to designs known in the art. Also represented in FIG. 11B are gaskets 237 and door seal 236 which further serve to prevent entry of water and dirt into the van section.

FIG. 11C provides a representation of one of the front door brace bars 233 in its working position. Each of the front door brace bars fit through rings 240A and into recesses 240B which are provided in van section frame members 235A and 235B. Each of the front door brace bars 233 may be installed or removed by lifting one end of the bar 233 through the ring 240A and placing, or removing, the other end of the bar 233 into, or from, the recess 240B.

A similar arrangement may be provided for bars 233 in their storage position shown in FIG. 11A. As will be appreciated by examining FIGS. 11A and 11C, use of the front door brace bars 233 strengthens the front door 231 and will prevent its failure in the event of a shifting load during an emergency stop. Also shown in FIG. 11C is a door support roller 239 which may preferably be included to remove some of the weight of the front door 231 from the hinge 241.

FIG. 11D is a cross-sectional top view of the front door 231 and the structures associated therewith. In keeping with the objective of keeping the interior each van section secured from the surrounding environment additional gaskets, indicated at 237, are represented on the several of the structures shown in FIG. 11D.

As mentioned previously, the embodiments of the present invention may incorporate swinging doors or roll-up doors depending upon the particular application intended for the embodiment. For example, swinging rear doors, while generally sturdier and providing a better seal against moisture and dirt, also present the hazard of allowing the contents of the van section to uncontrollably come tumbling out once the door is unlatched. Thus, it may be preferable to equip van sections which are loaded by inexperienced individuals loading their own personal and household belongings with roll-up doors. In this way, the hazard of injury caused by poorly packed items uncontrollably tumbling out once a swinging door is unlatched can be avoided.

While roll-up doors provide the advantage of safer operation for inexperienced users of the van sections, it is a well-known attribute of commonly available roll-up doors that if the roll-up doors are left in the up position for any length of time while the trailer is in motion, the rollers on the roll-up door will soon be destroyed. This is due to the characteristic that the rollers are supported only on one of their ends. Importantly, represented in FIGS. 12 and 13 is a presently preferred embodiment of a roll-up door which is particularly adapted for use in the van sections described herein and which routinely may be left in the up position while the trailer is moved about without causing any damage to the door or to the door rollers.

Figure 12:
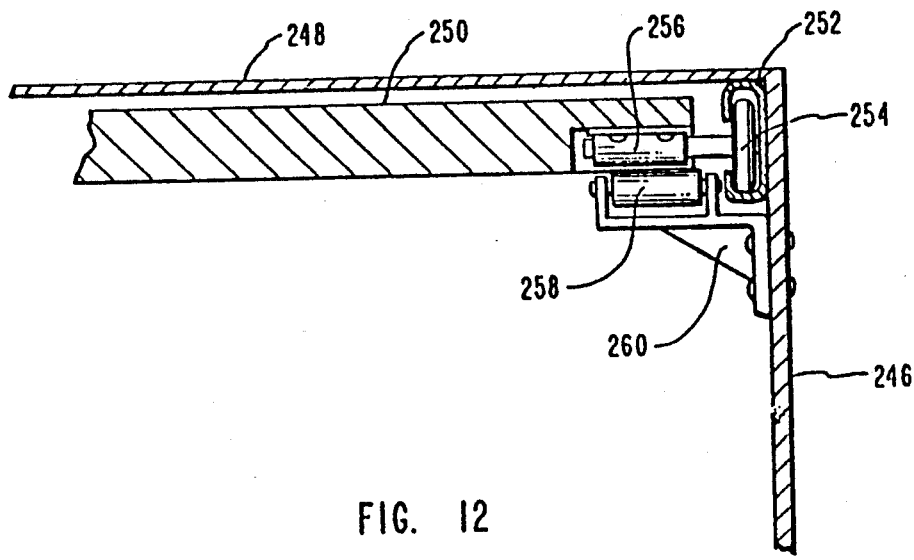
FIG. 12 is a vertical cross-sectional view taken along line 12—12 of FIG. 2 showing the structure of a roll-up door, in the up position, and the roll-up door support of the present invention.

As represented in FIG. 12, the roll-up door, one section of which is represented at 250, is shown in cross-section in relation to the van section wall 246 and the van section roof 248. The roll-up door used in the embodiment represented in FIGS. 12 and 13 may be one of the many which are commonly available in the art. Such doors comprise a plurality of door sections as well as a plurality of rollers, one of which is shown at 254, which roll up and down on a track 252. In the open position, the door sections are virtually horizontal and parallel to the roof of the van section as shown in FIGS. 12 and 13.

Each roll-up door section is provided with at least one roller 254 on each of its ends. The roller 254 is held in place by one end thereof on the door section by brackets such as that illustrated at 256 in FIG. 12. However the bracket 256 and the roller 254 are not sufficiently strong to routinely support the weight of the door section 250 when the trailer is in motion. When the vehicle is in motion, the jostling of the door sections causes a rapid failure of the bracket and the roller.

Figure 13:
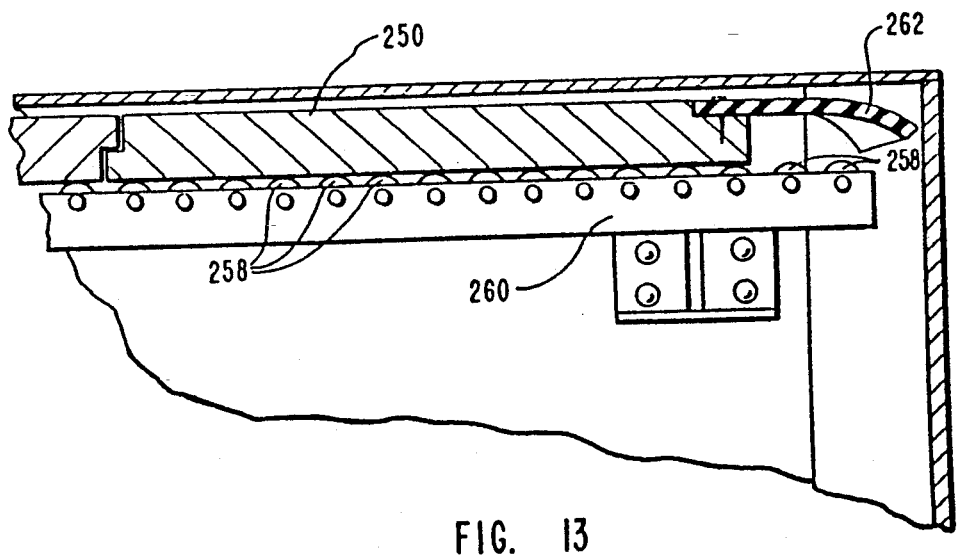
FIG. 13 is a vertical cross-sectional view taken along line 13—13 of FIG. 2 further showing the structure of the roll-up door support illustrated in FIG. 12.

In order to economically allow use of roll-up doors in embodiments of the present invention disclosed herein, a supplemental door support roller 258 holds up each door section 250 as shown in FIGS. 12 and 13. The plurality of supplemental door support rollers is readily installed using a bracket 260 fabricated for this purpose. By supporting each supplemental door support roller on both of its ends, the door support rollers may readily support the weight of the door sections, even when they are jostled about.

Thus, it will be appreciated that the inclusion of the supplemental door support rollers 258 allows the weight of the door sections to be supported by the supplemental rollers and thus prevent damage to the roll-up doors while traveling on a highway. Using the roll-up door embodiments represented in FIGS. 12 and 13, either roll-up or swinging doors, or a combination of both, may be readily incorporated into embodiments of the present invention as the need arises. Moreover, the supplemental door support rollers described herein have application in all aspects of the trucking industry where roll-up doors are used.

Still further, as an alternative to the structure represented in FIGS. 12 and 13, the door support rollers may be directly mounted to the door sections 250 and the bracket 260 may comprise a flat, planar surface upon which the support rollers rest. Those skilled in the art will readily be able to fabricate roller structures which can be mounted directly on each door section and which transfer the weight of the door section to the support bracket when the roll-up door is in the up position.

As is explained earlier in connection with FIGS. 8A–11, the upper corners of each van section are attached to the adjacent van section in order to form a strong and rigid van body. The lower portions of each van section are also secured to one another and to the trailer frame as will be explained in connection with FIGS. 14–17.

FIG. 14 is an elevational view of the rear door of a van section and a cross-sectional view of trailer frame members 28A and 28B. Shown in FIG. 14 are positioners 38 provided on each of the trailer frame members as well as supports 80 provided on the bottom of each van section. Also represented in FIGS. 14 and 15 is the lower van section interconnecting assembly which includes bracket 270 which retains shaft 272 captive. When it is desired to join the lower portions of van sections together, shaft 272 is swung into position, as represented at 272A, and nut 274 is tightened against bracket 276. Thus, using the structures represented in FIG. 15 the lower portions of two van sections may be securely held together. It will be appreciated that the structures represented in FIGS. 11 and 15 comprise one means for interconnecting the van sections.

Represented in FIGS. 16 and 17 are structures which are used to secure the van sections to the trailer frame members and serve as one possible securing means for securing the van sections to the trailer frame. Represented in FIG. 16 is a vertical cross-sectional view through two van sections. The floors 284 and 286 which are supported by frame members 280 and 282, are positioned, and frame members 280 and 282 are formed, so that their interengaging surfaces allow the two van sections to lend structural stability and rigidity to each other.

Moreover, the floors of the two van sections have a virtually uniform height. Thus, when the embodiments described herein are interconnected as a continuous van body the entire interior volume of the van may be used without restriction. Furthermore, having a virtually uniform floor height throughout all the van sections facilitates use of devices such a hand trucks and forklifts inside the van sections.

The van sections may be secured to trailer frame members, for example trailer frame member 28B, by use of the structure represented in FIG. 16. Represented in FIG. 16 is a hold-down plate 290 which is biased by a spring 294 and allowed to slide horizontally by bolts 292. One of support member I-beams 78 is provided with a hold-down wedge 288 which is engaged by the hold-down plate 290. Since the hold-down plate 290 is biased by spring 294, as the van sections are vibrated as they travel down the highway, the contact between the hold-down plate 290 and hold-down wedge 288 becomes tighter during use. Preferably, a plurality of hold-down plates 290 and their associated structures are used with each van section.

The structure represented in FIG. 17 is used to secure the rear end of the last van section to the frame members and may also be used to secure the corners of each van section to the trailer frame. As shown in FIG. 17, hooked shaft 40B engages a hook 296 provided on the van section support member 78. The hooked shaft 40B is connected to the trailer frame member 28B by way of a plate 300 which is connected to the trailer frame member 28B by a hinge 302. One end of the hooked shaft 40B is threaded and inserted through a bore provided in the plate 300. A wing nut 304 is tightened to exert the proper amount of downward force on the hooked shaft 40B and the van section. In addition to, or as an alternative to, the previously described structures, bolts and nuts may be used as means to secure the van sections to the trailer frame.

As mentioned previously, it may be desirable to include more than three van sections on a single trailer frame. Thus, the embodiment represented in FIG. 18 is provided with an extensible trailer frame upon which between three and five van sections may be included. Furthermore, those familiar with the industry will appreciate that various governmental regulations, as well as practical considerations, place different limits on the maximum length of a semitrailer from one locality to the next. Also, while it may be impossible to maneuver the fully extended trailer in some locations, it may be very possible to maneuver the same trailer shortened to accommodate only three van sections in the same location. Moreover, shorter trailers can often be conveniently parked in driveways and parking lots.

Illustrated in FIG. 18 at bracket 12 is a tractor equipped with a hoist 14 shown in its transport position. The extensible trailer, designated by bracket 320, includes frame members 322, 324, and 326. Frame members 324 and 326 are provided with removable positioners 38 in order to allow retraction of these frame members. Because of the potential length of extensible trailer frame 320, two wheel and suspension assemblies 320 and 330 are provided.

As shown in FIG. 19, wheel and suspension assembly 320 may be repositioned or removed from frame members 326. In order to facilitate smooth extension and retraction of the frame members, roller bearings, as represented in FIG. 20 at 332, are provided. Once the extensible frame has been extended or retracted to the proper length, bolts and nuts, generally indicated at 334 in FIG. 21, are used to lock the frame in the proper position. It will be appreciated that support members 336 and the various means used to secure the van sections to the trailer from 320 may be designed to be moved from position to position on the trailer frame to accommodate a varying number of van sections.

In many cases, it would be advantageous to be able to deliver one or more van sections using a smaller, less expensive truck or trailer. For example, in locations where loading and unloading space is extremely limited, the arrangement illustrated in FIG. 22 may be used. Since each van section 18 and 20 forms a compartment wherein the contents thereof are secure and safe from theft, dirt, and moisture, the van sections may be transported individually.

As shown in FIG. 22, a flatbed truck 350 and trailer 352 arrangement may be readily adapted for transporting the van sections for short trips. For example, the arrangement represented in FIG. 22 may be dispatched to one or more loading locations where the van sections are loaded. Once loaded, the van sections may later be returned to a central terminal where they may be secured to a semitrailer frame, such as represented in FIGS. 1-17, in preparation for a long-haul trip.

Preferably, both the truck 350 and trailer 352 are provided with a ramp 354. The ramp 354 is shown in the up position in FIG. 23A and in the down position in FIG. 23B. The ramp facilitates loading each individual van section. It is also preferred that both the truck 350 and the trailer 352 be provided with a hitch, as generally designated 358 in FIG. 23B, to allow additional trailers to be pulled. Furthermore, when the hitch is not in use it is preferred that a cover for the recessed hitch 358 be provided such as doors 356 shown in FIG. 23A. Trailer 352 may be provided with both electric and air braking systems to allow it to be used with towing vehicles which include either type of braking system.

Figure 23C:
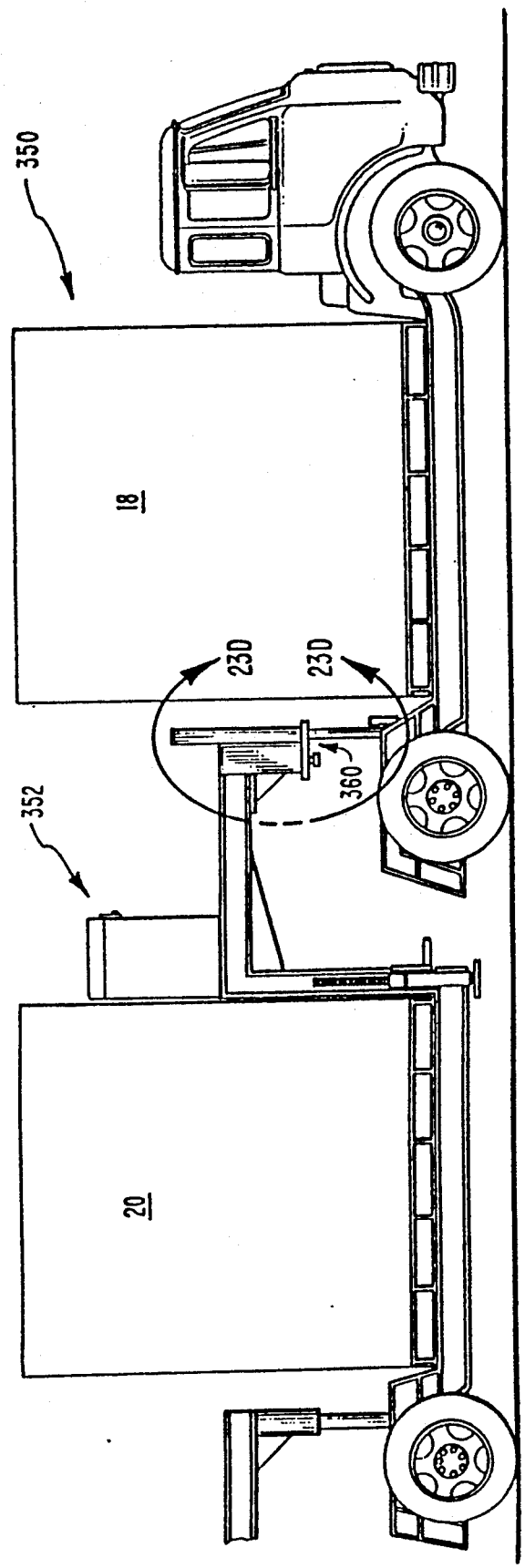
FIG. 23C is a side view of another embodiment of a trailer which may be used to transport the van sections of the present invention.

It will be appreciated that in some cases it is convenient to tow the trailer 352 behind a tractor which is equipped with a fifth wheel hitch. Alternatively, in other cases it is convenient to tow the trailer 352 behind a light truck, such as a pick-up truck, having a hitch ball mounted at bumper level. In order to allow the trailer 352 to be towed using either hitching arrangement, a hitch adapter, generally designated at 360 in FIG. 23C, is preferably provided.

Figure 23D:
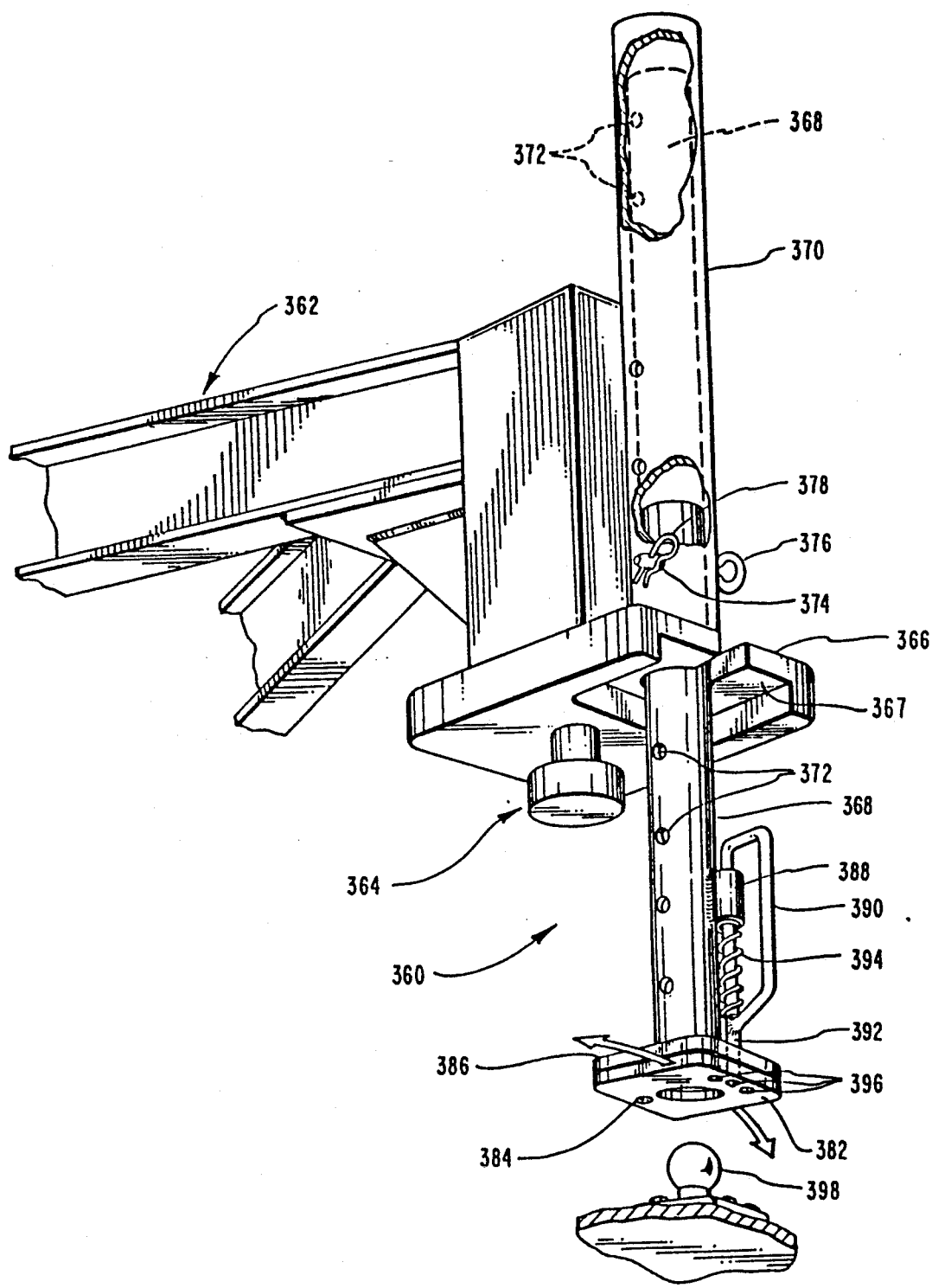
FIG. 23D is a perspective view taken along line 23D—23D of FIG. 23C showing one hitching arrangement of the present invention.

As will be appreciated by reference to FIG. 23D, the hitching adapter 360 is mounted to the end of the "goose neck" extension 362 of the trailer which is provided with a king pin, generally designated at 364. A plate 366 to which the king pin 364 is attached is provided with a recess 367 to receive the hitching extension structures when not needed which would otherwise interfere with the operation of the fifth wheel hitch. Thus, the hitching extension structures may be routinely installed on a trailer and the trailer still be ready to be hitched to either a fifth wheel hitch or to a bumper mounted ball hitch.

In the presently preferred embodiment of the hitching extension apparatus, a cylindrical tube 370 is attached perpendicularly to the upper surface of plate 366. The cylindrical tube 370 is provided with a bore 374 longitudinally provided therethrough.

An extension leg 368 is fitted within the cylindrical tube 370 such that it can be inserted into and withdrawn from the cylindrical tube 370. A series of spaced apart bores 372 are provided laterally through the extension leg 368. To fix the extension leg 368 in position, a pin 376 is inserted through the bore 374 provided in the cylindrical tube and through one of the bores 372 provided in the extension leg 368. In this way, the elongation of the extension leg can be adjusted and the extension leg 368 can be positioned out of the way or adjusted to any hitch height.

When the hitching adapter 360 is not needed, the extension leg 368 is retracted to its uppermost position such that the structures located at the bottom of the extension leg 368 are received into the recess 367. Thus, when the extension leg is retracted to its uppermost position it does not interfere with the operation of the fifth wheel hitch.

Provided within the lower end of extension leg 368 are structures which receive the hitch ball 398. In order to lock the hitching adapter 360 to hitch ball 398, a fixed plate 386 and a pivoting plate 382 are provided at the bottom end of the extension leg 368. The pivoting plate 382 is attached to the fixed plate 386 by a bolt indicated 384. After the hitch ball 398 has been received into the lower end of the extension leg 368, the pivoting plate is pivoted to the side, as shown by the directional arrows, thus locking the hitching ball into the lower end of the extension leg 368.

The pivoting plate 382 may be pivoted to either side and secured into place by rod 392 which engages one of the bores 396 provided in the pivoting plate 382. The rod 392 is biased towards one of the bores 396 by a spring 394 and is held in place by guide 388. A handle 390 attached to the rod 392 facilitates movement of the rod.

It will be appreciated that the illustrated structure is merely exemplary of the structures which could serve as the hitch extension of the present invention. Many components, other than those specifically illustrated, which serve similar or equivalent functions, can form an apparatus to allow a trailer to be conveniently hitched to either a fifth wheel hitching arrangement or to a hitching ball mounted either at bumper height or some other height within the scope of the present invention.

Referring next to FIGS. 23E-23H, another structure for hitching a trailer to a vehicle is illustrated. The illustrated structure greatly increases the ease of carrying out the hitching operation. As is known in the art, even an experienced operator may have difficulty in hitching a trailer to a vehicle under some circumstances. In the case of an inexperienced operator, having to align a small hitching structure on the trailer with a similarly small structure on the towing vehicle while backing up can be very difficult and time consuming. The structures illustrated in FIGS. 23E-23H make the hitching operation easy, even for a novice.

Figure 23E:
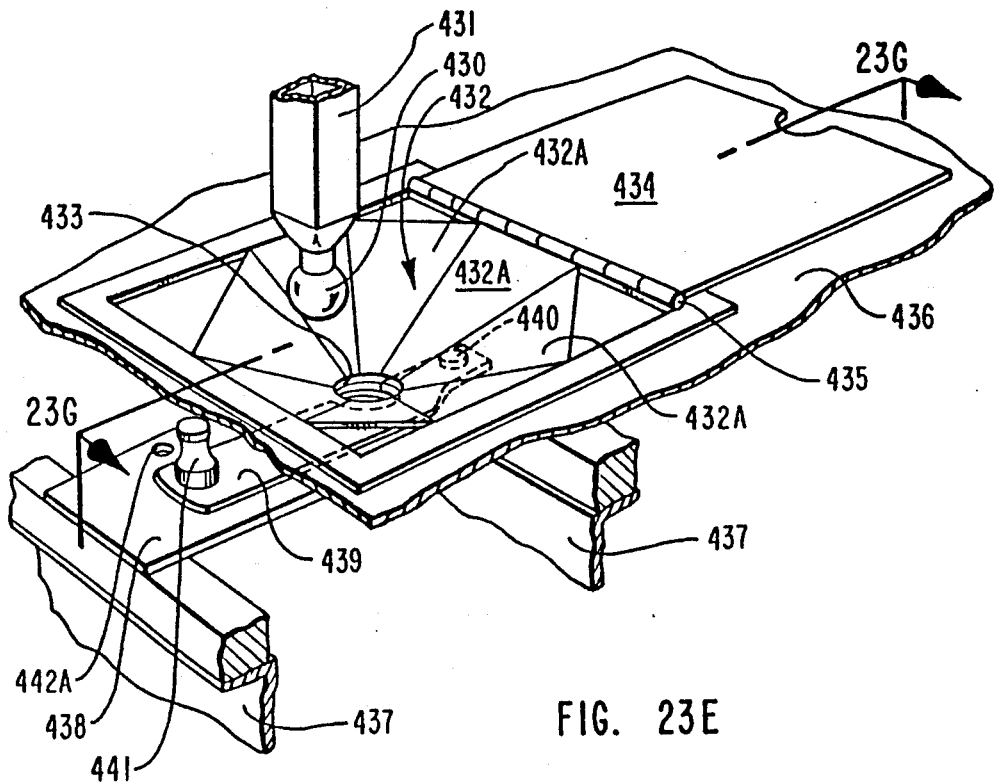
FIG. 23E is a partially cut away perspective view of another hitching arrangement of the present invention.

Represented in FIG. 23E is a hitch ball 430 positioned on the end of a neck 431 which is connected to a trailer frame. The advantages which come by mounting the hitch ball 430 in a downward facing direction on the trailer, rather than mounting the hitch ball on the towing vehicle, are readily apparent. Since the hitch ball 430 is mounted on the trailer, a funnel, generally designated at 432, can be provided to guide the hitch ball 430 into the hitch locking structures. The funnel 432 functions as a means for guiding the hitch ball into the locking structures and in the illustrated embodiment is comprised of panels 432A.

The funnel is recessed below the bed 436 of the towing vehicle, for example, a pick up truck. A door 434 is connected to the bed 436 by a hinge 435 so the funnel 432 can be covered, and the bed 436 used for other purposes, when the hitch structure is not being used.

Figure 23F:
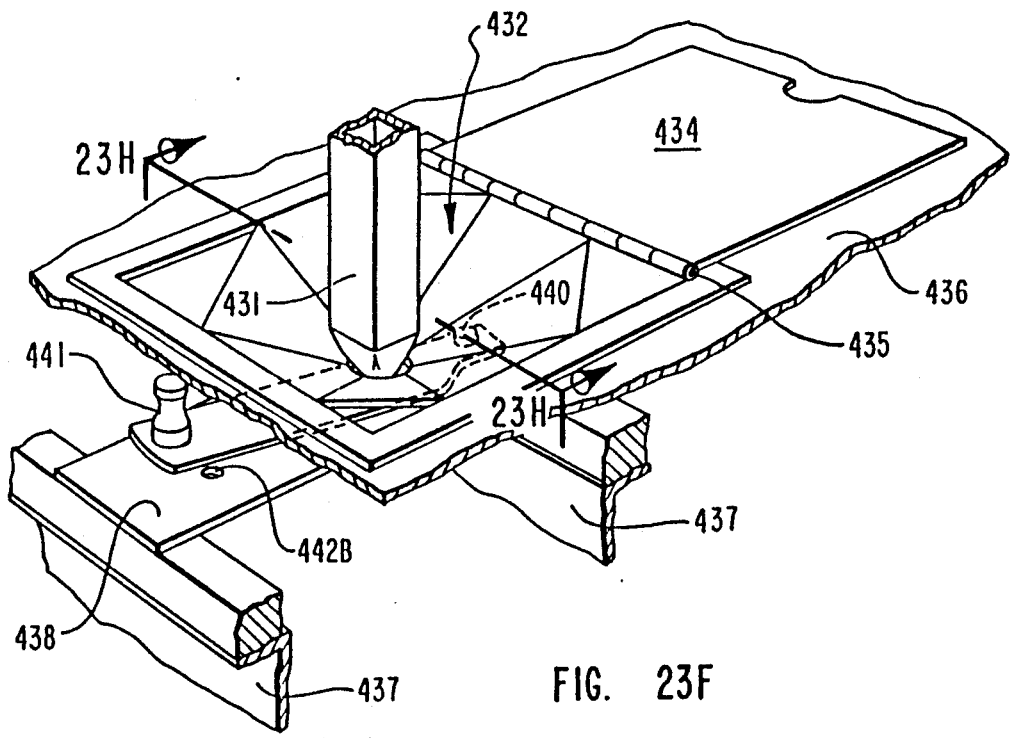
FIG. 23F is another partially cut away perspective view showing the hitching arrangement represented in FIG. 23E.
Figure 23G:
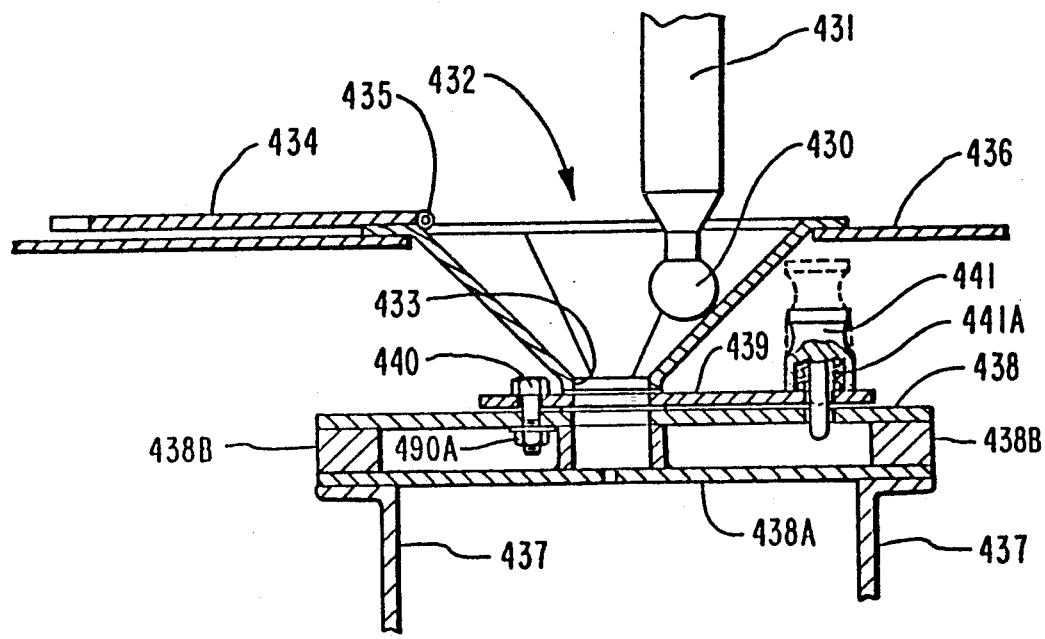
FIG. 23G is a cross sectional view taken along line 23G—23G of FIG. 23E.

As can be seen best in the cross sectional view of FIG. 23G, a lower support plate 438A of the hitch structure is connected to frame members 437 of the towing vehicle. Two risers 438B hold an upper support plate 438 in place. A locking plate 439 is pivotally attached to the upper support plate 438 by way of a bolt 440 and a nut 440A.

Figure 23H:
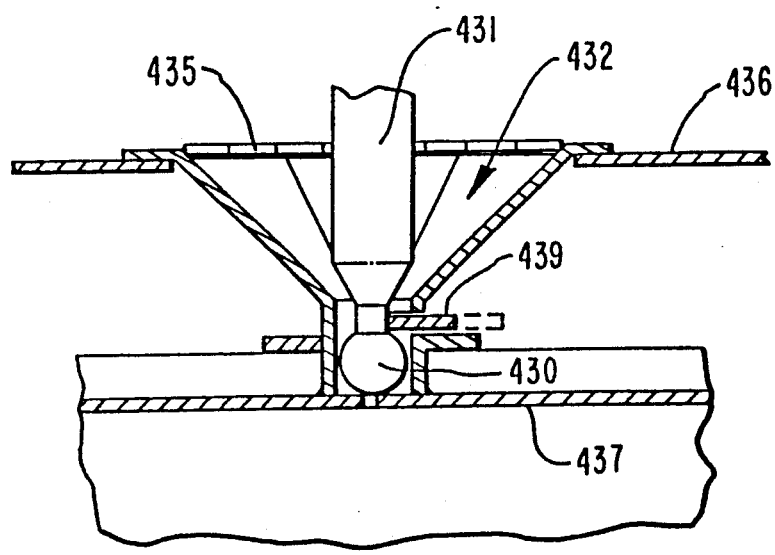
FIG. 23H is a cross sectional view taken along line 23H—23H of FIG. 23F.

FIG. 23E provides the best illustration of locking plate 439 in its open position as the ball 430 is lowered into the funnel 432. Once the ball 430 has been positioned into a ball opening 433 provided at the bottom of the funnel 432, the locking plate 439 is moved to its locked position as shown in FIGS. 23F and 23H. The locking plate 439 is secured in a locked position by locking pin 441 which engages a first bore 442B (FIG. 23F) when in the locked position and a second bore 442A (FIG. 23E) when in the unlocked position. As seen in the partially cut away portion of FIG. 23G, the locking pin 441 is provided with a spring 441A to bias it into one of the two bores 442A or 442B.

It will be appreciated that the hitch structure illustrated in FIGS. 23E-23H provides great advantages over the previously available structures. The illustrated hitching structure is very easy to use; it is merely necessary to back the towing vehicle to a position where the ball 430 is generally above the funnel. Once the ball 430 is generally positioned over the funnel 432, the ball 430 is then lowered into the funnel 432 which automatically directs the ball to the ball opening 433. Once the ball 430 has entered the ball opening 433, it is readily secured into place.

Advantageously, in keeping with another aspect of the present invention, the inventive concepts of the present invention may be readily adapted to allow moving and storage businesses in small municipalities to utilize the van sections described herein. Since the volume of long-haul moving in a small municipality is low, the cost of owning and maintaining a semitrailer and tractor equipped according to the present invention may be too great to justify. A small local moving and storage business can, however, easily justify the cost of acquiring and maintaining one or two van sections such as described herein.

Since a small moving and storage business may hesitate to make the investment in the truck 350 and trailer 352 illustrated in FIG. 22, it is readily possible to adapt van trucks which are generally already owned and used by small moving and storage companies to the present invention as will be described in connection with FIGS. 22-25. Illustrated in FIG. 24 is a tractor 400 used to pull semitrailers on local trips. The tractor 400 has been equipped with support members 404 upon which a single van section, represented at 402, may be placed. Tractor 400 is also preferably provided with a supplemental hitch 406 to pull a trailer such as trailer 352 represented in FIG. 22.

Represented in FIG. 25 is a van truck 420 which is often equipped with a conventional van body. The van truck 420 in FIG. 25 is provided with cross support members or bolsters 426 upon which two van sections, represented at 424 and 422, can rest. Also, the van truck body generally owned by a small moving and storage company which fits onto the van truck 420 can be modified to roll off from, and roll on, the truck frame. It will be appreciated that securing and attaching structures such as those described previously herein can preferably be added. Furthermore, with the addition of a ramp, the van sections secured on trucks 400 and 420 may be loaded at a residence and returned to the central terminal. There the van sections may be rolled off the truck onto storage and removal racks (as shown in FIG. 26) and the van truck body rolled back onto its own frame.

Figure 26:
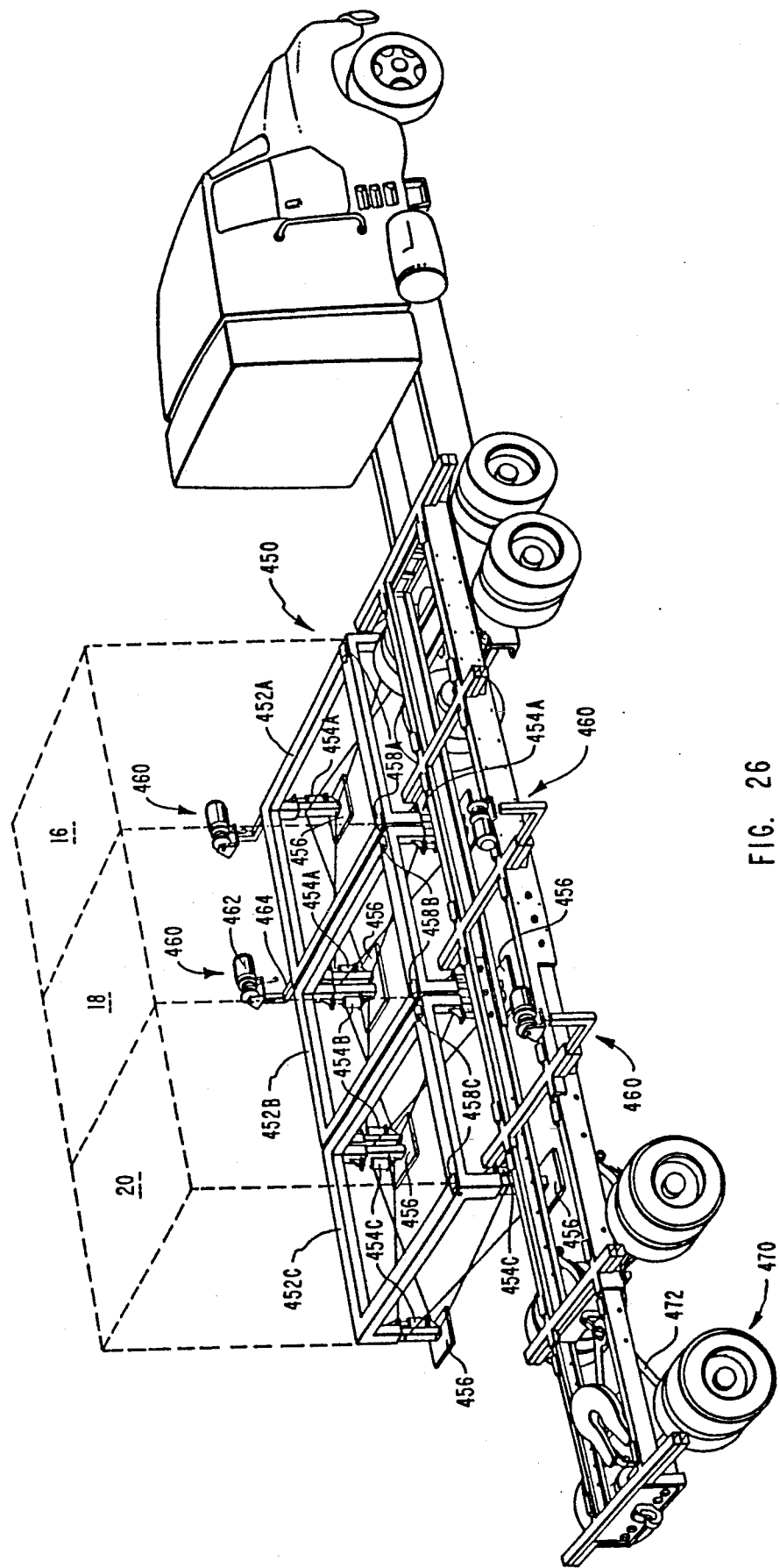
FIG. 26 is a perspective view of still another presently preferred embodiment of the present invention.

Upon arrival of a tractor and trailer (as shown in FIG. 1) which is making a long trip, the van sections can be transferred thereto as described previously or rolled on or off using the winches 462 as shown in FIG. 26. Moreover, the trucks represented in FIGS. 24 and 25 are usually already owned by most moving and storage businesses, and in the case of the truck represented in FIG. 25, the two van sections may be interconnected as a continuous van body and the truck used as in a conventional manner from day to day.

If the van sections of the present invention are to be used by a local moving and storage business, but additional flexibility is desired, the embodiment represented in FIG. 26 may be utilized.

FIG. 26 provides a perspective view of a tractor hitched to an extensible trailer frame according to the present invention. Also represented is a van section storage and removal rack 450 including a plurality of storage and removal rack frames 452A-452C. Each storage and removal rack frame 452A-452C is able to support one van section of the present invention when the van section is not secured to a trailer frame or truck. Each storage and removal rack frame 452A-452C rests on four foot pads 456. Each corner of the storage and removal rack frame 452A-452C is provided with a hydraulic jack 454A-454C which is adapted to raise or lower the frame to match the height of the truck or trailer.

Using the structures represented in FIG. 26, van sections (represented at 16, 18, and 20) may be slid between the bolsters 426 provided on a truck or trailer frame and the storage and removal rack frames 452A-452C. Rollers 458A-458C may preferably be provided to ease the sliding movement of the van sections. Also, several winch assemblies 460 may be included to pull the van sections onto the trailer frame or the storage and removal rack frame.

As represented in FIG. 26, each winch assembly includes a motor, transmission, and reel mechanism 462 which is mounted on a winch support arm 464. Each support arm may be received by a support member on the trailer frame and the members of storage and removal rack frames. Thus, the winch assemblies may be moved to any position needed but also be securely held during use.

Also shown in FIG. 26 is what is commonly referred to in the trucking industry as a converter gear 470. Such a converter gear is commonly used in the industry to make the second semitrailer in a "train" into a full trailer. The converter gear 470 attaches to the pintle hook on the rear of the extensible frame by way of arms 472 and to the extensible frame itself to support the most rearward portion of the extensible frame. The converter gear 470 may be used as an alternative to the wheel and suspension assembly 330 represented in FIG. 18. The converter gear 470 provides the additional tandem axle needed to support the additional weight when five van sections are secured to the extensible frame.

Figure 26A:
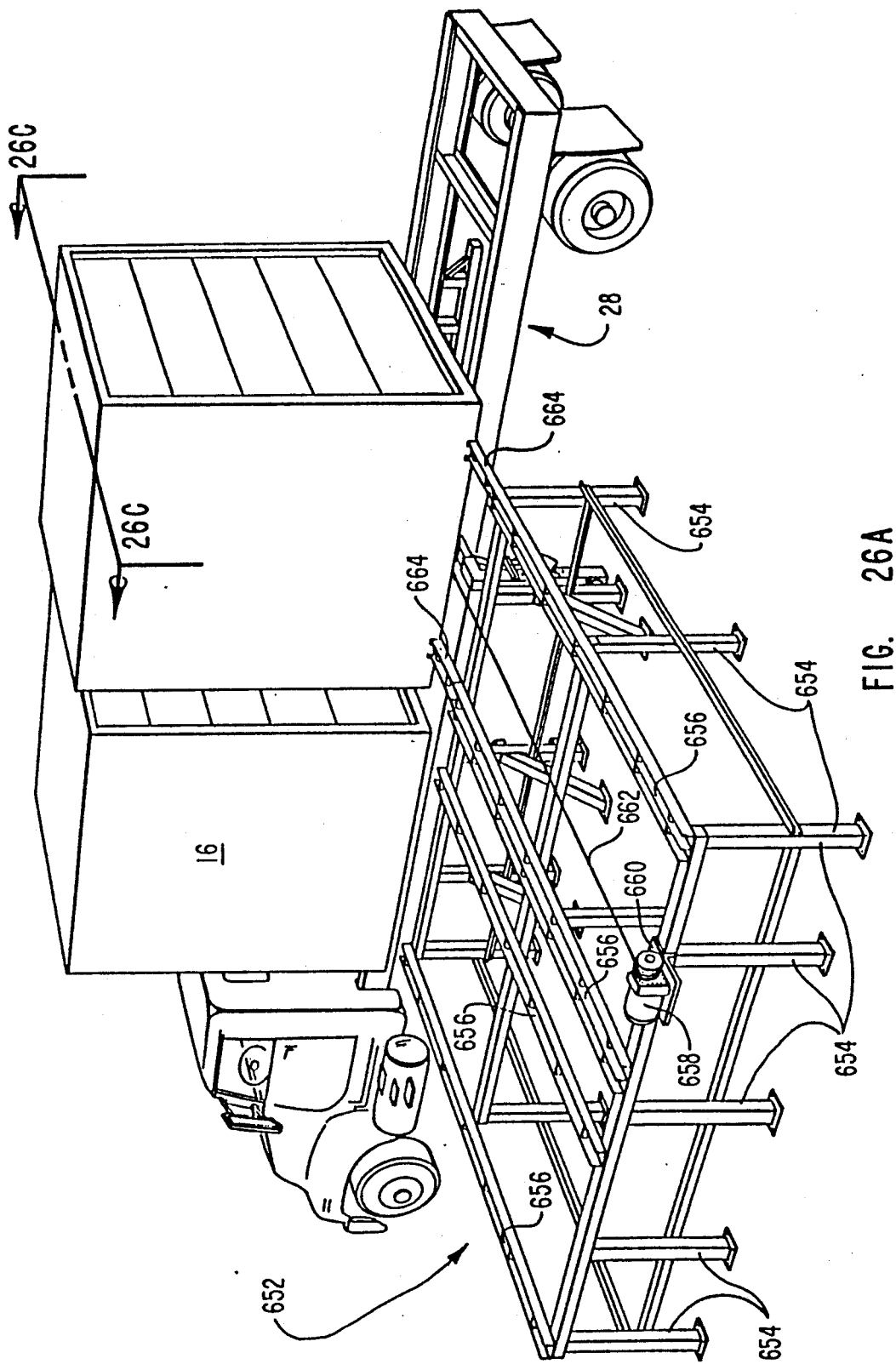
FIG. 26A is perspective view of a van section removal and storage rack in accordance with the present invention.

Referring next to FIG. 26A, another preferred arrangement for a van section storage and removal rack, generally designated at 652, is illustrated. As with the previously described van section storage and removal rack, the van section storage and removal rack illustrated in FIG. 26A allows a lone operator to move the van sections, for example illustrated van sections 16 and 18, between their positions secured on the trailer frame 28 and the van section storage and removal rack 652.

The van section storage and removal rack 652 includes a plurality of legs 654 which rest upon the ground or are secured to a concrete pad. To move the van section 18 from the trailer frame 28 to the van section storage and removal rack 652, the van section 18 is lifted up from the trailer frame 28, using structures to be described shortly herein, and a pair of track extensions 664 are placed under the van section 18 and the van section 18 is rolled onto the tracks 656 supported by the legs 654. A winch 658, mounted on a support plate 660 so it can be readily mounted on different positions on the van section storage and removal rack 652, is provided to pull the van section 18 onto the tracks 656 using a cable 662.

Figure 26B:
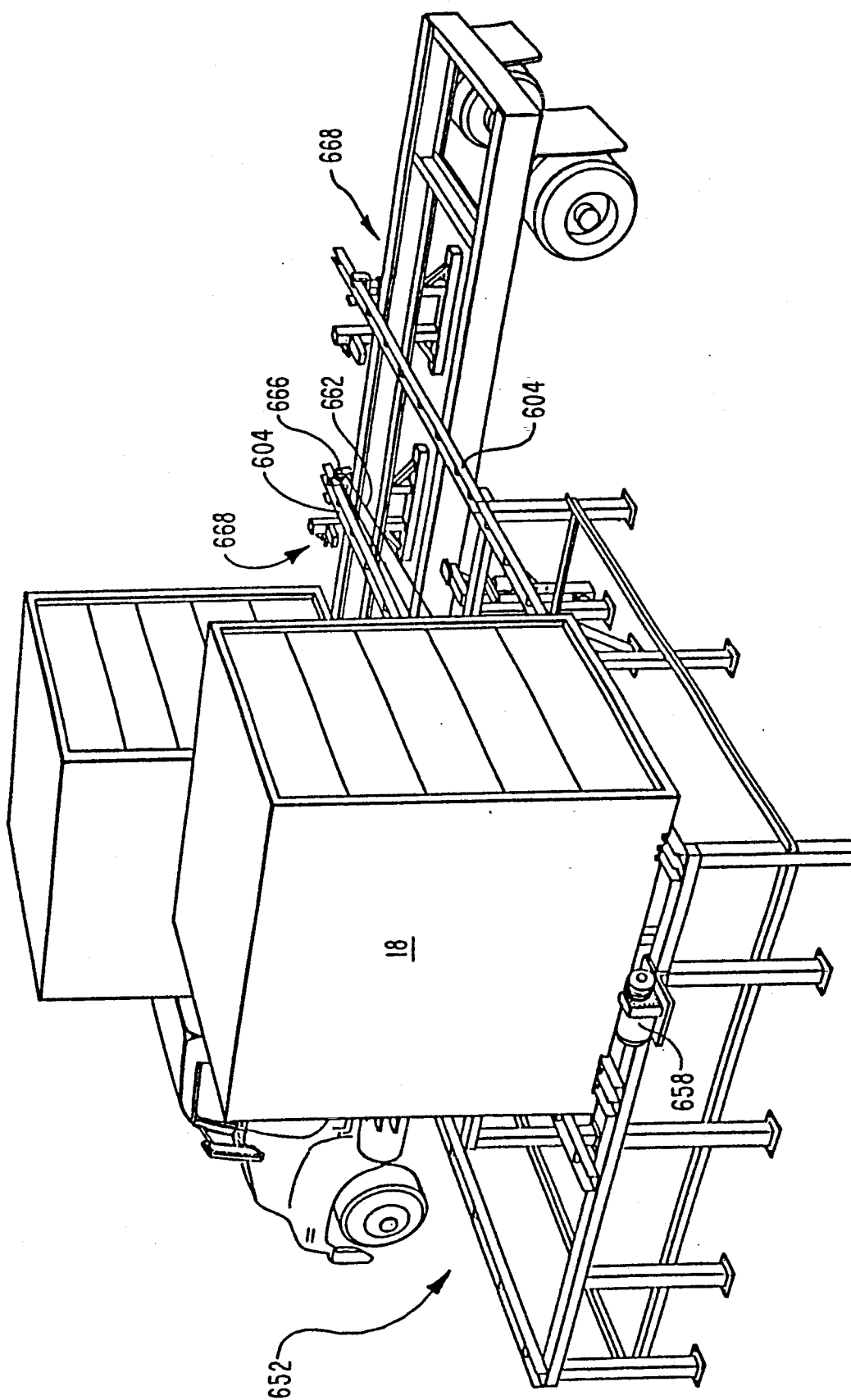
FIG. 26B is perspective view of the van section removal and storage rack illustrated in FIG. 26A and showing the removal of a van section from a trailer frame.

Referring next to FIG. 26B, in order to move the van section 18 from the van section storage and removal rack 652 to the trailer frame the steps are reversed and the cable 662 is looped around a pulley 666 and attached to the van section 18 so that the pulley 658 can pull the van section 18 onto the pair of track extensions 604. Also represented in FIG. 26B are a pair of track extension supports generally indicated at 668 which function to hold the track extensions 604.

Figure 26C:
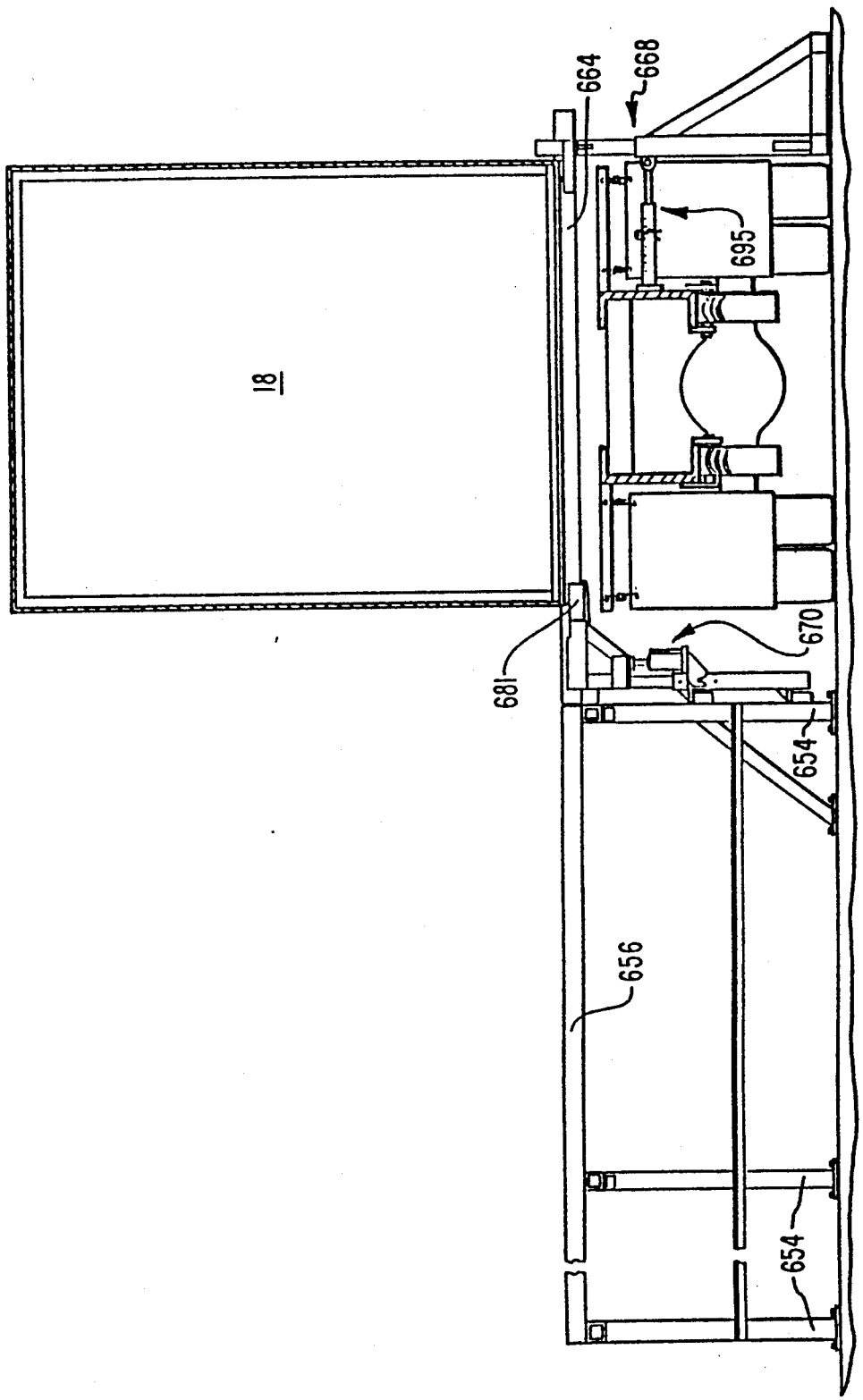
FIG. 26C is an end view of the van section removal and storage rack illustrated in FIG. 26A.

Referring next to FIG. 26C, a partial cross sectional view taken along line 26C—26C of FIG. 26A, the van section 18 is illustrated as being lifted up off from the trailer frame so that the track extension support 664 can be inserted thereunder. The track extension supports 668 include structures to lift the van section 18 and a brace 695 as will be described in greater detail in connection with FIG. 26D.

Figure 26D:
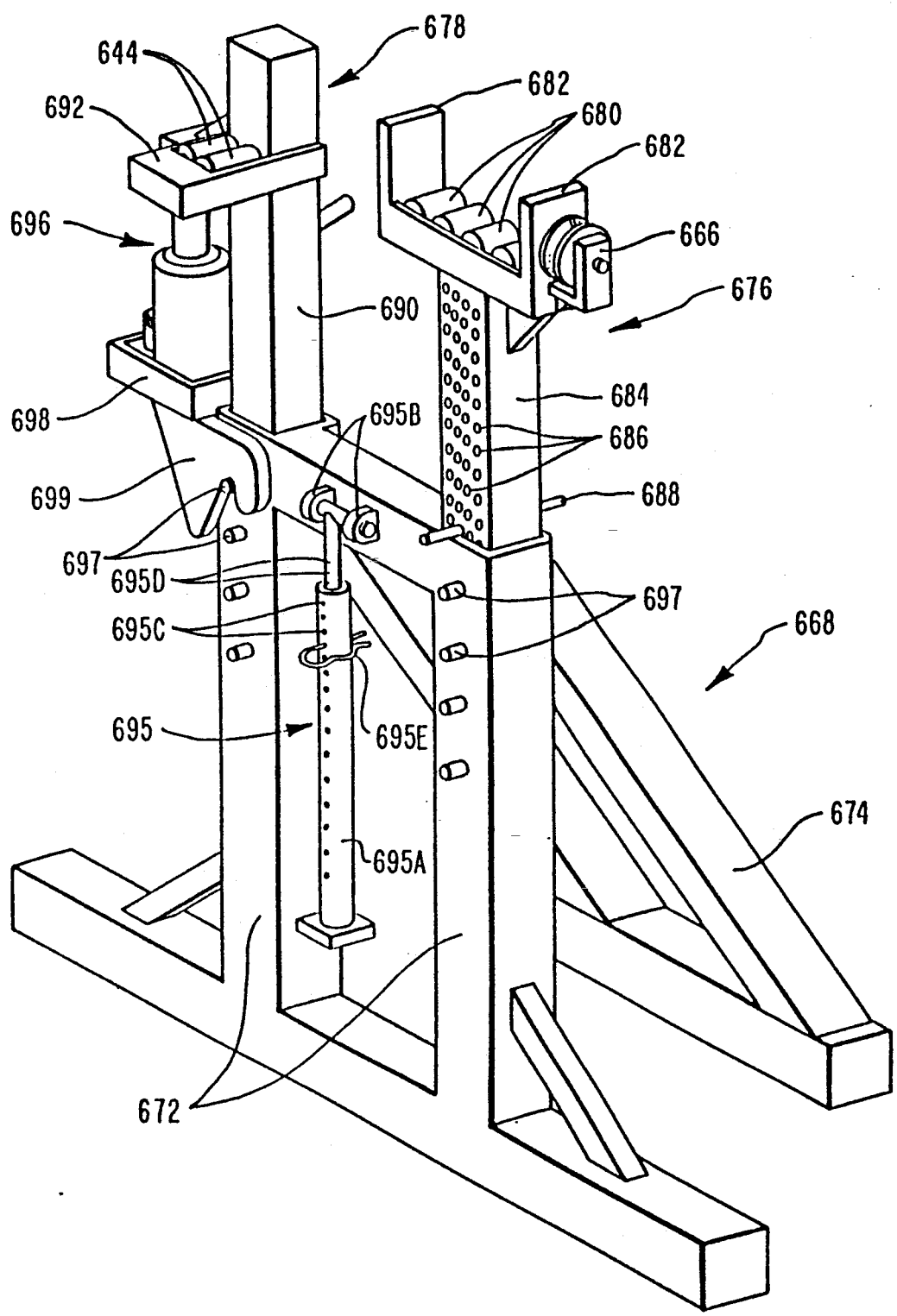
FIG. 26D is a perspective view of a track support structure in accordance with the present invention and as illustrated in FIGS. 26A-C.

As represented in FIG. 26D, the track extension supports 668 include a base 672 and a base prop which both rest upon the ground. The base 672 has two hollow, vertically oriented shafts into which either a track support structure 676 or a van section jack 678 is inserted. The track support structure 676 includes a leg 684 through which a plurality of bores 686 are provided. The vertical position of the leg 684 is altered by raising the leg 684 to the desired height and inserting a pin 688 into the lowest accessible bore 686. A plurality of rollers 680 are horizontally disposed to allow the track extension 664 to rest thereon and still be horizontally positioned between the guide walls 682.

The van section jack 678 includes a leg 690 which is inserted into the hollow shaft of the base 672 so that it is allowed to move vertically. A ledge 692 protrudes from the leg 690. A hydraulic jack, generally designated at 696, engages the bottom side of the ledge 962 so that operation of the hydraulic jack 696 will raise and lower the ledge 692. A plurality of rollers 644 are mounted on the ledge 692. When the van sections are being moved, the base 672 is positioned so that the bottom edge of the van section rests on the rollers 644. The rollers 644 allow the position of the van section to be adjusted after the van section has been lifted and also allow the van sections to be disengaged from each other.

The hydraulic jack 696 is held in a jack receptacle 698 whose height can be adjusted by adjusting the position of hook bracket 699 on any one of a plurality of posts 697. A side brace is generally designated at 695. The side brace 695 is attached to the base 672 at eyelets 695B. When a van section is being removed from the trailer frame the track extension supports 676 might tend to tip. Thus, the outer tube 695A is extended against the trailer frame (as represented in FIG. 26C) and fixed into position by inserting a pin 695E through one of bores 695C on a first coencentric tube 695A and through one of bores 695D on a second concentric tube. In this fashion, the track extension supports are held in place when the van sections are removed from the trailer frame.

Figure 26E:
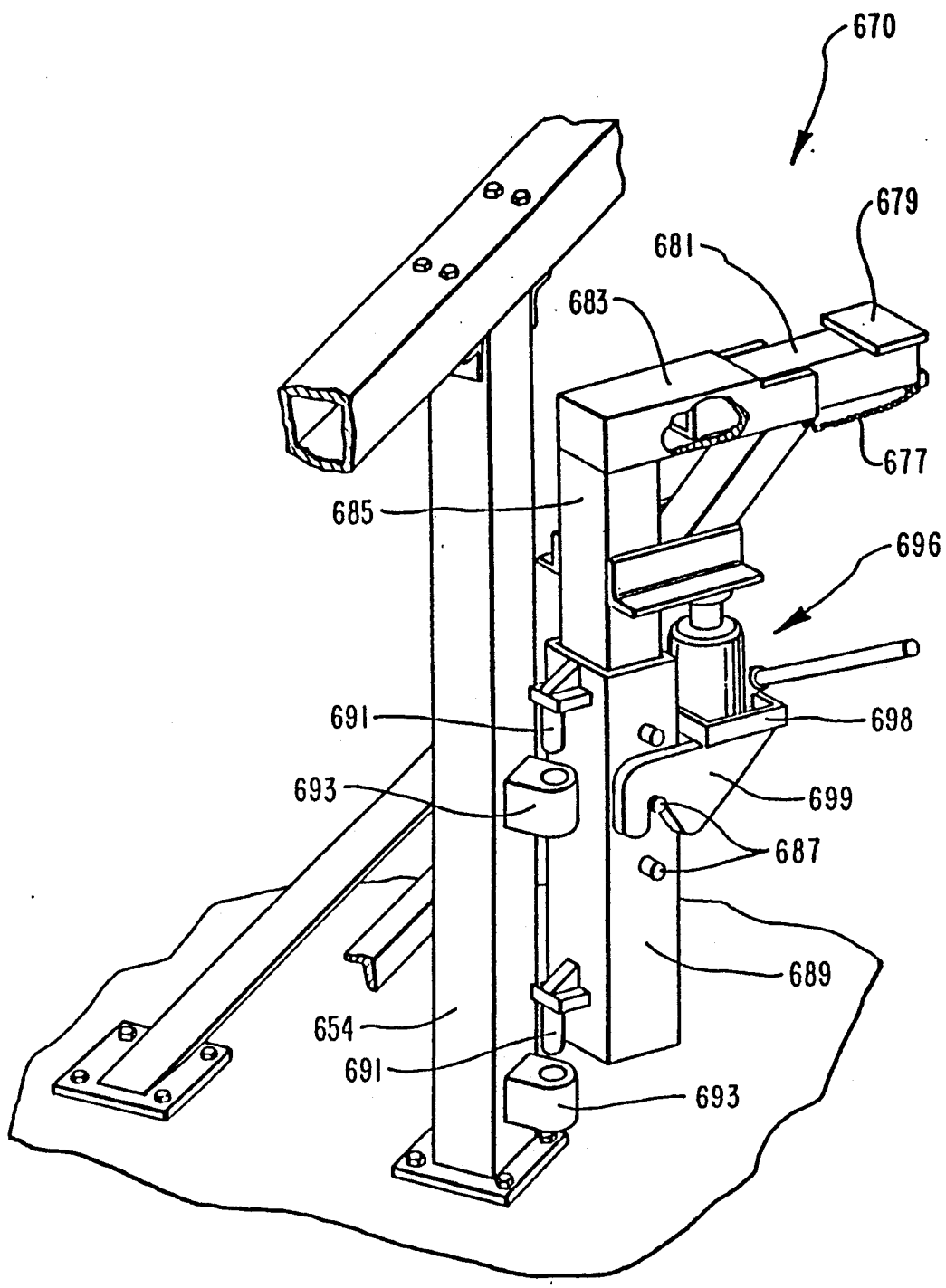
FIG. 26E is a perspective view of the track support structure illustrated in FIG. 26A-C.

Next referring to FIG. 26E, a perspective view of a lift device, generally indicated at 670, which functions to lift the side of the van section closest to the van section storage and removal rack. The lift device 670 pivotally attaches to the van section storage and removal rack leg 634 by way of two pintles 691 which are inserted into eyes 693 which are provided on the leg 654. The pintles 691 support a lift housing 689 into which a lift leg 685 is inserted. An arm 683 extends perpendicularly from the lift leg 685. An extension arm 681 telescopes into and out of the arm 683. The extension arm 681 is provided with a plate 679 which contacts the underside of the van section as the van section is raised and lowered using the hydraulic jack 696. A restraining chain 677 prevents the extension arm 681 from being completely removed from the arm 683. The hydraulic jack 696 is held in place using the before described hydraulic jack receptacle 698 whose height can be adjusted by adjusting the position of hook bracket 699 on any one of a plurality of posts 687.

Figure 26F:
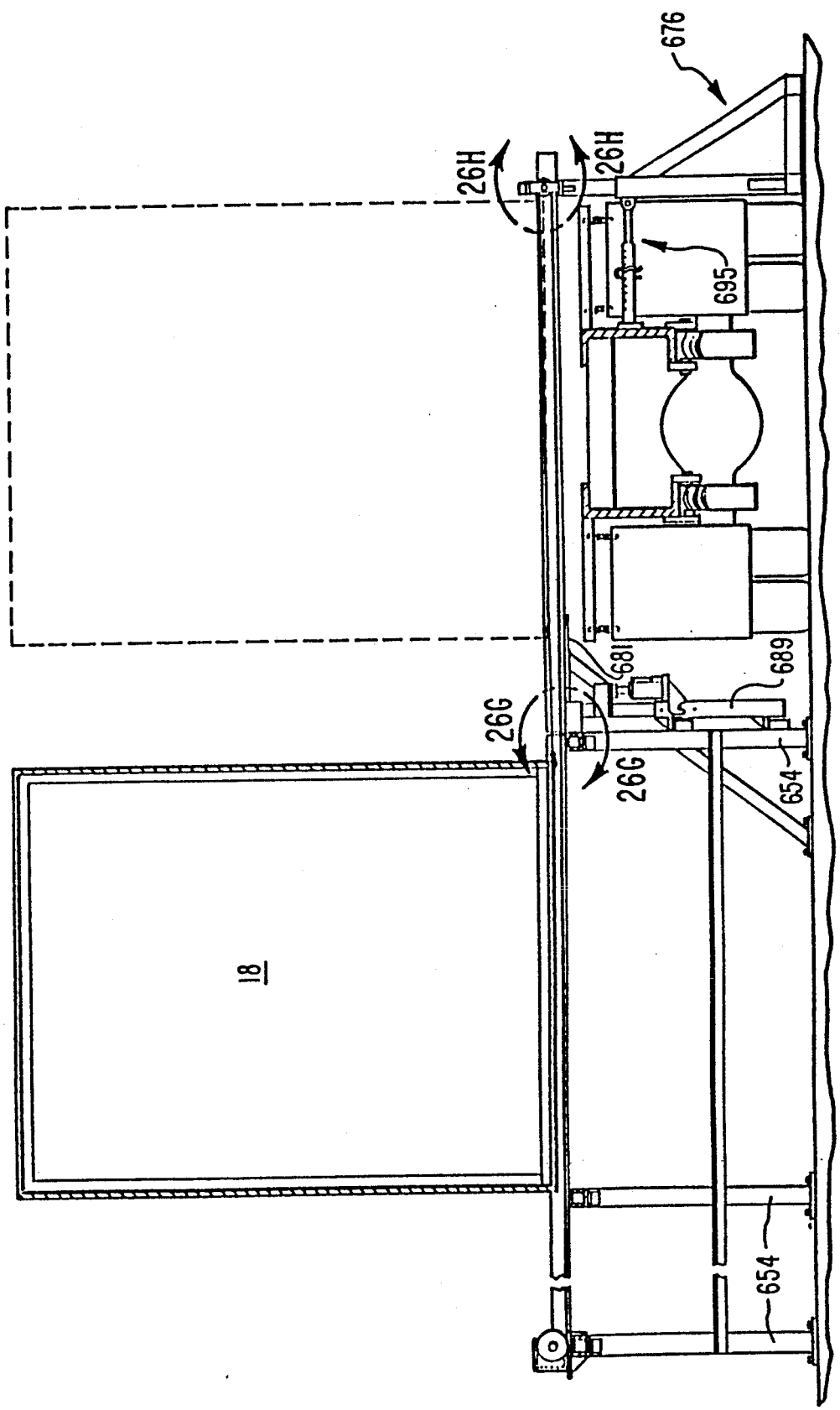
FIG. 26F is an end view of the of the van section removal and storage rack illustrated in FIG. 26C showing the removal of a van section from the trailer frame.
Figure 26G:
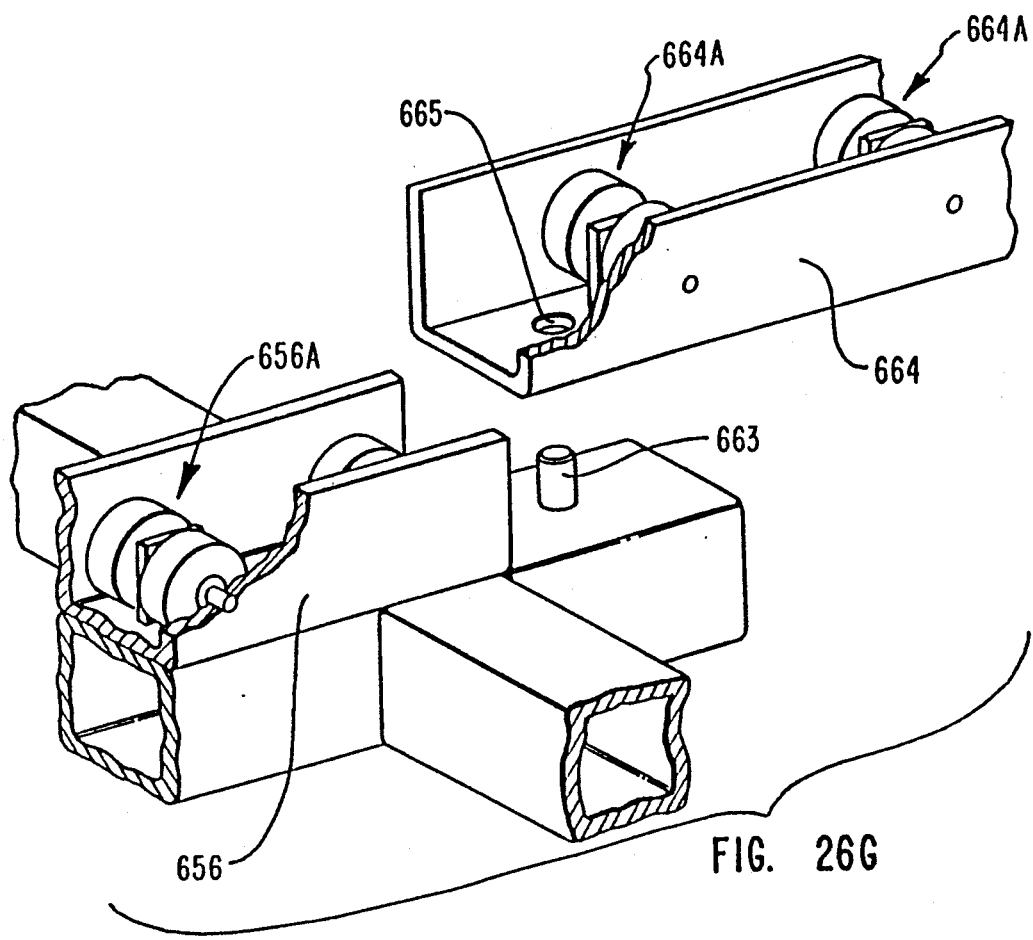
FIG. 26G is a partially cut away perspective view taken along line 26G—26G of FIG. 26F.
Figure 26H:
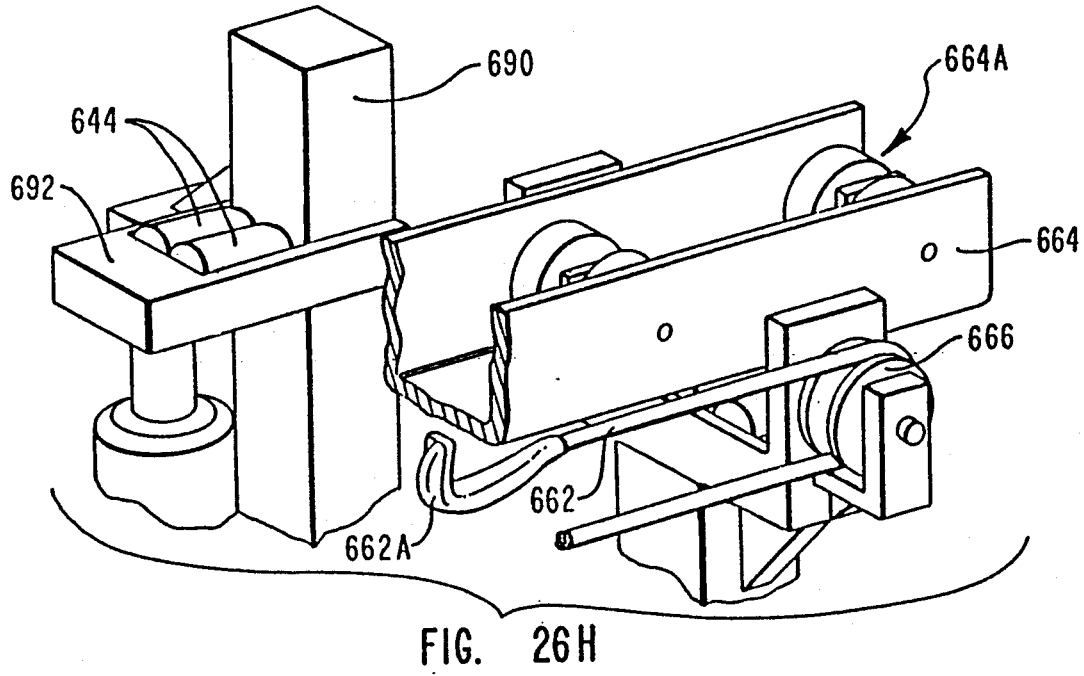
FIG. 26H is a partially cut away perspective view taken along line 26H—26H of FIG. 26F.

FIG. 26F provides an end view of the van section 18 being lifted off the trailer frame and the track extensions being placed thereunder and the van section being rolled onto the van section storage and removal rack. FIG. 26G provides a partial perspective view of the track 656 and the rollers 656A provided therein. FIG. 26G also illustrates the extension track 664 with the rollers 664A provided thereon. A post 663 is inserted into a hole 665 to hold the track extension 664 in alignment with the track 656 but still allow some pivoting movement to ensure smooth transfer of the van section between the track extension 664 and the track 656. Represented in FIG. 26H is the other end of the track extension 664, the pulley 666, and a hook 662A provided at the end of the cable 662. Additional detail of the van section jack leg 690, the ledge 962 protruding from the leg 690, and the plurality of rollers 644.

The van section storage and removal racks, and their associated structures, which are described herein provide greater versatility to the system utilizing the van sections described herein. In practice, a location may be provided with van section storage and removal racks which can accommodate a large number of van sections; still it is only necessary to provide two track extensions 664, two track extension supports 668, and one lift device 670 at each location. It will be appreciated that the structures just described can be modified using the teachings provided herein to arrive at numerous alternative embodiments.

As mentioned previously, it is generally the case that moving household belongings requires the construction of partition walls and shelf decks within a cargo holding section. Trucks and trailers adapted for hauling commercial freight are generally not provided with the materials necessary to construct decks and partitions. If freight hauling trucks and trailers are equipped with partition and deck building materials, the materials often take up valuable cargo space.

In the case of trucks and trailers adapted to haul household belongings, the materials used to construct decks and partitions are usually stored in a haphazard fashion in specially constructed pods attached to the trailer frame under the cargo hauling section. Thus, previously available freight hauling trucks and trailers were not, or were inefficiently, adapted to haul household belongings. Moreover, previously available trucks and trailers, even those specifically designed to haul household belongings, did not allow for efficient building of decks and partitions. Still further, prior to the advent of the present invention, there was no truck or trailer available in the art which was adapted to efficiently haul both commercial freight and household belongings.

Illustrated in FIG. 27 is a top plan view of three van sections, also referred to as cargo compartments (502, 504, and 506), generally constructed in accordance with the previously provided disclosure. The three illustrated van sections are attached to a trailer frame (only partially shown at 28) also fabricated as generally explained earlier. Each of the van sections are provided with a removable front wall (514A-514C) which will be described shortly, two side walls (510A-510C and 512A-512C) and a roll-up rear door (516A-516C). The forward van section 502 is, in the illustrated embodiment, also provided with a side door 508.

All of the van sections (502, 504, and 506) are each individually securable and weather proof. The van sections can be removed from the trailer frame, left at a loading or unloading location, and attached to the same or a different trailer frame as has been previously described. All of the van sections may also be interconnected to form a continuous van body comprising two or more van sections.

In the preferred embodiments described herein, each of the individual van sections provides a substantial amount of cargo space, often more than a single customer may need. Thus, the present invention provides that removable partition walls, one of which is generally designated at 518, may be constructed within any of the van sections to divide the van sections into two, or possibly more, cargo hauling sections.

The removable partition walls and the removable shelf decks to be described herein have application in both the van sections of the present invention and in other cargo holding sections. Such cargo holding sections, as the term is used herein, include the cargo containing or holding portions of a wide variety of transportation equipment including, for example, trucks, trailers, rolling stock, and containerized vehicles.

Figure 27A:
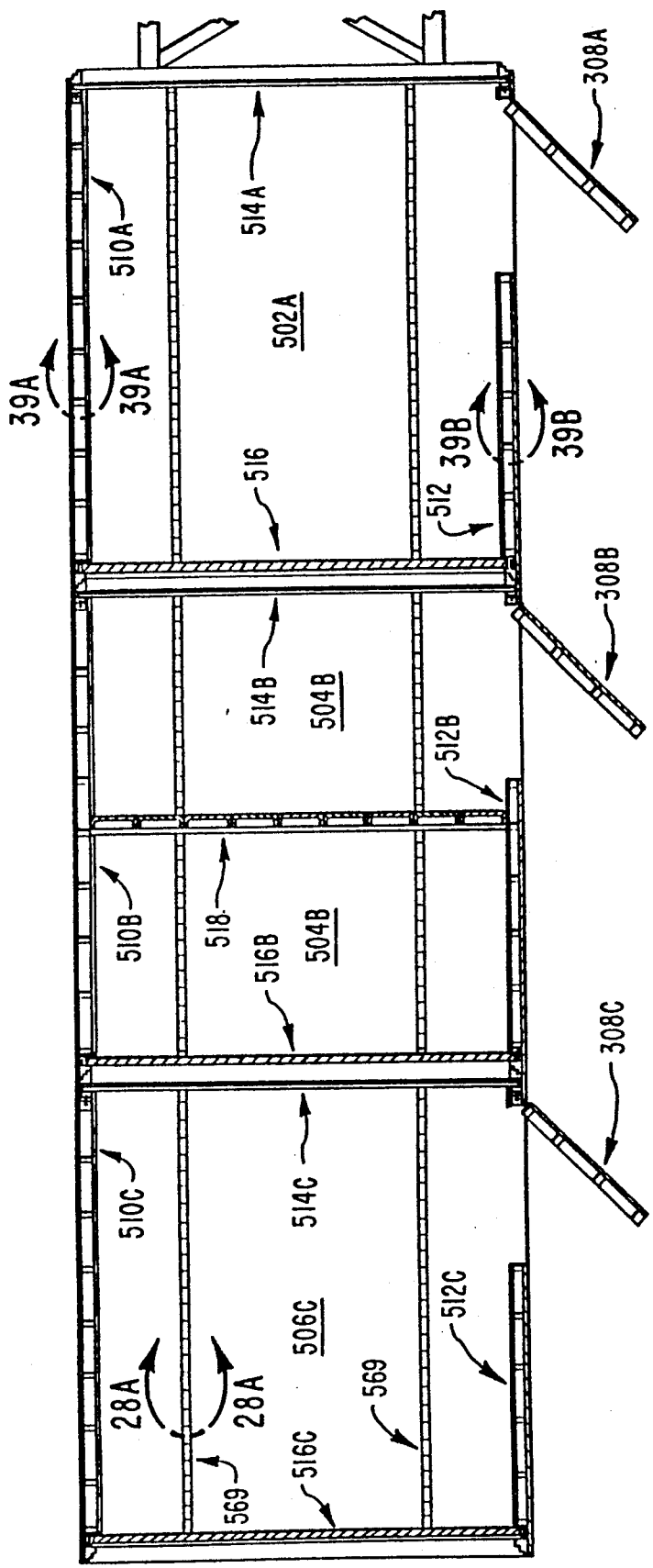
FIG. 27A is top plan view of additional van sections constructed in accordance with the present invention having components for constructing removable decks and having a removable partition built within one the van sections.

Represented in FIG. 27A is a top plan view of three additional van sections 502A, 504B, and 506C. Each of the van sections 502A, 504B, and 506C have front, side, and rear walls or doors as illustrated in FIG. 27. Importantly, each of the van sections 502A, 504B, and 506C is provided with a side door 508A, 508B, 508C, respectively. Providing a side door is important to allowing the van sections to be used individually to move household belongings. A side door such as represented at 508B is particularly important when a partition wall, such as that represented at 518, is constructed in the van section since the well sealed front door 514B prevents easy access into the van section 504B therethrough.

Figure 28:
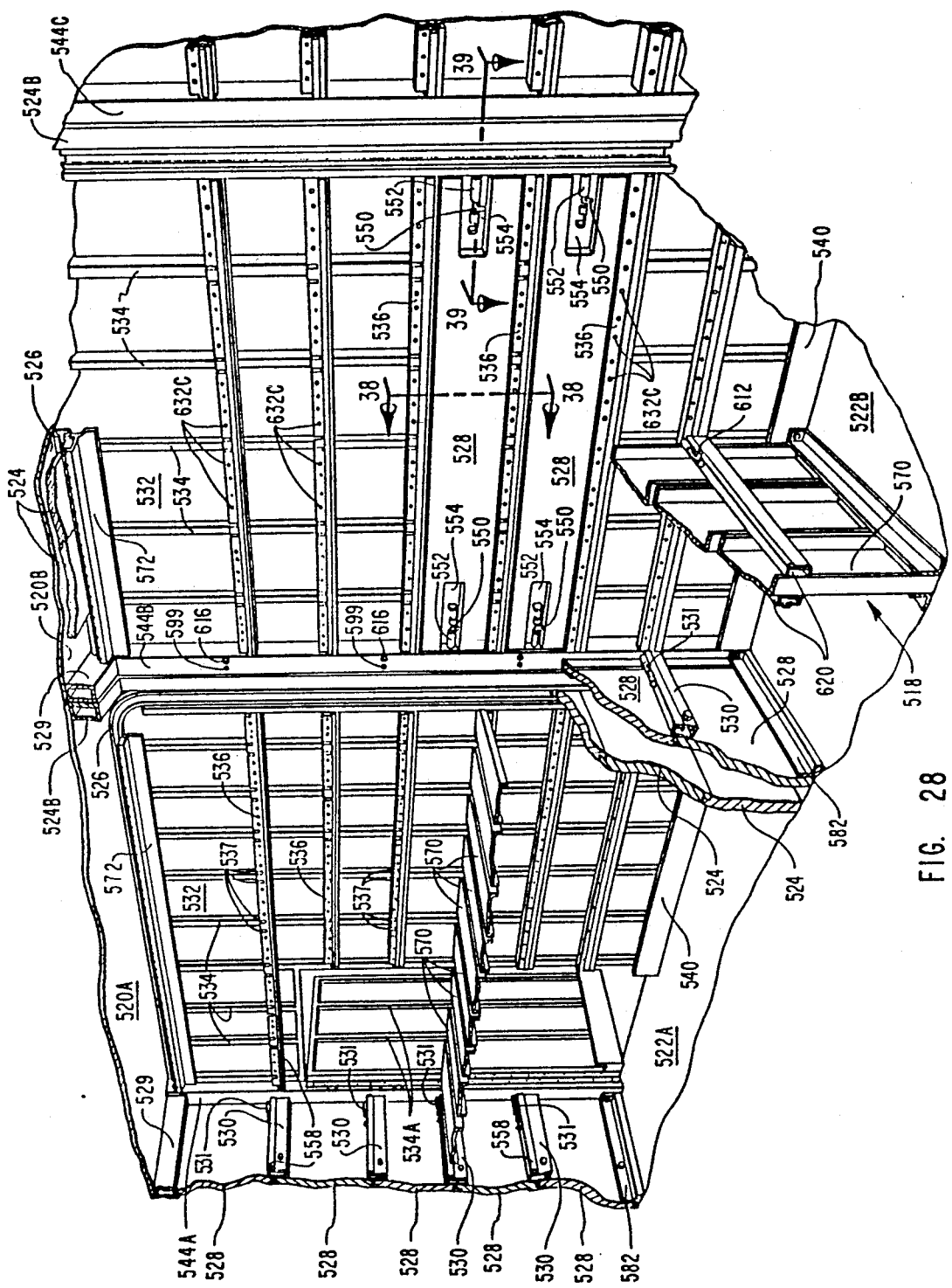
FIG. 28 is a partially cut away perspective view of the right side interior of two of the van sections illustrated in FIG. 27.

Referring next to FIG. 28, a partially cut away perspective view of the right side interior of two of the van sections (502 and 504) is provided. In the forward van section a shelf deck, hereinafter referred to as a "shelf" or "deck," has been constructed. In the second or middle van section, a partition wall, hereinafter referred to as a "wall" or "partition," has been constructed.

It should be appreciated that the decks and partitions illustrated herein may be constructed in any of several locations within the van sections. Moreover, both a deck and a partition may be constructed in a single van section.

As illustrated in FIG. 28, each van section is provided with a roof, e.g., 520A and 520B, and a floor, e.g., 522A and 522B, in accordance with the earlier provided description. Both of the illustrated van sections are provided with roll-up rear doors comprising roll-up door panels, some of which are indicated at 524, which ride on tracks indicated at 526. When the roll-up doors are in the up or open position, the door panels 524 are supported by a plurality of supplemental door support rollers attached to door support brackets 572.

The forward and middle van sections represented in FIG. 28 are shown having a removable front door in place comprising a plurality of door panels, also referred to as door units, 528 extending from one vertical corner frame member, e.g., 544A, to the opposing vertical corner frame member, not shown in FIG. 28, and from the header 529 to the floor 522A of the van section.

As represented in FIG. 28, the door panels 528 are held in place by floor L bracket 582 and horizontal cross bars 530 as well as other structures to be described in detail later in this disclosure. Each of the cross bars 530 are provided with a strip of resilient cushion 558, as are many of the interior surfaces of the van sections, to prevent damage to articles transported therein. As will be explained later, the door panels can be used to construct a partition within the van section if they are not used to from a front door.

As shown in FIG. 28, the visible van section walls comprise a plurality of vertical studs, some of which are indicated at 534, to which an outer wall, indicated at 532, of the van sections is attached. A kick plate 540 is provided along the lower portion of the walls to prevent damage to the studs and to protect the outer wall from impacts as the van sections are loaded and unloaded.

As will be explained in detail, the present invention provides that the decks and partitions which are constructed within the van sections can be built from components which are stored in each of the van sections without consuming valuable cargo space. In the illustrated embodiments, the components used to construct the decks and partitions are stored between and within the width of the vertical studs (650 in FIG. 37) while the door panels are stored horizontally between the stringers 536 attached to the vertical studs 534, as shown in the case of door panels 528 indicated in FIG. 28. Thus, by storing the pertinent structures integrally with the walls of the van section, the deck and partition building components do not protrude into the cargo space and, in the illustrated embodiment, form a relatively smooth interior wall.

The deck represented in the van section illustrated in FIG. 28 comprises a plurality of planar units indicated at 570 which may be used to construct a deck such as that formed in one van section or a partition as that formed in the other van section. Preferably, each of the planar units, whether used to construct a deck or a partition, is identical. The planar units may be formed differently than shown herein if it is desired to have deck units different than partition units.

The planar units are preferably fabricated from a lightweight metal or a plastic or composite material. It is to be appreciated that the planar units may be of dissimilar structure or of different structure from that shown herein and still come within the scope of the present invention. Importantly, the planar units, and all of the structures of the present invention, should be fabricated to be as light as possible, while still retaining adequate strength, to allow the most freight and household belongings to be transported without exceeding weight limitations. Those having skill in the pertinent arts will be able to readily fabricate the planar units and other described structures using the disclosure provided herein.

To form a deck, the planar units 570 are supported on one of a plurality of stringers 536 which are attached to the vertical studs 534. Each of the stringers 536 are provided with a plurality of notches into which the legs of the preferred planar units 570 are inserted and slidably held in place. The structures provided on the left van section wall used to support the other end of the planar units will be described later in connection with FIG. 37.

The planar units 570 are also used to construct partitions such as the partition 518 illustrated in FIG. 28 and generally designated 518. As can be seen in FIG. 28, the planar units 570 are oriented vertically to form a partition within a van section. Additional information regarding the structures used to hold the front door panels 528 and decks and partitions in place will be provided later.

Two door panels 528 are shown in the second van section in their storage position. As can be observed in FIG. 28, and as will be explained in more detail shortly, means is provided to store the door panels 528 horizontally between the stringers 536 and such that they do not protrude substantially beyond the stringers 536 into the cargo holding space of the van section (see FIGS. 35 and 36). When the door panels are stored within the width of the wall of the van section, they do not consume the valuable cargo space of the van section and form a substantially smooth interior wall.

Figure 28A:
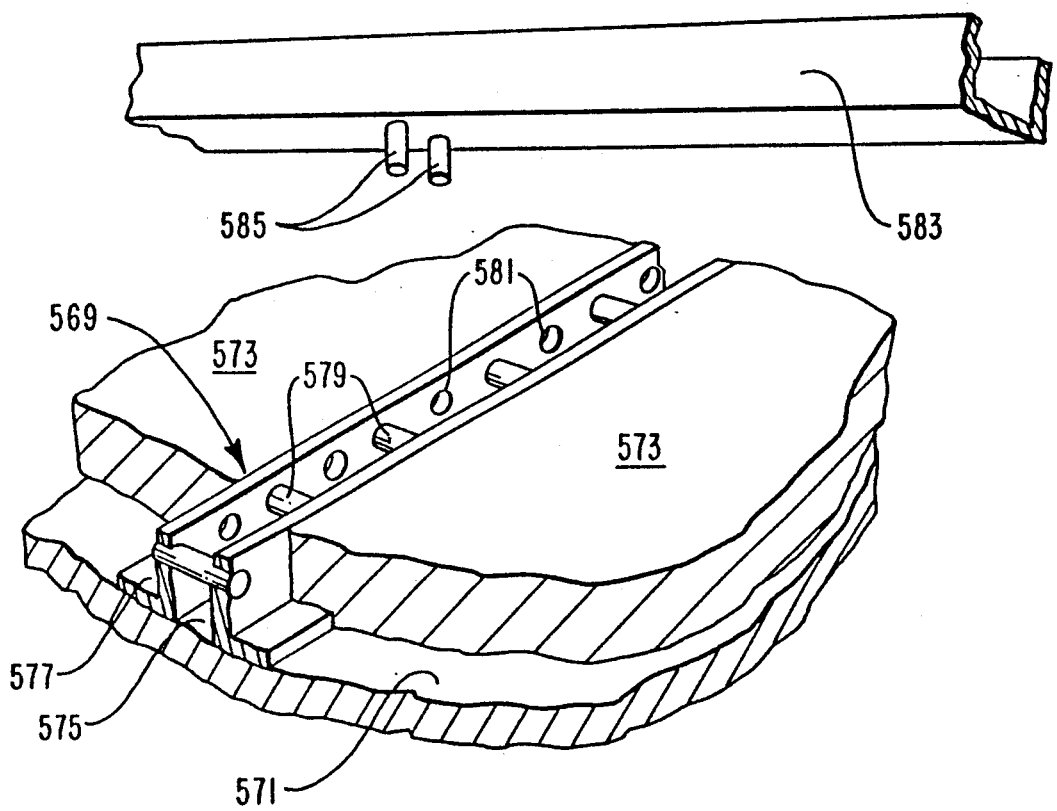
FIG. 28A is a partially cut away perspective-view of the floor of the van sections represented in FIG. 27A and an accompanying structure used to hold removable partitions in place.

Provided in FIG. 28A is a partially cut away perspective view of the floor of the van sections represented in FIG. 27A and the track structure used, among other things, to hold removable the removable partitions in place. One preferred arrangement for the floor of the van section is to include a primary floor 571 which provides structural integrity for the van section and a secondary floor 573 which provides a level loading surface for cargo. A track structure, generally designated at 569, includes a first rail 575 and a second rail 577. A plurality of receptacles 581 are provided to receive car tie down members (not illustrated). Also provided are a plurality of pins 579 which engage pegs 585 protruding from the bottom of a partition floor bracket 583. The partition floor bracket 583 functions to hold the bottom of the units used to form a partition wall in place.

Figure 28B:
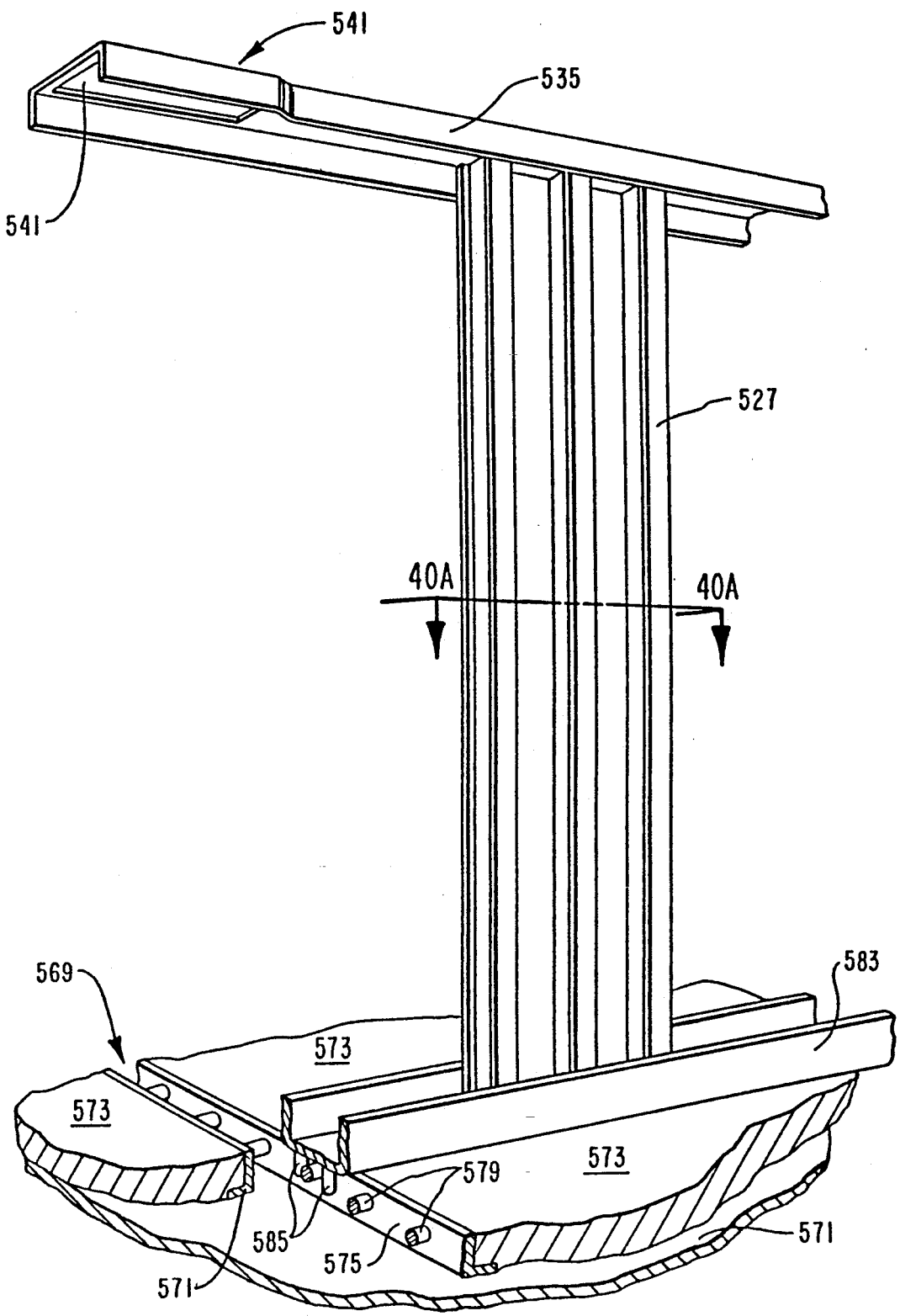
FIG. 28B is partially cut away perspective view of a partially constructed partition wall within a van section.

Referring next to FIG. 28B, a partially constructed partition wall, including one partition unit 527, is illustrated as being received by the partition floor bracket 583 and by a ceiling partition bracket 535. The ceiling partition bracket 535 is attached to the side walls or ceiling of the van section. With both the partition floor bracket 583 and the partition ceiling bracket 535 in place, the partition units 527 can, one by one, be slide up into opening 541 provided in a gate on the partition ceiling bracket 535 and then lowered into the partition floor bracket 535. Thus, one by one, a partition wall can be easily constructed.

Figure 29:
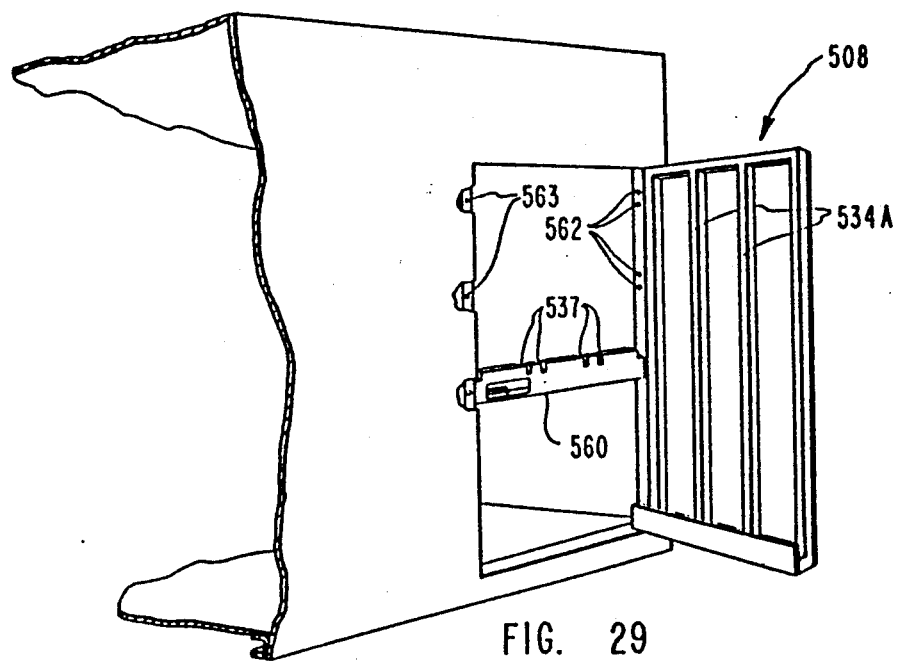
FIG. 29 is a perspective view of a front door provided in one of the van sections and the deck built therein.

As shown in FIGS. 27, 27A, and 28, a side door 508 is provided on the van sections. In order to construct a deck at the location of a side door, a door spanner 560 is provided as represented in FIG. 29. The door spanner 560 provides support for one end of the planar units as shown in FIG. 30.

The door spanner 560 is provided with two fixed pins 564 which are received into the corresponding pairs of receptacles 562 which are illustrated in FIG. 29. The door spanner is also provided with a moving pin 568, shown in FIG. 30 in its extended position at 568A, which engages one of the receptacles 563. A recess 566 is provided on the surface of the door spanner 560 to allow unrestricted operation of the moving pin 568. The door spanner 560 is dimensioned such that the side door 508 opens and closes freely with the door spanner 560 in place. In order to accommodate the door spanner, the vertical studs 534A included in the side door 508 are approximately one-half the thickness of the vertical studs 534 comprising the right wall of the van section.

Figure 30:
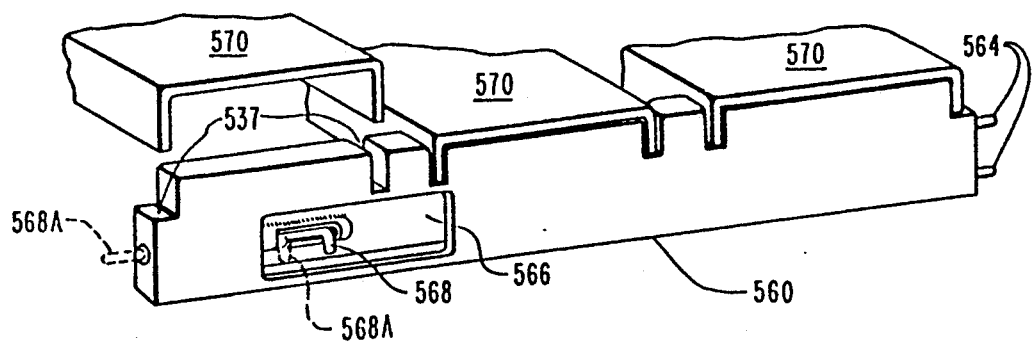
FIG. 30 is a perspective view of the door spanner structure illustrated in FIG. 29.

FIG. 30 shows the planar units 570 are received in notches 537 and are held in place so that the planar units are allowed to slide longitudinally therein. By positioning the door spanner 560 within the door way, a deck can be constructed without interruption in a van section as represented in the first van section shown in FIG. 28. It can also be observed in the figures that the when a deck is constructed, the planar units are desirably spaced apart to allow ventilation therebetween.

Figure 31:
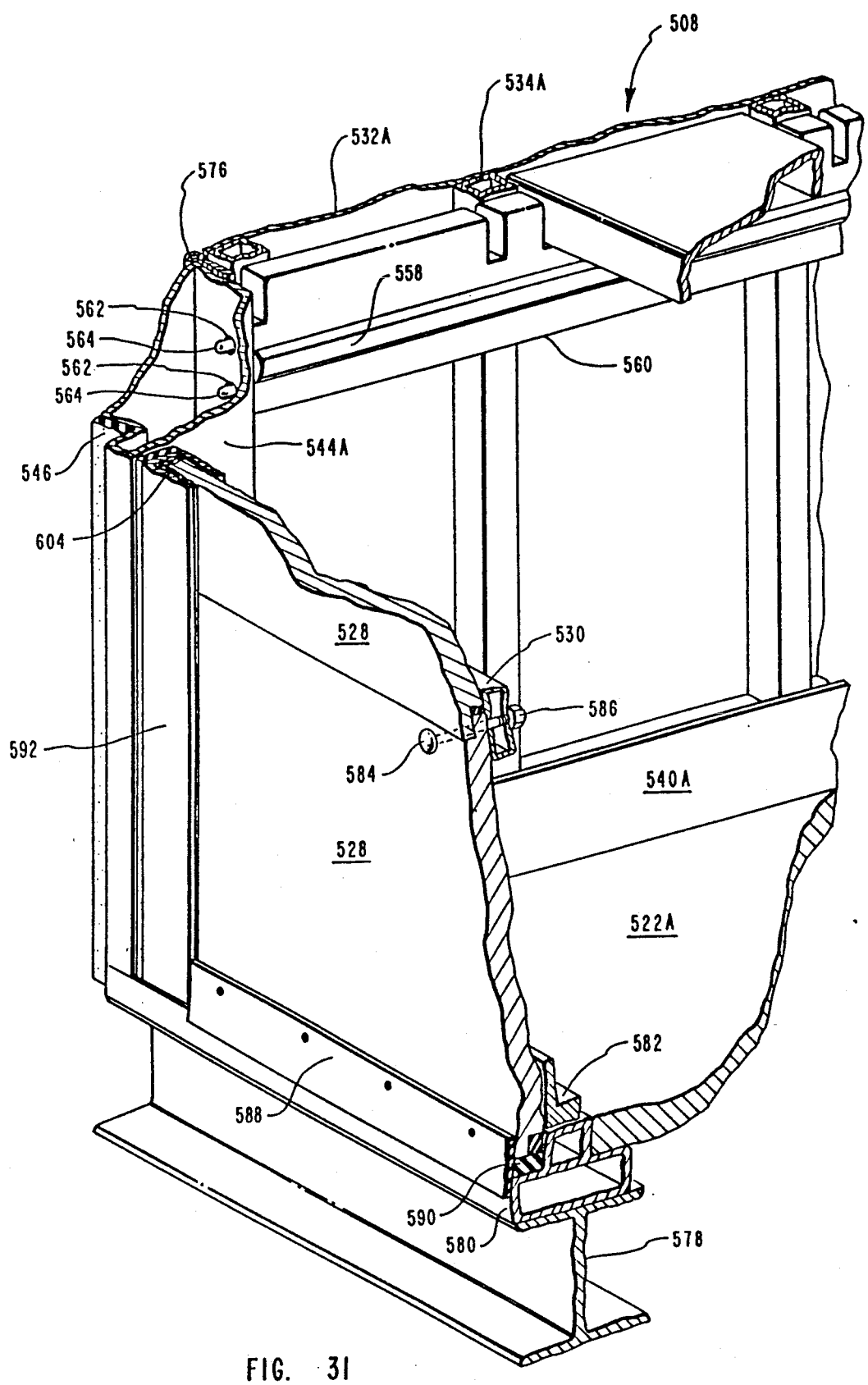
FIG. 31 is a partially cut away perspective view of the front door panels installed in a van section.

Referring next to FIG. 31, a partially cut away perspective view of the side door 508, the door spanner 560, and the front door panels 528 in place on the first van section, is provided. In the cut away portion of FIG. 31, the half thickness studs 534A and the outer wall 532A of the side door 508 can be seen. Also illustrated in FIG. 31 is a hinge 576 which connects the side door 508 to the van section and a kick plate 540A attached to the lower portion of the side door 508.

Still referring to FIG. 31, a support member I-beam 578 is shown with a frame member threshold 580 attached thereto. Between the bottom door panel 528 and the threshold 580 a resilient gasket 590 is placed to prevent penetration of moisture and dirt into the interior of the van section. A resilient flap 588 is also attached to the outside lower edge of the bottom door panel to additionally ensure against entry of contaminants.

A front door panel L bracket 582 is also illustrated in FIG. 31. The front door panel L bracket 582 functions to hold the bottom door panel in place. The attaching of each of the horizontal cross bars 530 to a door panel by way of a bolt 584 and nut 586 is also illustrated in FIG. 31. The interengaging of the ship lap joint formed on the front door panels (shown best in FIG. 36 at 538) and the gasket placed therein is also represented in the cut away view of FIG. 31. The U bracket 592 which holds a first end of the front door panels in place is shown attached to the vertical corner frame member 544A.

Figure 32:
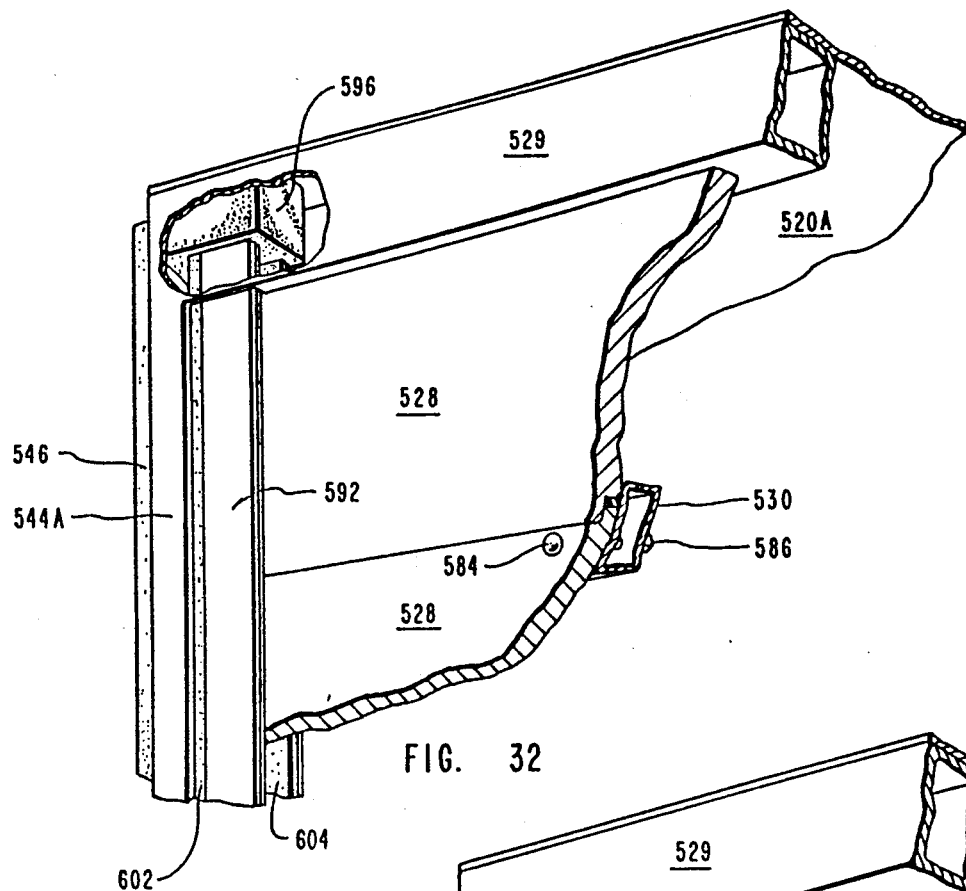
FIG. 32 is a partially cut away perspective view of the upper portion of the front door panels installed on a van section.

Referring next to FIG. 32, the upper portion of the U bracket 592 is shown as it is received into a header 529 comprising part of the van section frame. The U bracket is biased downward while in position by a block of resilient material represented at 596.

Figure 33:
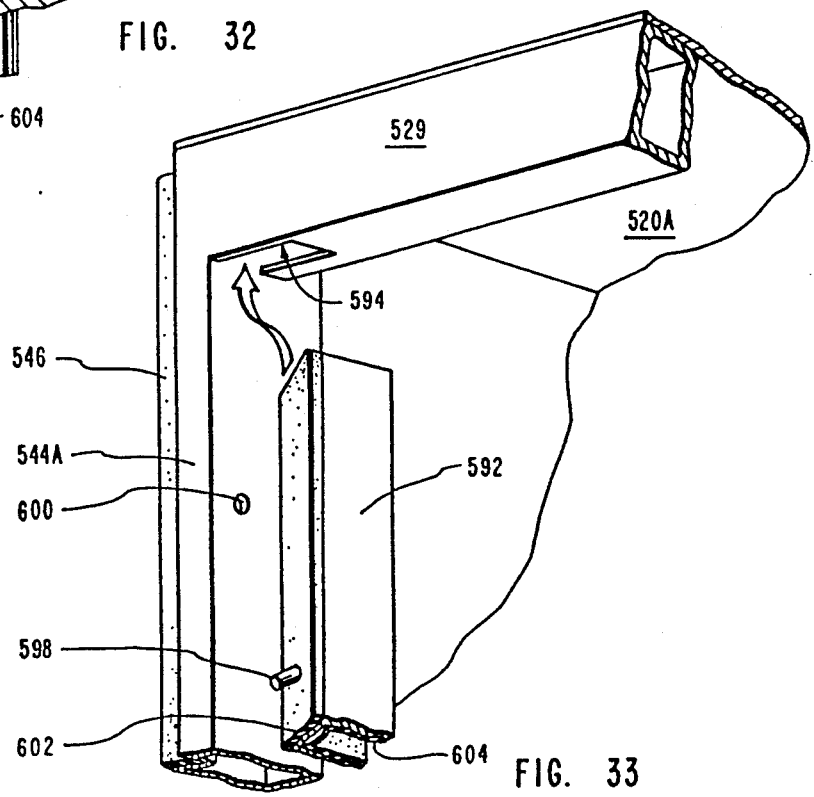
FIG. 33 is a partial perspective view of the structures used to hold the door panels in place at the front of the van section.

Referring next to FIG. 33, the U bracket 592 is shown being placed in position. As shown by the directional arrow, the U bracket 592 is received into a receptacle 594 formed in the header 529. A plurality of diagonal pins (one of which is shown at 598) protrude from the back of the U bracket 592 through a resilient gasket 602. When the U bracket 592 is installed, the diagonal pins 598 are received into their respective bores provided in vertical corner frame member 544A (one of the bores being represented at 600). Once in place, the U bracket 592 is kept in place by the cooperation of the diagonal pins 598, bores 600, and the downward pressure of the block of resilient material 596.

Once the U bracket 592 is installed, the front door panels 529 are inserted therein as shown in FIG. 32. The gasket 604 provided on inner surface of the U bracket 592 securely holds the door panels 529 in place and prevents the entry of water and other contaminants through the U bracket and door panel interface.

Figure 34:
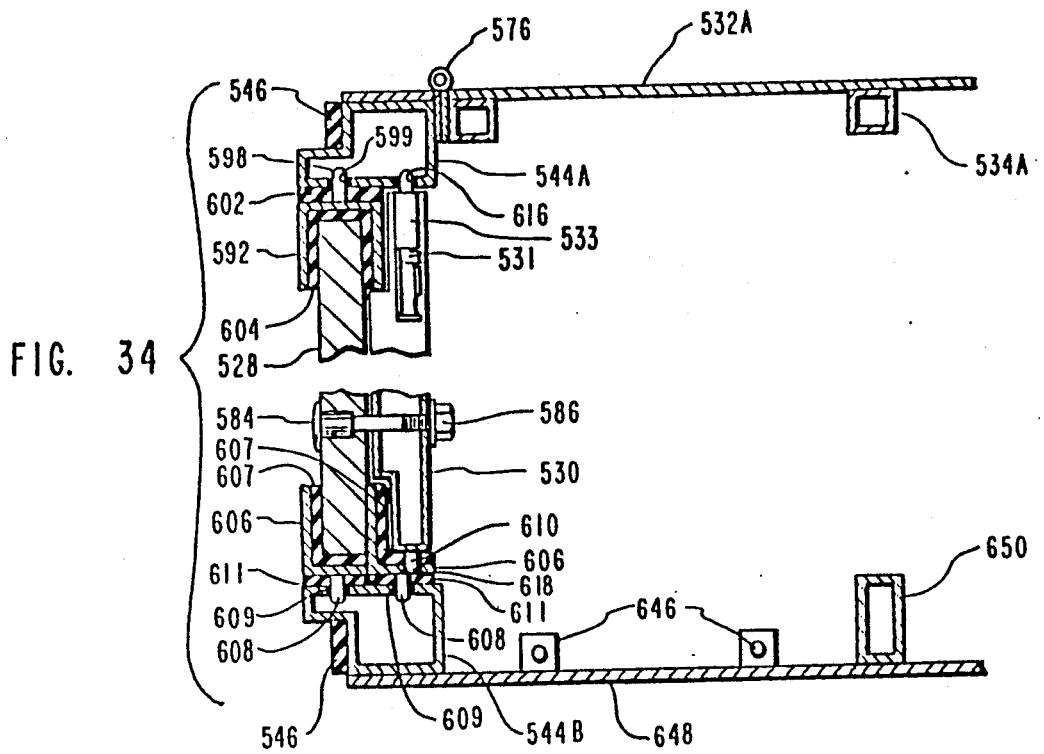
FIG. 34 is a horizontal cross sectional view showing the arrangement of the front door panels installed on a van section.

A vertical cross sectional view of the front door panels, and the structures used to hold the same in place, is provided in FIG. 34. The U bracket 592 with gaskets 604 and 602 is illustrated as being installed on the vertical corner frame member 544A. A gasket 546, which is attached to the vertical corner frame member 544A, is also represented. The U bracket firmly holds a first end of the front door panels 528 in place.

A second end of the front door panels 528 is illustrated in FIG. 34 as is the bolt 584. The second end of the front door panels is held in place by two L brackets, each identified in FIG. 3 at 606. Each of the L brackets 606 are provided with a plurality of diagonal pins, such as those shown at 608, which protrude through gasket 611 and are received into bores 609 provided in another vertical frame corner member 544B in a fashion similar to that described in connection with the vertical frame member 544A and the U bracket 592. Each of the L brackets 606 are provided with an inner gasket 607 which functions to cushion either the front door panels 528 and cross bars 530 as they are held in place.

Continuing to refer to FIG. 34, with both L brackets 606 and the cross bar 530 installed, the front door panel 528 is securely held in place. The cross bar 530 is installed by inserting fixed pin 610 into the bore 618 provided in the adjacent the L bracket 606. A plurality of bolts, such as bolt 584, is inserted through bores provided in both the cross bar 530 and the door panel 528 and secured in place by nuts 586. The remaining end of the cross bar 530 is provided with a movable pin 531 held in place by bracket 533. The movable pin is retracted while the cross bar is being installed and is extended into bore 616, provided in vertical corner frame member 544A, in order to secure the cross bar into place.

As can be observed in FIG. 34, the cross bars 530 are formed so that they fit tightly against the structures of the door panel 528 and the structures associated therewith. Using the described structure for the front doors of the van sections provides that the front doors are securely held in place and prevent contaminants from entering the interior of the van section.

Figure 33A:
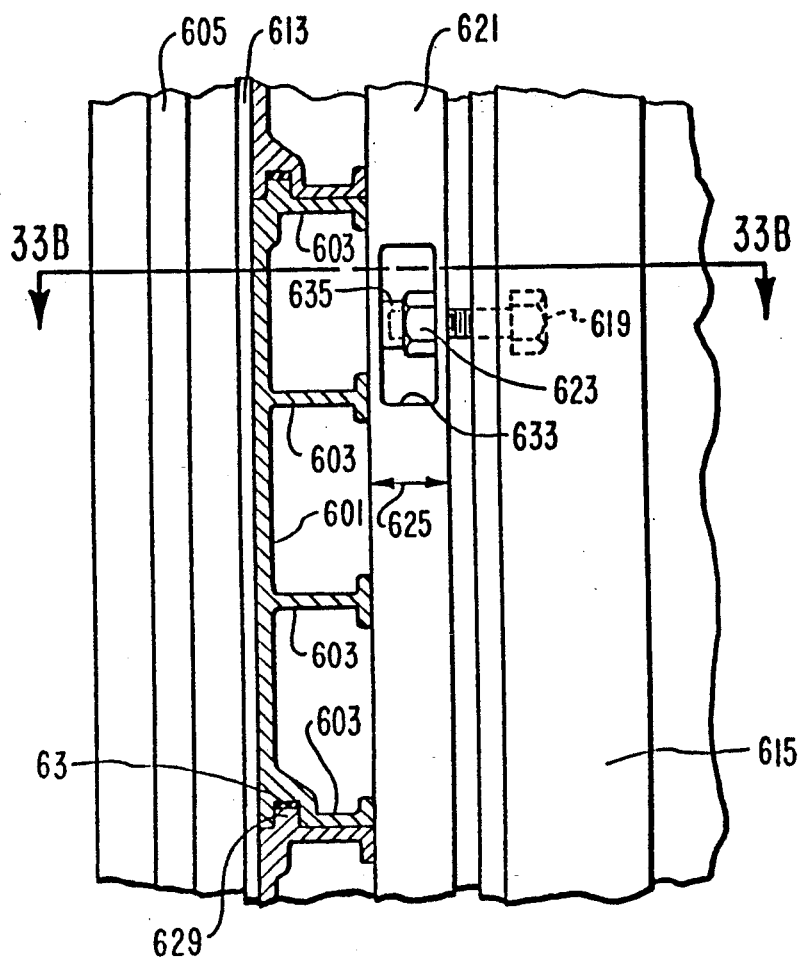
FIG. 33A is a cross sectional view of an assembled front door of one van section constructed in accordance with the present invention.
Figure 33B:
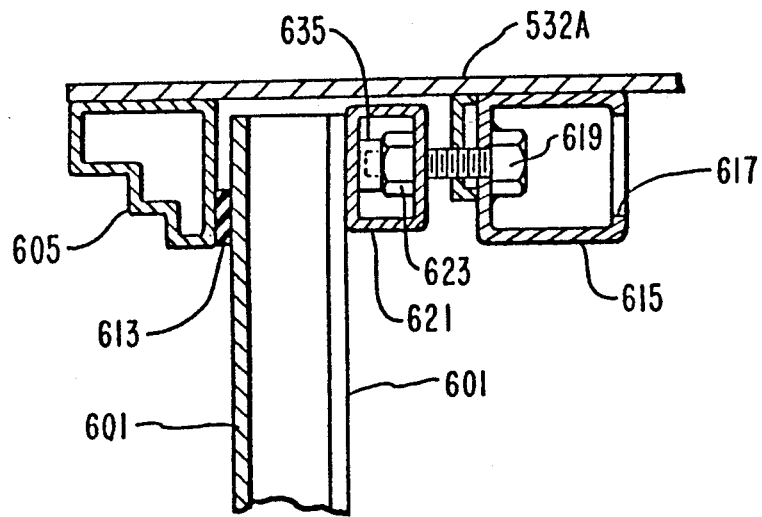
FIG. 33B is a horizontal cross sectional view of the assembled front door of one van section taken along line 33B—33B in FIG. 33A.

Provided in FIGS. 33A and 33B are cross sectional views of alternative front door panels 601 and associated structures which form a removable, yet secure and weather-tight, front door for the van section. The general shape of the front door panels 601 can be seen best in FIG. 33A, with each front door panel 601 being provided with four legs 603 which extend perpendicularly from the flat surface of the front door panel 601. With the front door panels 601 installed, a ridge 629 engages a gasketed groove 631 in the adjoining front door panel 601.

FIG. 33B illustrates a side wall 532A of a van section. A vertical corner frame member 605, which engages a complementary shaped frame member of another van section when positioned on the trailer frame (28 in FIG. 2). When the front door panels 601 are assembled as a front door for the van sections, they are stacked upon each other to fill the front door opening of the van section as partially illustrated in FIG. 33A. The flat surface of the front door panels 601 are laid against a vertical corner frame member gasket 605 as shown most clearly in FIG. 33B.

In order to hold the front door panels 601 tightly against a gasket 613, a bar 621 runs substantially the vertical height of the front door opening in the van sections. The bar 621 is pressed against the front door panel legs 603 using a plurality of vertically spaced captive bolts, one of which is represented at 619, and corresponding nuts, one of which is represented at 623. The bolts 619 are secured to the interior of a stud 615, through an opening 617 provided therein, so that their threaded shafts protrude therethrough.

With the bar 621 in place the nuts 623 are threaded onto bolts 619 with access to the bolts 619 being gained through openings, one of which is represented at 633, provided in the bar 621. As the nuts 623 are rotated they press against a plurality of corresponding risers 635 resulting in the bar 621 pressing against the front door panels 601. With the front door panels 601 pressed tightly against the gasket 613, a secure and weather-tight seal is provided. It will be appreciated that the illustrated structure provides a straight forward, yet strong, structure to close the front door opening of the van sections and protect the cargo therein from theft and adverse weather.

The door panels of the illustrated embodiment allow a front door to be readily constructed in any of the van sections. If it is desired to interconnect any or all of the van sections, the door panels may be efficiently removed from a van section. When the door panels are not being used, they are stored in the wall space of the van section.

Figure 35:
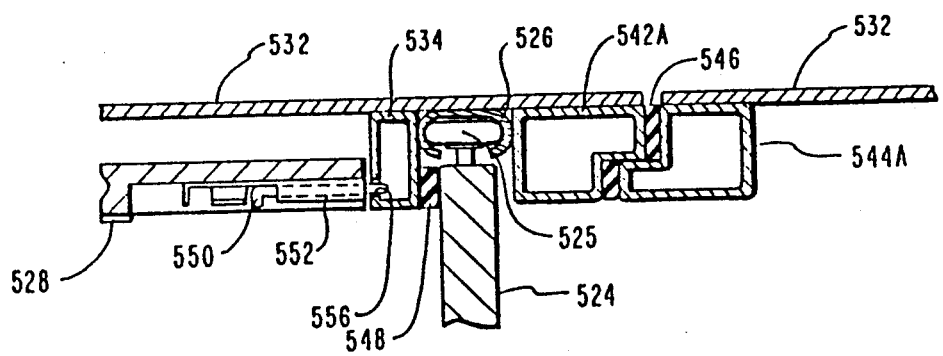
FIG. 35 is a horizontal cross sectional view of the walls of two van sections, the rear·roll-up door of a van section, and a front door unit placed in its storage position within the wall structures of a van section.

FIG. 35 is a horizontal cross sectional view of a door panel 528 stored within the width of the right wall of the van section. The cross sectional shape of a rear vertical corner frame member 542A is shown in FIG. 35. The cross sectional shape of a front vertical corner frame member 544A is also represented in FIG. 35. The two vertical corner frame members are shown interengaging as they are when secured together on a trailer frame. A gasket 546 is placed between the two vertical corner frame members.

Also is illustrated in FIG. 35 is a roll-up door panel 524 with a roller 525 and the associated roll-up door track 526. A resilient gasket 548 is preferably mounted to a stud 534 adjacent to the roll-up door panels when in the closed position. The outer wall 532 of the van section is also represented in FIG. 35.

The front door panel 528 represented in FIG. 35 is shown in its stored position between two stringers (not shown in the figure) and within the width of the van section right wall. The movable pin 550 is held by a bracket 552. When the movable pin 550 is retracted, the door panel 528 can be placed between the horizontally oriented stringers 536 which are attached to the vertical studs 534. The door panel 528 is held in its stored position by extending movable pin 550 into a bore 556 formed in a stud 534.

Figure 36:
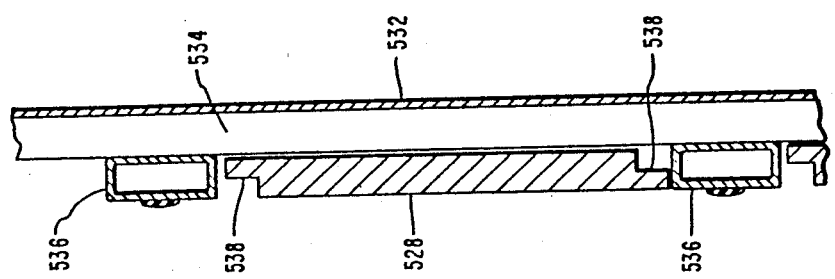
FIG. 36 is a vertical cross sectional view of the front door panel illustrated in FIG. 35 in its storage position within the wall of the van section and taken along line 36—36 of FIG. 28.

Referring next to FIG. 36, the vertical cross sectional shape of door panel 528 can be seen with the ship lap joints indicated at 538. The view provided in FIG. 36 shows how the door panels substantially do not protrude into the cargo space of the van section when stored within the side wall structures of the van section.

Figure 37:
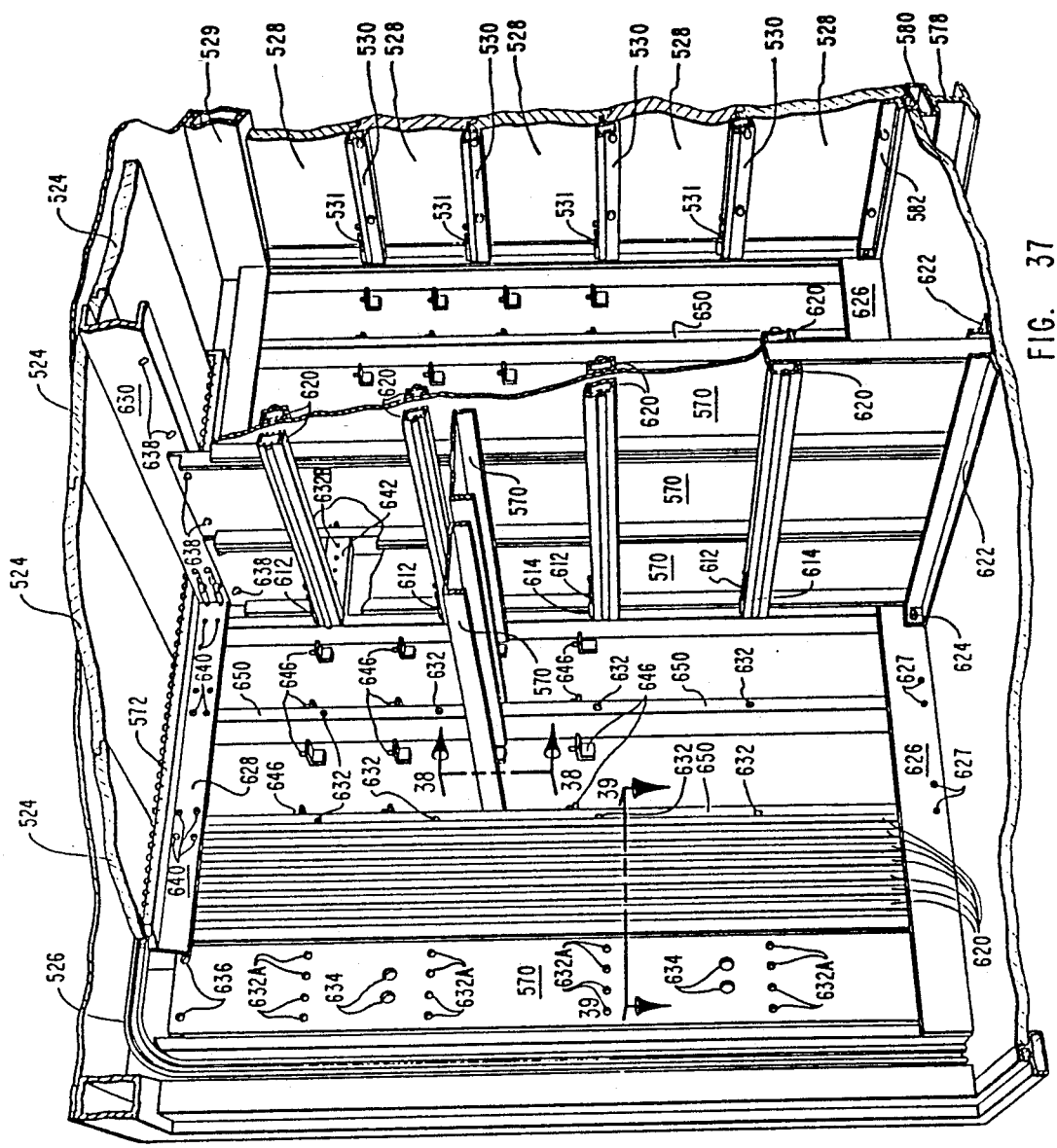
FIG. 37 is a partial perspective view of the left side interior of a van section having a partition wall and a shelf deck formed therein.

FIG. 37 provides a perspective view of another van section. The view of FIG. 37 shows the left interior side of the van section. The illustrated van section includes a front door comprising a plurality of door panels 528. A roll-up door including a plurality of roll-up door panels 524 riding on a track 526 and, in FIG. 37, the roll-up door panels 524 are supported by door support bracket 572 which includes a plurality of door support rollers.

Also represented in FIG. 37 is a partition which has been constructed of planar units to divide the van section into two separate cargo holding sections. When such a partition is constructed, each of the formed cargo holding sections may be used by individual customers.

In the illustrated embodiment, the planar units 570 are all identical and are used to construct both decks and partitions. To form a partition, the planar units 570 are hung from a partition hanger 630 by pins 638 provided on the partition hanger 630. The pins 638 engage a corresponding pair of holes 636 provided in at least one end of the planar units 570.

The partition hanger 630 is attached to a crown plate 628 by way of bolts or some other connectors which engage the bores indicated at 640. The bores 640 are spaced to properly align the partition with a vertical stud 650. As can be seen in FIG. 37, the partition can be constructed at any one of several suitable locations.

The planar units 570 which are hung from the partition hanger 630 are secured to the floor of the van section by two floor brackets 622 which are preferably held in place by bolts (one of which is shown at 624) connected to the kick plate 626 and may similarly be connected to the kick plate provided on the opposing side of the van section. Other bores 627 are provided on the kick plate 626 to allow the floor bracket to be positioned at other appropriate locations.

As further represented in FIG. 37, in order to strengthen the partition, several cross members 620 are installed on both sides of the partition. The cross members 620 are held in place using a movable pin 612, which is located on the end of each cross member 620 by use of a bracket 614. The movable pins 612 are received by bores (632, 632A, 632B, and 632C) provided in various structures.

Bores 632 are provided at properly spaced intervals on the vertical studs 650. Bores 632A are provided on the planar members. Bores 632A can be used when a planar member is being stored at a position where a partition wall is to be constructed. Bores 632B are provided on a stud spanner 642. Several stud spanners are preferably provided, one for each cross member 620. Suitable connecting points for attaching the stud spanner 642 are preferably provided in the vertical studs 650 at appropriate intervals. The cross members 620 are secured to the right interior side of the van section using a similar movable or a fixed pin arrangement which engage bores 632C provided in stringers 536 (see FIG. 28).

The partition formed in the interior of the van section may be constructed at any one of several positions within the van section. It is, however, unlikely that less than a quarter of a van section would be desired so the structures necessary to construct a partition need not be formed in the last quarter end segments of the van section. Alternatively, it may be desirable to form all of the vertical studs 650 (and stringers 536 shown in FIG. 28) identically to one another rather than leave off some structures on some of the vertical studs 650. Moreover, as will be explained shortly, the door panels 528 and the cross bars 530 can be used to construct a partition if they are not needed to build a front door.

As represented in FIG. 37, a deck, to be used as a shelf, may also be formed within the van section interior using the planar units 570. As can be observed in FIG. 37, a plurality of deck support brackets 646 are attached to the inner surface of the van section left outer wall 648 between the vertical studs 650 (see FIG. 34).

The deck support brackets 646 function to hold the planar units 570 in place at predetermined locations when the planar units are used to construct a deck. When the planar units are not in use they, and other deck and partition components, are stored within the thickness of the studs 650.

Referring next to FIG. 38, the cross sectional shape of the deck support bracket 646 can be observed. A pin 647 is provided on the deck support bracket 646. The pin 647 engages one of the holes 636 provided on the end of the planar unit 570. By securing only one end of the planar units 570 using a pin and hole arrangement, and merely resting the remaining end of the planar unit in notches (537 provided in the stringers 536 shown in FIG. 28) the side walls of the van sections are allowed to flex inward and outward without placing any undue strain on the deck support brackets 646. The side walls of the van sections flex slightly outward as heavy loads apply pressure to the van section walls, especially as the loads settle and shift against the walls during transit.

Referring again to FIG. 37, the configuration of the upper surface of the planar units 570 can be seen. The upper surface of the planar units include finger holes 634 to facilitate handling of the planar units. The planar units 570 also include bores 632A to allow cross bars 530 and cross members 620 to be secured at various positions across the van section. As mentioned, the door panels 528 and cross bars 530 can be used to construct a front door, or if a front door is not needed, a partition within the van section. Thus, if a front door is not needed on a van section, the door panels 528 can be used to construct a partition and the remaining additional planar members used to construct additional deck surface.

When not in use, the planar units 570, as well as the cross bars 530, cross members 620, and other associated structures, are stored within the width of the left wall of the van section as will be explained shortly in connection with FIG. 39. As represented in FIG. 37, the length of the planar units 570, and the dimensions of the crown member 628 provide that a space exists between the end of the planar unit 570 and the roof of the van section when the planar unit 570 is stored in a vertical orientation. Thus, the planar units 570 are retained within the van section wall space by the cooperation of the crown member 628 and the kick plate 626. To remove a planar unit from its storage position, it is lifted upward into the space provided between the end of the planar unit 570 and the roof of the van section and the other end of the planar unit is lifted up and over the kick plate 626.

One possible arrangement for storing the cross members 620, the planar units 570, the U bracket 592, and the L brackets 606 within the width of the left van section wall is illustrated in the cross sectional view of FIG. 39. The space available for storing the various deck and partition components, i.e., the distance between the outer wall 648 of the van section and the kick plate 626, is sufficient to hold the pertinent components represented herein.

Figure 39A:
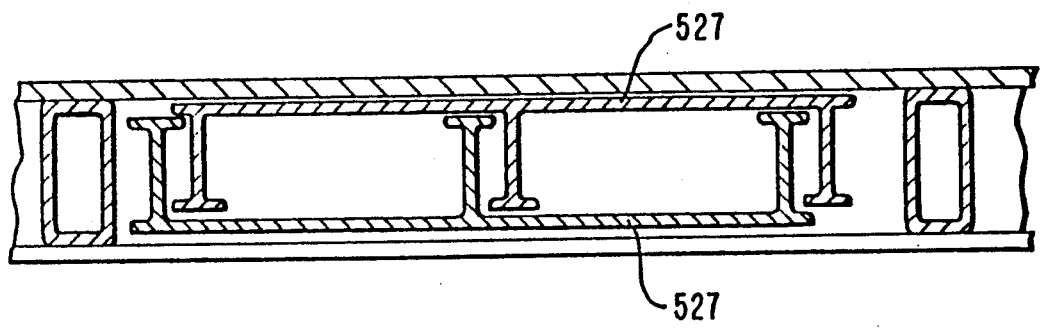
FIG. 39A is a horizontal cross sectional view of the wall of a van section taken along line 39A—39A of FIG. 27A showing the storage positions of planar deck components.
Figure 39B:
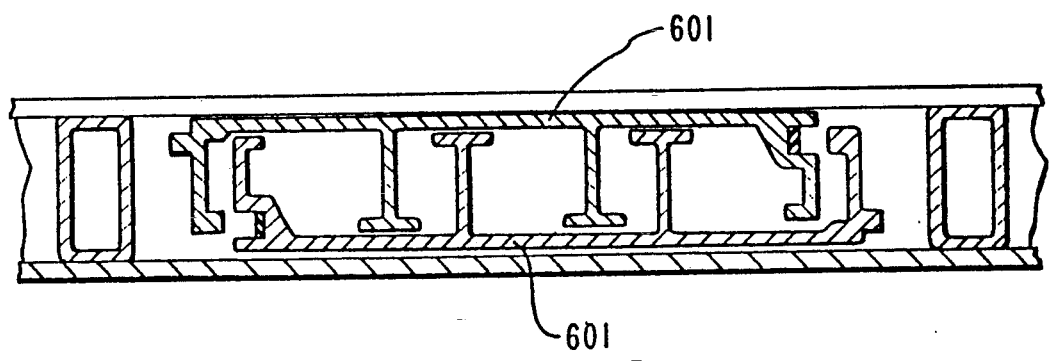
FIG. 39B is a horizontal cross sectional view of the wall of a van section taken along line 39B—39B of FIG. 27A showing the storage positions of the front door panels.

Referring next to FIGS. 39A and 39B, the planar units 527, which can be used as either a partition component or a deck component and the front door panels 601, respectively, are represented in cross sectional views taken from FIG. 27A. The views of FIG. 39A and 39B show how the planar units 527 and the front door panels 601 can be efficiently stored, with one component nesting into another, substantially within the wall of the van section.

FIG. 40 provides a view of another preferred planar unit 570A which includes an additional downward extending middle leg 570B which is included to increase the longitudinal strength of the planar unit. Also represented in FIG. 40 is another preferred stringer 536A which is provided with additional notches 537A to receive the middle leg 570B. A cushion strip 558 is shown on the stringer 536A as it is on other interior structures of the van section.

Figure 40A:
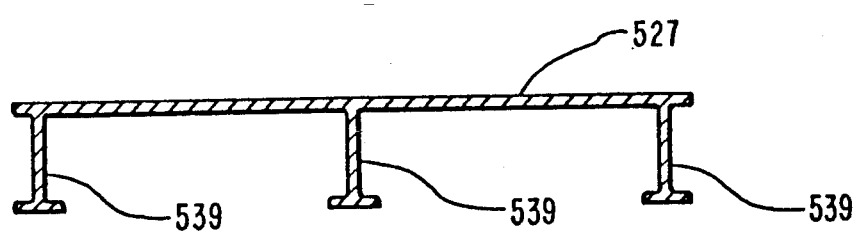
FIG. 40A is a cross sectional view taken along line 40A—40A of FIG. 28B showing a planar deck/shelf unit used in accordance with the present invention.

FIG. 40A provides a cross sectional view of a planar deck/shelf unit 527 in accordance with the present invention. The planar unit represented in FIG. 40 includes three legs 539 and can be used to form either a shelf deck or a partition wall. If desired, the structures used to construct shelf decks can be different than those used to construct partition walls.

Figure 41:
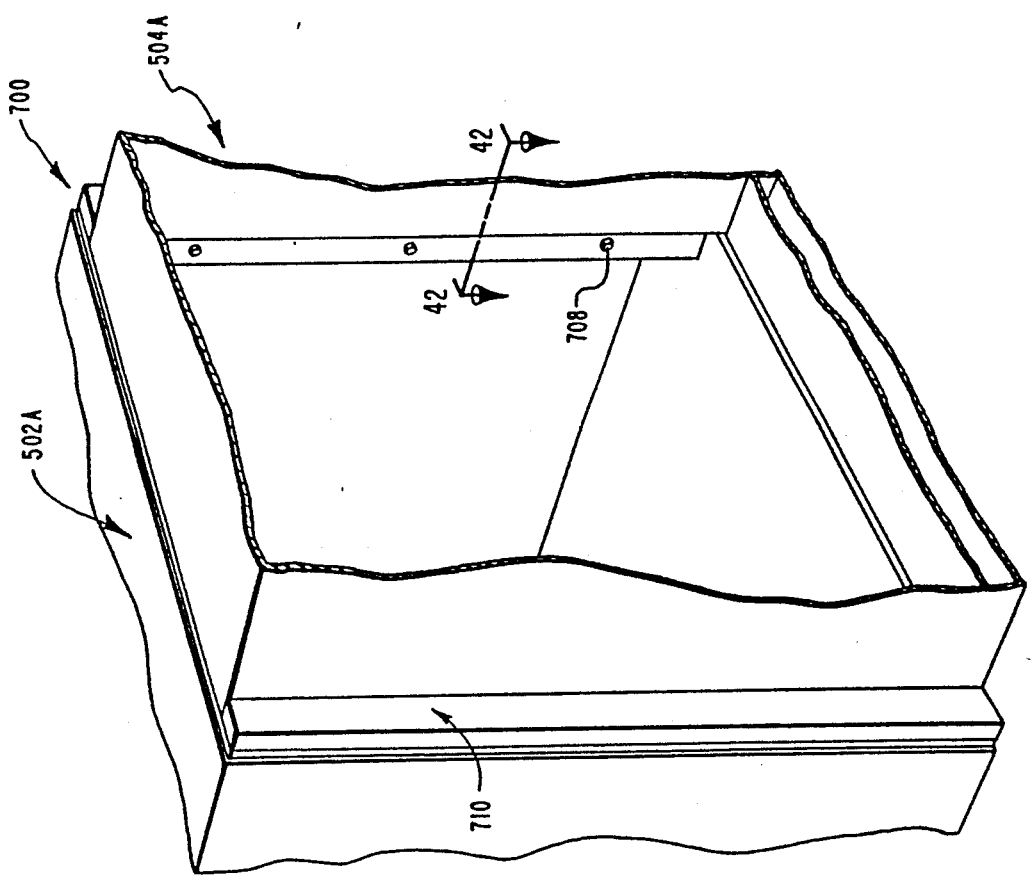
FIG. 41 is a perspective view of structures of the present invention used to join two differing sizes of van sections.

FIG. 41 is a perspective view of a van section adapter 700 which allows a van section having an eight and one-half foot width (such as that represented at 502A) to be interconnect with a van section 504A having a narrower width (such as eight feet). Regulations, both those imposed by government and industry, often limit the width of van sections, trailers, and vehicles to eight feet. The van section adapter 700 is preferably bolted to the van section 502A with bolts such as those represented at 708.

Figure 42:
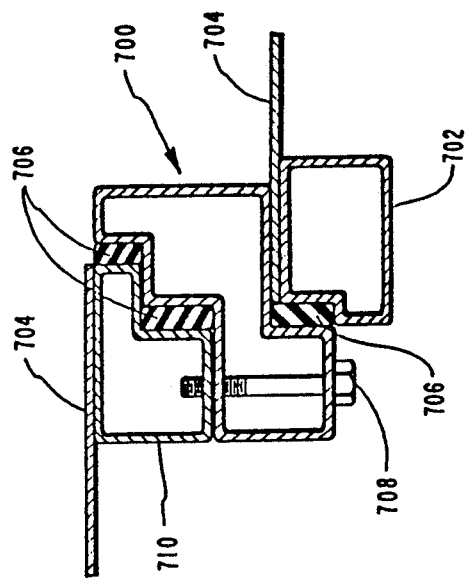
FIG. 42 is a horizontal cross sectional view taken along line 42—42 of FIG. 41.

The cross sectional view of FIG. 42 shows the shape of van section adapter 700 and its relationship with van section corner frame members 710 and 702 and the outer walls 704 of the respective van sections. A plurality of gaskets 706 act as cushions and seals for the inter-engaging of the two van sections.

Figure 43:
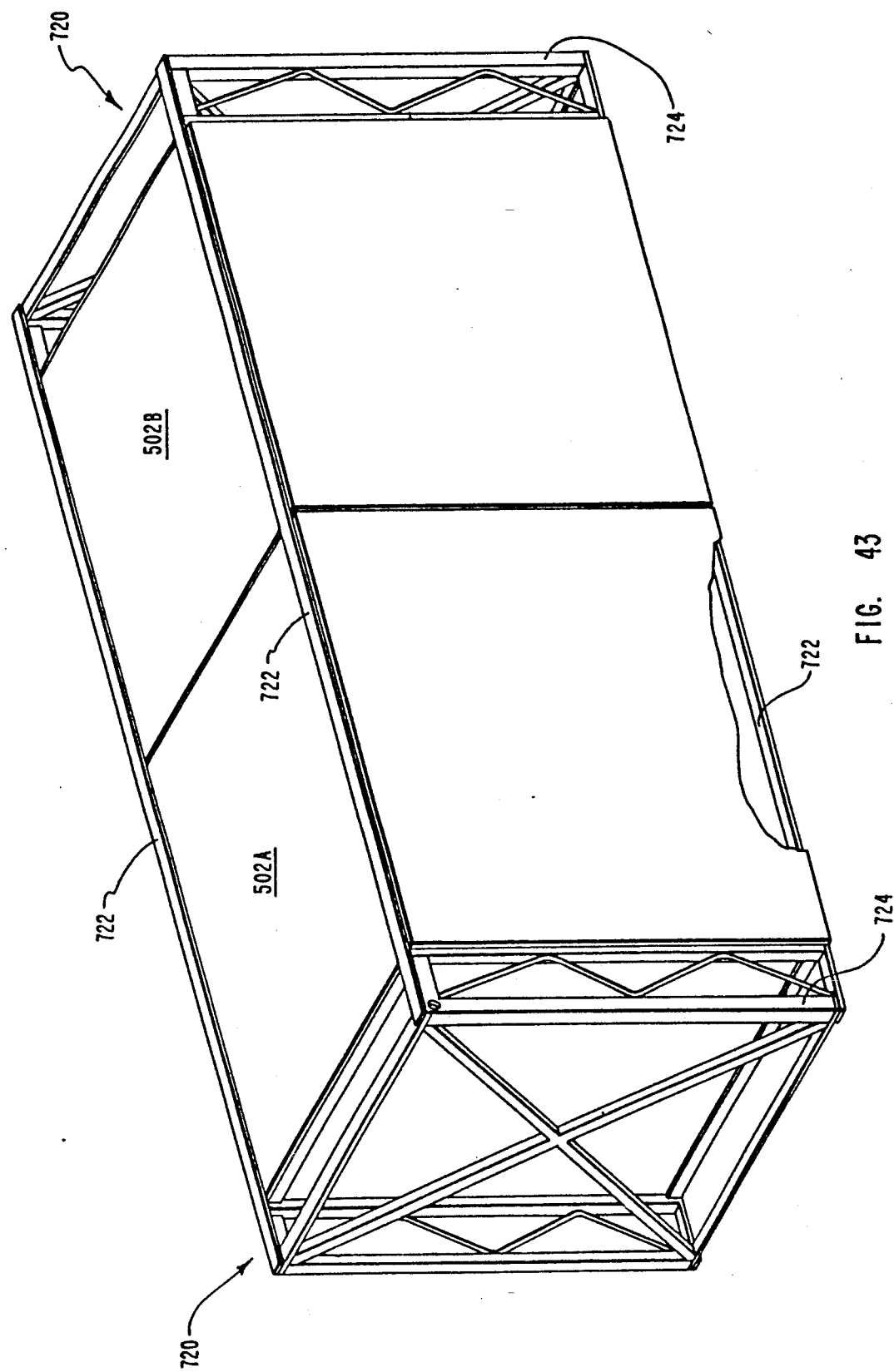
FIG. 43 is a perspective view of structures of the present invention being held within containerized shipping adapter which allows the van sections to be shipped as containerized freight.

Referring next to FIG. 43, a containerized shipping adapter is illustrated. It is common to transport large containers of freight by way of ship, truck, and train. The ocean going containers must be of standard width and length. In order to allow the van sections fabricated in accordance with the present invention to be shipped with ocean going containerized freight, a containerized shipping adapter is provided to allow two or more van sections 502A and 502B to be lifted, stacked, and otherwise transported as standard containers of freight.

The containerized shipping adapter includes two end frames 724 and interconnecting members 722. The end frames 724 are adapted to allow lifting of the entire assembly as is commonly done when transferring one the shipping containers from one mode of transportation to another. The containerized shipping adapter 720 allows two or more van sections of the present invention to be shipped the same as other containerized shipments, for example overseas, while still retaining the numerous advantageous features of the present invention.

As will be appreciated from the foregoing, the present invention provides advantages not heretofore available in the industry. The present invention greatly facilitates the process of moving household belongings by allowing a van section to be left at a residence and loaded at a time convenient to the customer. The van section may be left on the ground adjacent the residence or may be left on a trailer adapted for carrying a single van section. Thus, a long-haul tractor and semitrailer rig need not be detained at the residence while a trailer is loaded allowing for more efficient use of equipment and for more satisfied customers.

Moreover, all of the van sections, or cargo compartments, may be identical, and thus interchangeable, with one another, from trailer to trailer. In this way, van sections may be transported from various locations around a country and used in the locality where it is convenient to leave the van section after its contents have been unloaded.

Particularly significant is the feature of the present invention to interconnect one or more van sections to form a continuous van body. The continuous van body allows cargo, either commercial freight or household belongings, to be loaded in a fashion similar to any conventional van body truck or trailer. The continuous van body feature of the present invention may be used to allow a single household to use two or more van sections. Alternatively, the continuous van body feature allows the embodiment to be used to haul commercial freight, for example, on a return trip after unloading household belongings at one or more destinations or one van section secured to a trailer may contain commercial freight while another van section contains household belongings.

The tractor mounted hoist apparatus also provides a great advantage over previously available apparatus. With the tractor mounted hoist apparatus, a lone truck operator can remove and secure the van sections on slightly sloping or uneven terrain. The hoist apparatus in the described embodiments assumes a convenient transport position on the tractor when it is not being used.

Each of the van sections of the described embodiments provides protection for its contents against contamination by moisture and dirt in the surrounding environment and from theft. Still further, the present invention allows those working in the industry to more easily satisfy customers with acceptable pick-up and delivery dates. Even further, the present invention may be economically implemented so that both large and small moving and storage businesses may benefit therefrom.

Furthermore, the present invention provides a system and method for building shelf decks and partition walls within various cargo holding sections, such as the van sections of the present invention. The decks and partitions constructed in accordance with the present invention are more efficient than prior art systems and may be stored within any number of different types of cargo holding sections. Thus, the previously used inconvenient and cumbersome arrangements for carrying deck and partition building materials need not be included when the present invention is incorporated in cargo holding sections. Moreover, the deck and partition building materials of the present invention do not take up any valuable cargo space when being stored. The deck and partition building materials also have a long usable life and are strong and durable.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by U.S. Letters Patent is:

1. An apparatus for removing and placing cargo compartments or van sections from and onto any one of a plurality of trailer frames having a plurality of different heights, each of the trailer frames having a first side and a second side, the trailer frames being used to transport the cargo compartments to a storage location positioned over an underlying surface, the apparatus comprising:
   means for lifting the cargo compartment above one of the trailer frames, the means for lifting the cargo compartment being positioned adjacent to the one of the trailer frames during use;
   a rack supported above the underlying surface at a height which is greater than a level of the highest of the one of the trailer frames from which a cargo compartment is to be removed, the rack comprising track means for receiving the cargo compartment and rolling the cargo compartment thereon, the track means comprising a first end and a second end and at least a portion of the means for lifting the cargo compartment being connected to the rack;
   track extension means comprising a first end and a second end, the track extension means being insertable under the cargo compartment when it is lifted above one of the trailer frames and for rolling the cargo compartment upon, the track extension means including means for aligning the first end of the same with the first end of the track means;
   means for supporting the second end of the track extension means, the means for supporting being placed adjacent to the second side of one of the trailer frames during use, the means for supporting holding the cargo compartment above one of the trailer frames such that cargo compartments can be moved between the trailer frame and the rack;
   means for moving a cargo compartment resting on the track means onto the track extension means to place the cargo compartment from the rack to one of the trailer frames; and
   means for moving a cargo compartment resting on the track extension means onto the track means to remove the cargo compartment from one of the trailer frames to the rack.

2. An apparatus as defined in claim 1 wherein the means for lifting comprises a manually operable jack positioned on the rack and a manually operable jack positioned on the means for supporting a second end of the track extension.

3. An apparatus as defined in claim 1 wherein the track means and the track extension means comprise a plurality of rollers oriented transversely to a length of the track means and the track extension means such that the cargo compartments can be rolled thereon.

4. An apparatus as defined in claim 1 wherein the means for supporting comprises means supporting the second end of the track extension means at any one of a plurality of heights and means for laterally adjusting a position of the track extension means.

5. An apparatus as defined in claim 1 wherein the means for moving comprises a winch.

6. An apparatus as defined in claim 1 wherein the means for supporting the second end of the track extension means comprises a first track extension support and a second track extension support.

7. An apparatus for removing and placing cargo compartments or van sections from and onto any one of a plurality of trailer frames having a plurality of different heights, each of the trailer frames having a first side and a second side, the trailer frames being used to transport the cargo compartments to a storage location positioned over an underlying surface, the apparatus comprising:
   a rack supported above the underlying surface at a height greater than the highest of the one of the trailer frames from which a cargo compartment is to be removed, the rack comprising track means for receiving the cargo compartment and rolling the cargo compartment thereon, the track means comprising a first end and a second end;
   track extension means comprising a first end and a second end, the track extension means being insertable under the cargo compartment when it is lifted above one of the trailer frames and for rolling the cargo compartment upon, the track extension means including means for aligning the first end of the same with the first end of the track means;
   means for supporting the second end of the track extension means, the means for supporting being placed adjacent to the second side of one of the trailer frames during use, the means for supporting holding the cargo compartment above one of the trailer frames such that cargo compartments can be moved between the trailer frame and the rack; and
   means for lifting the cargo compartment above one of the trailer frames, the means for lifting the cargo compartment being positioned adjacent to the one of the trailer frames during use, the means for lifting comprising a manually operable jack positioned on the rack and a manually operable jack positioned on the means for supporting the second end of the track extension such that the track extension means can be inserted under the cargo compartment.

8. An apparatus as defined in claim 7 wherein the track means and the track extension means comprise a plurality of rollers oriented transversely to the length of the track means and the track extension means such that the cargo compartments can be rolled thereon.

9. An apparatus as defined in claim 7 wherein the means for supporting comprises means supporting the second end of the track extension means at any one of a plurality of heights and means for laterally adjusting the position of the track extension means.

10. An apparatus as defined in claim 7 further comprising means for moving a cargo compartment resting on the track extension means onto the track means.

11. An apparatus as defined in claim 10 further comprising means for moving the cargo compartment on the track means onto the track extension means.

12. An apparatus as defined in claim 10 wherein the means for moving comprises a winch.

13. An apparatus as defined in claim 7 wherein the means for supporting the second end of the track extension means comprises a first track extension support and a second track extension support.

* * * * *